Figure 1:
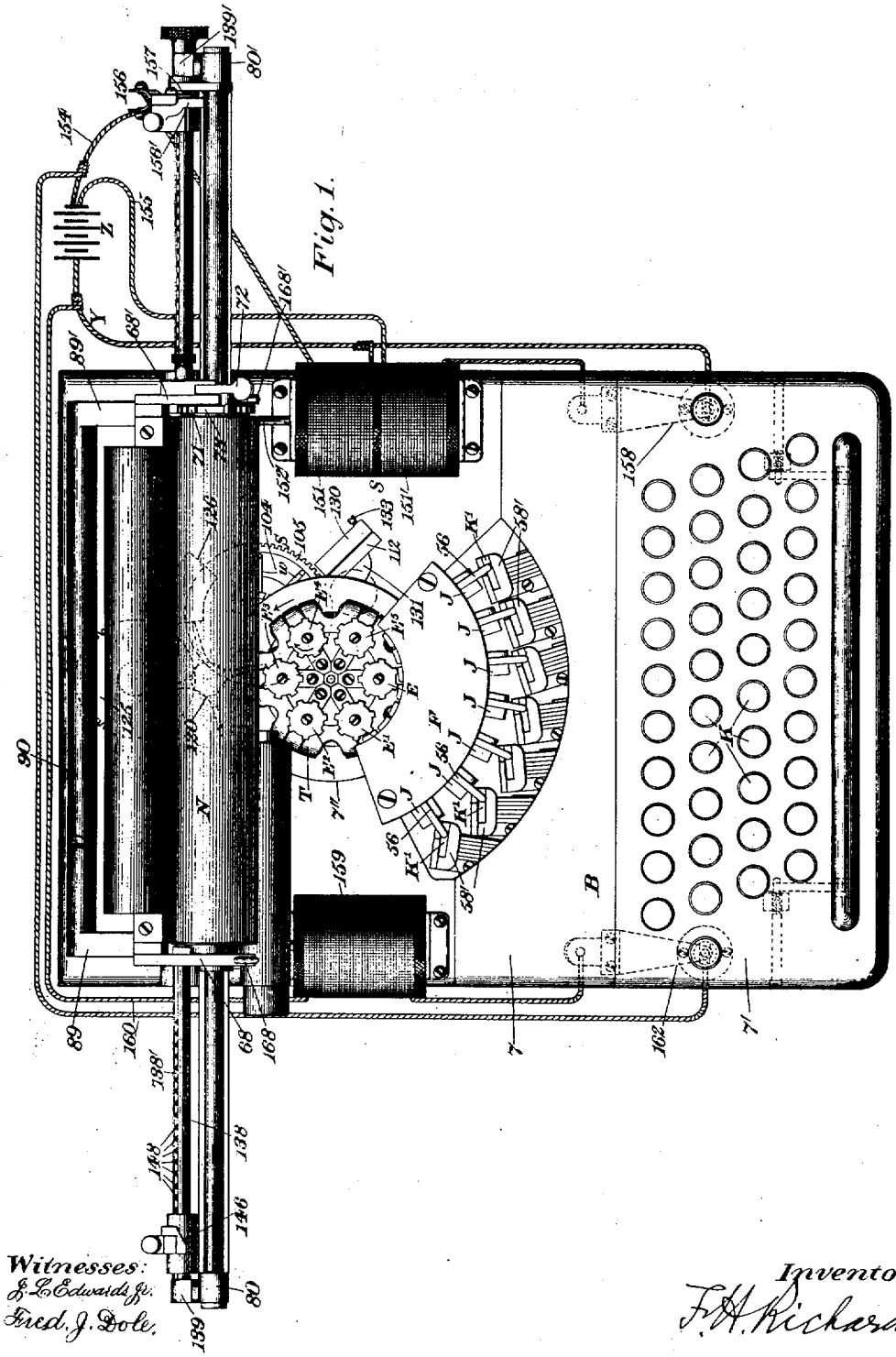

No. 852,452. PATENTED MAY 7, 1907.
F. H. RICHARDS.
MACHINE FOR MAKING IMPRESSIONS.
APPLICATION FILED JULY 24, 1896.

19 SHEETS—SHEET 3.

Fig. 3ª.

Witnesses:
J. L. Edwards Jr.
Fred. J. Dole.

Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 4.

Witnesses:
F. L. Edwards Jr.
Fred. J. Dole.

Inventor:
F. H. Richards,

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 5.

Witnesses:
F. L. Edwards Jr.
Fred. J. Dole.

Inventor:
F. H. Richards.

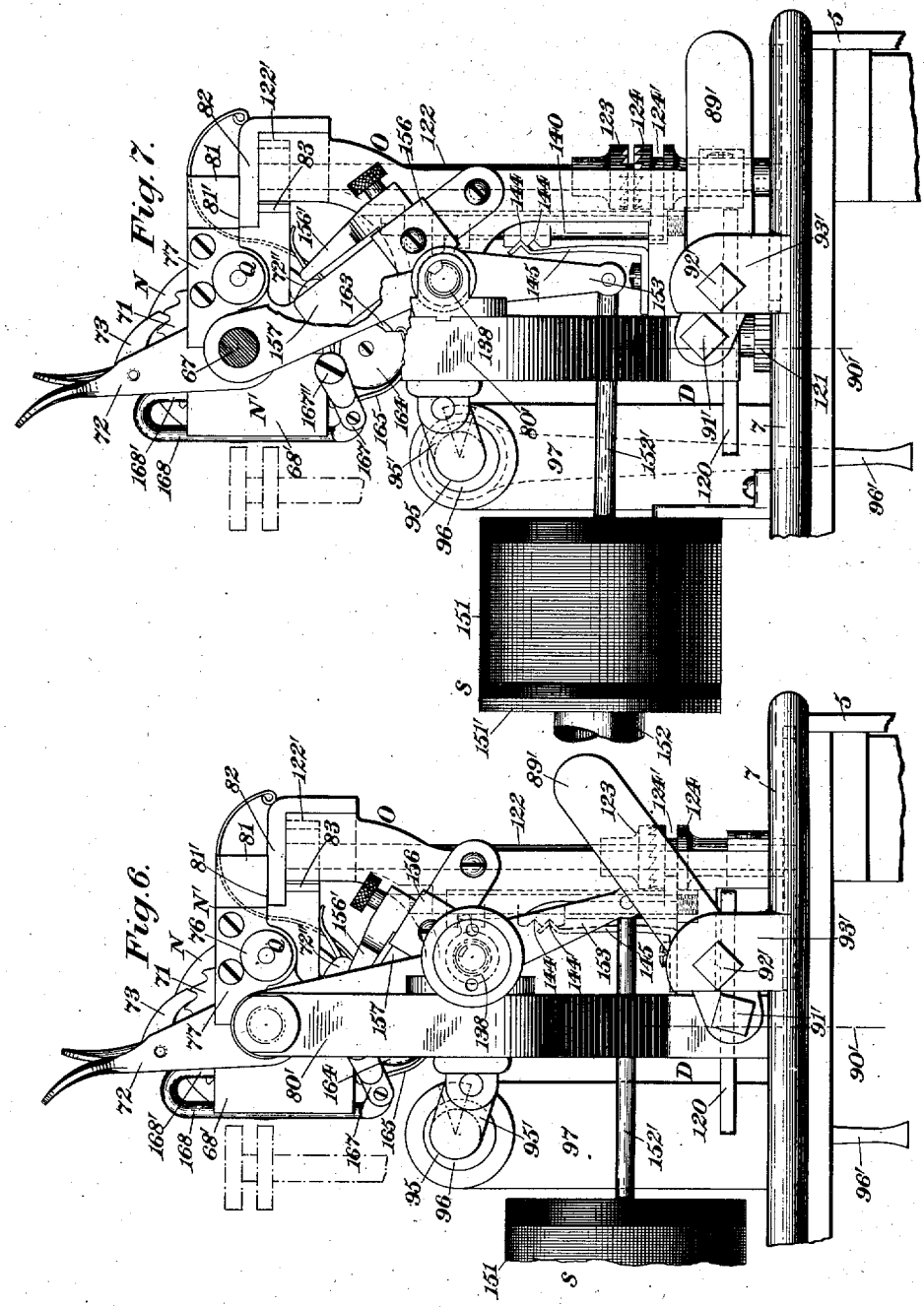

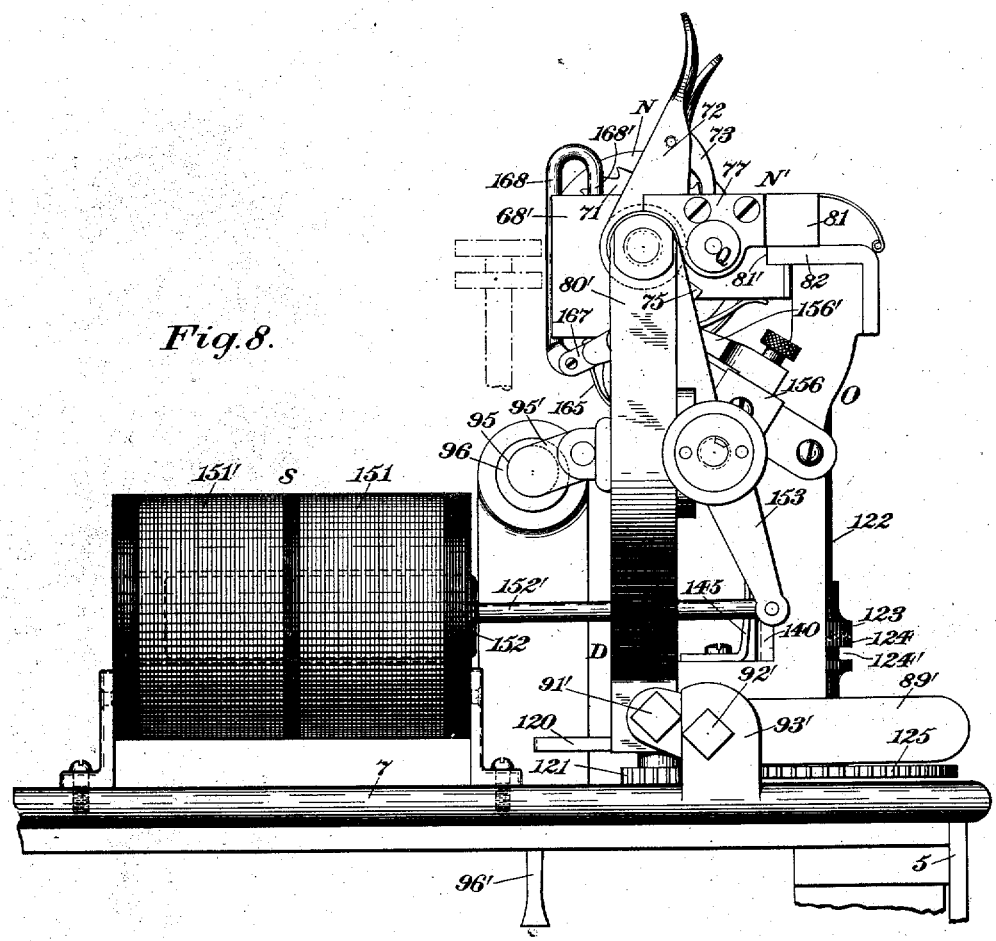

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 8.
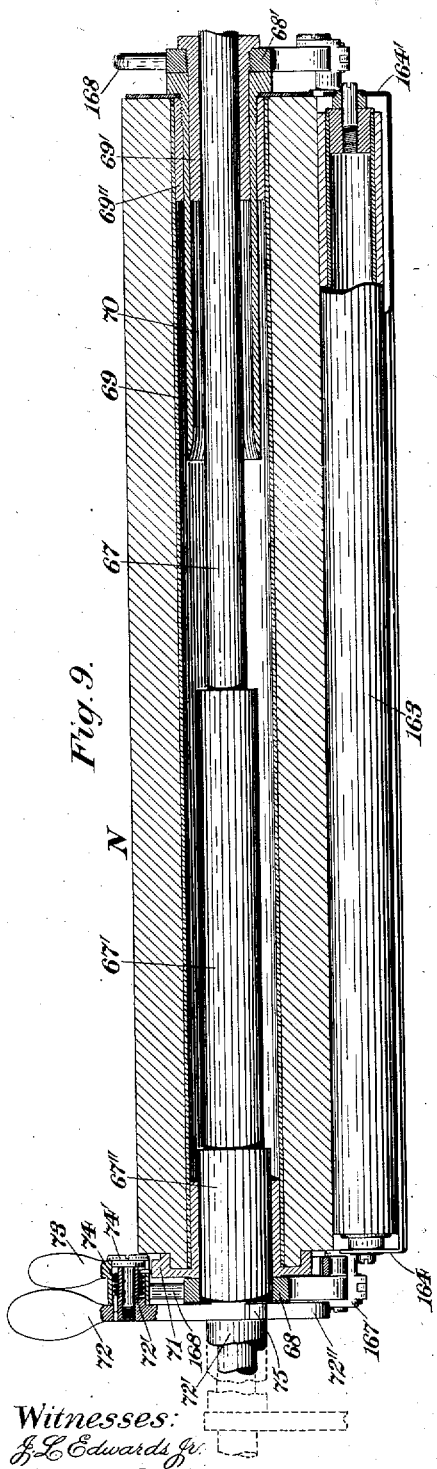
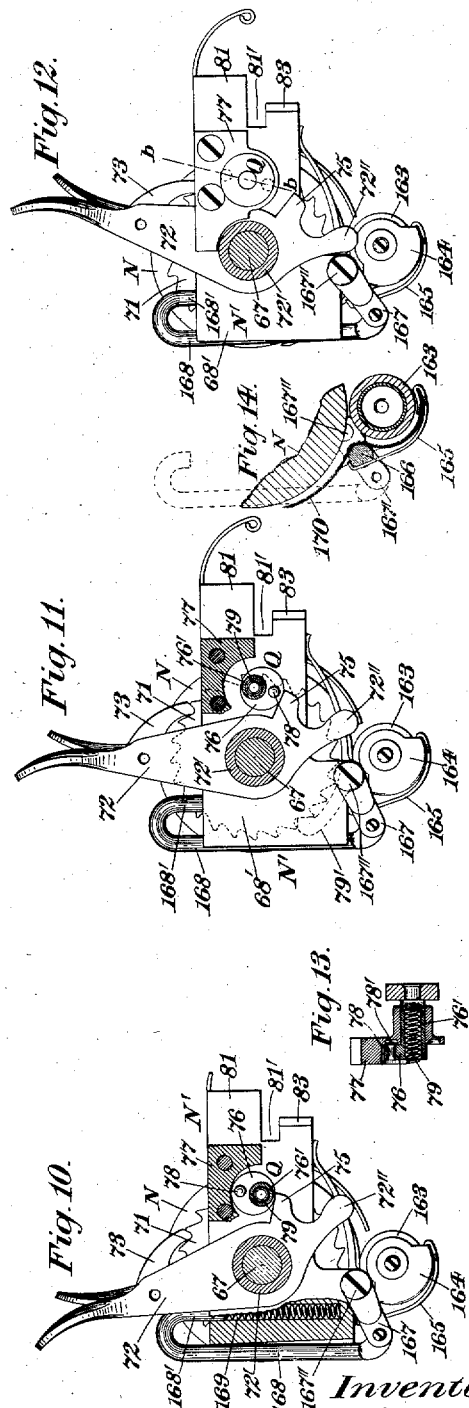
Witnesses:
J. L. Edwards Jr.
Fred J. Dole.
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 9.
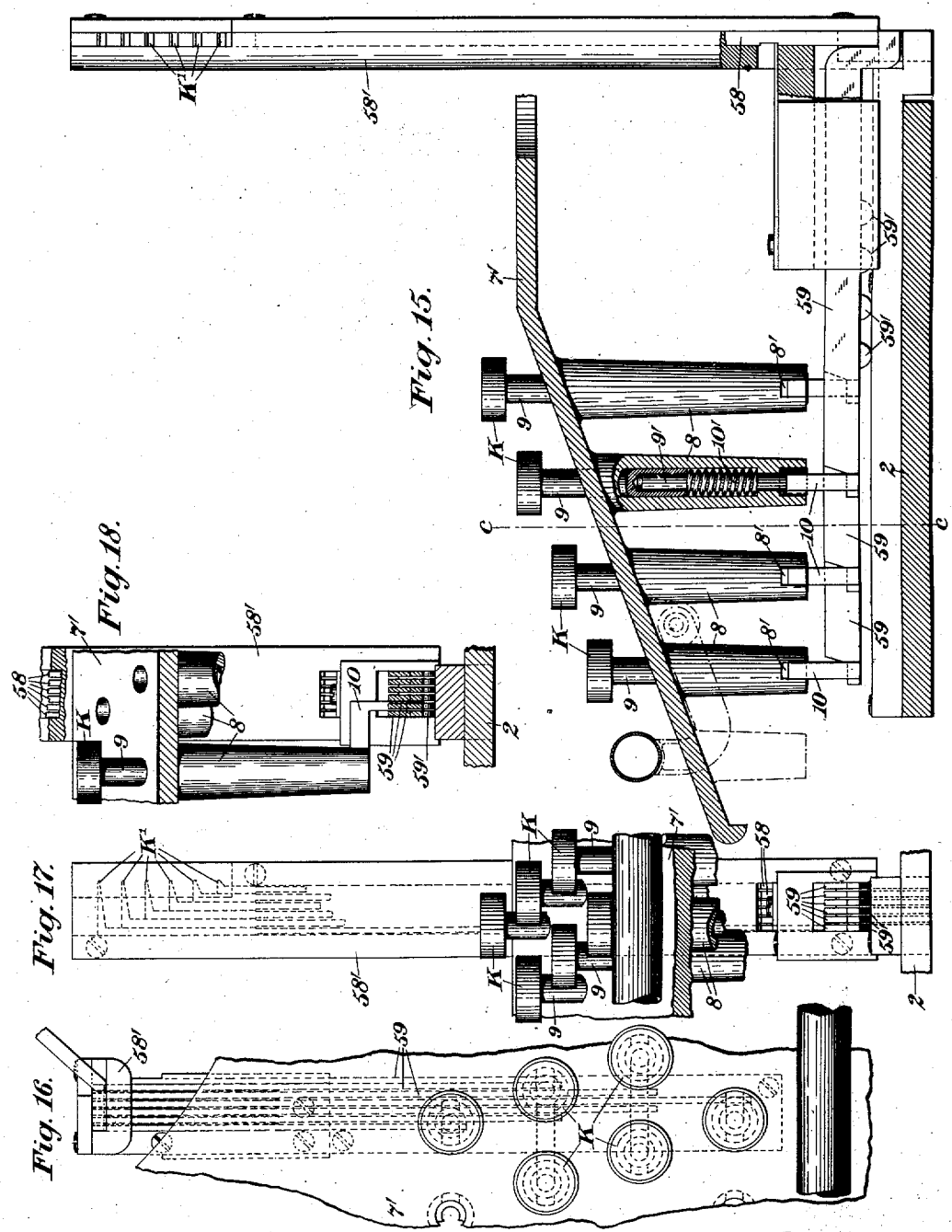
Witnesses:
J. L. Edwards Jr.
Fred. J. Dole.
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 10.
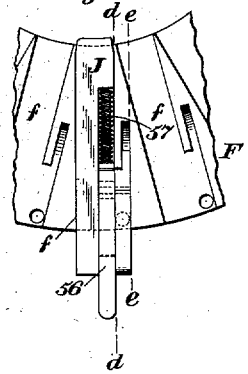
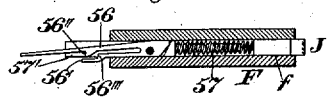
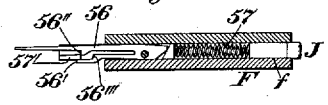
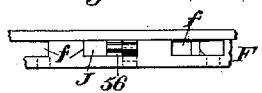
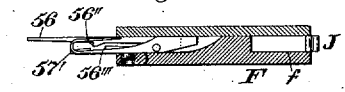
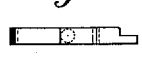
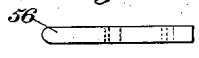
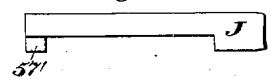
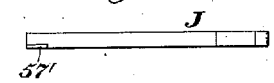
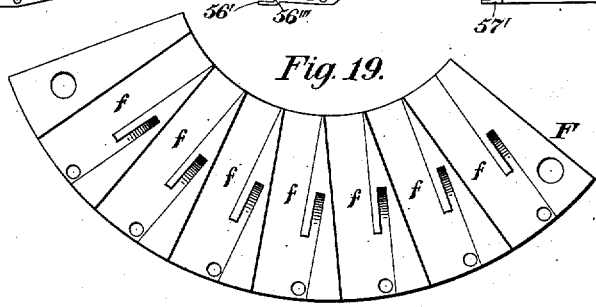
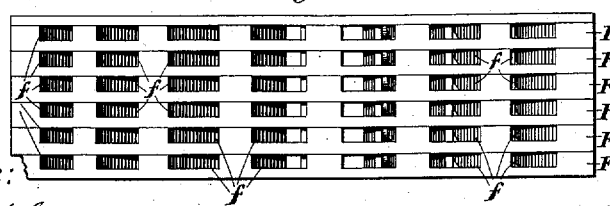
Witnesses:
J. L. Edwards Jr.
Fred. J. Dole.
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 11.
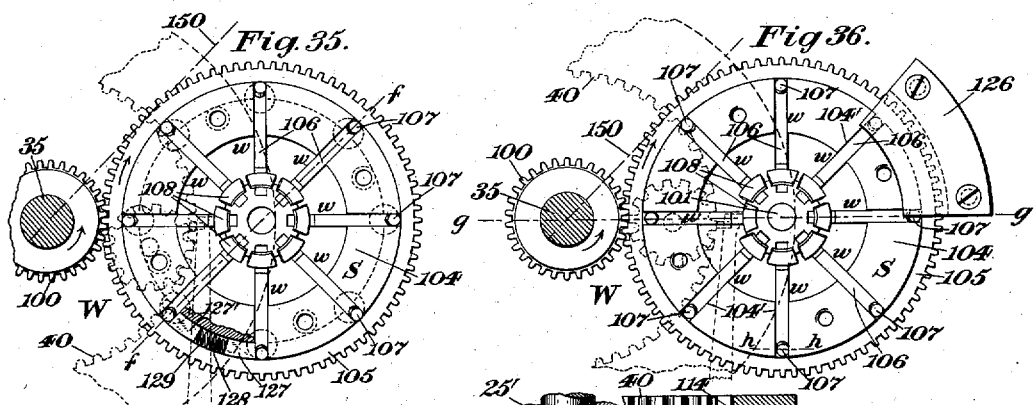
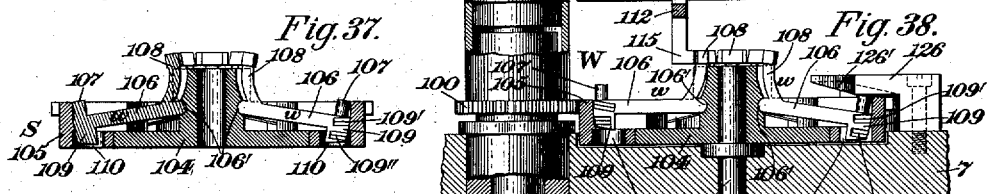
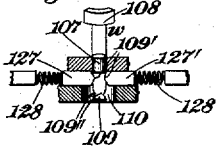
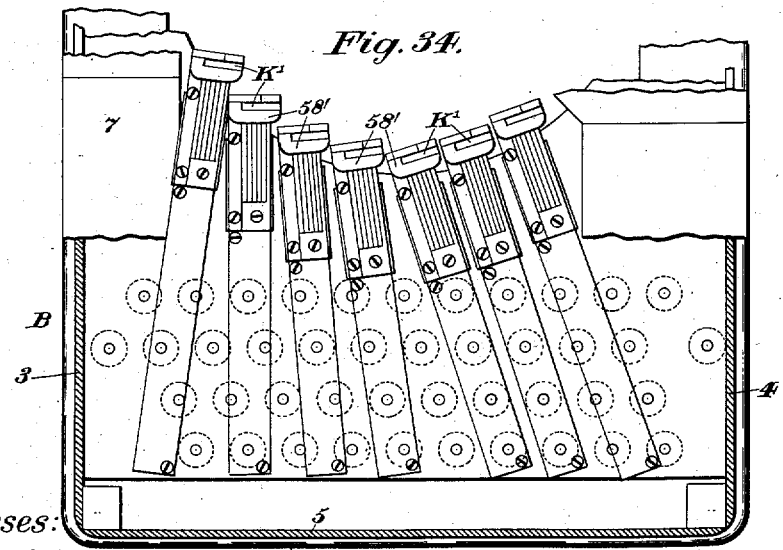
Witnesses:
J. L. Edwards Jr.
Fred. J. Dole.
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.

Witnesses:
F. L. Edwards Jr.
Fred. J. Dole.

Inventor:
F. H. Richards.

No. 852,452.  
F. H. RICHARDS.  
MACHINE FOR MAKING IMPRESSIONS.  
APPLICATION FILED JULY 24, 1896.  
PATENTED MAY 7, 1907.  
19 SHEETS—SHEET 13.
*Fig. 43.*
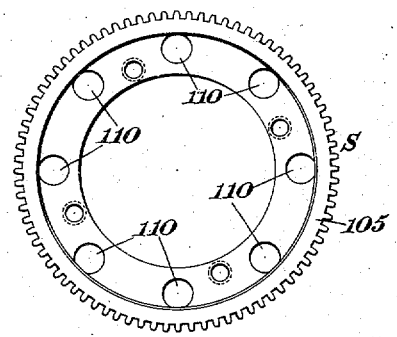
*Fig. 46.*
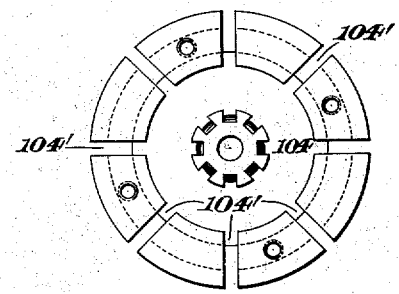
*Fig. 44.*
*Fig. 47.*
*Fig. 45.*
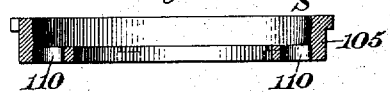
*Fig. 48.*
*Fig. 49.*
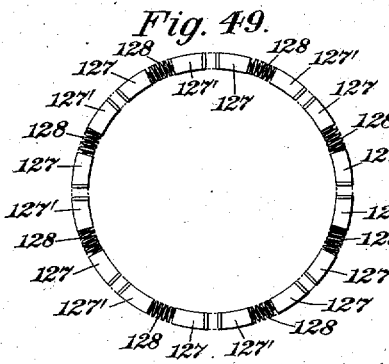
*Fig. 50.*
*Fig. 52.* *Fig. 51.* *Fig. 53.*
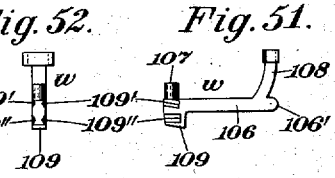
*Fig. 54.* *Fig. 55.*
 
Witnesses:  
J. L. Edwards Jr.  
Fred. J. Dole.
Inventor:  
F. H. Richards.

No. 852,452. PATENTED MAY 7, 1907.
F. H. RICHARDS.
MACHINE FOR MAKING IMPRESSIONS.
APPLICATION FILED JULY 24, 1896.

19 SHEETS—SHEET 14.

Witnesses:
J. L. Edwards Jr.
Fred. J. Dole.

Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 15.
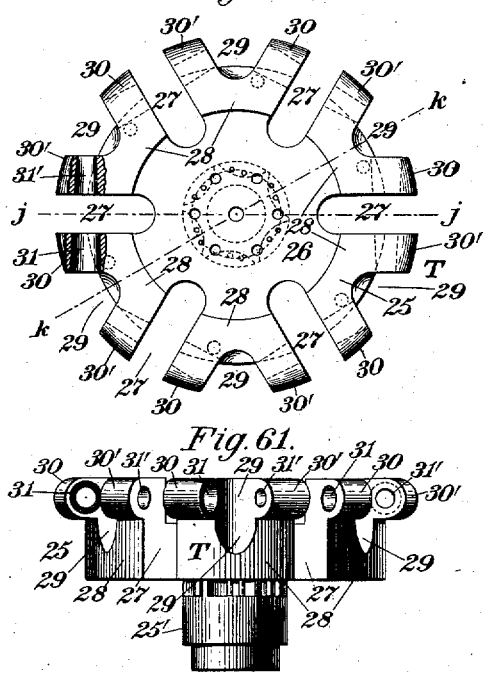
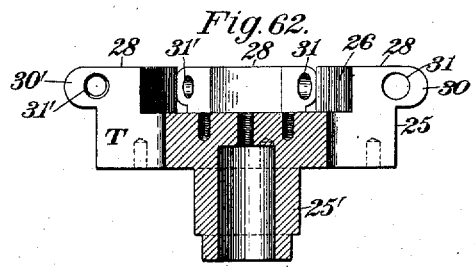
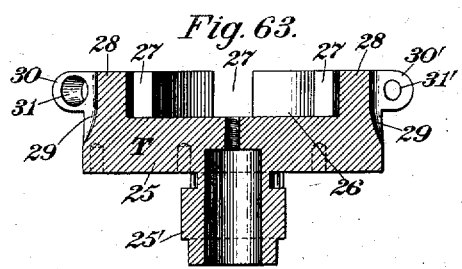
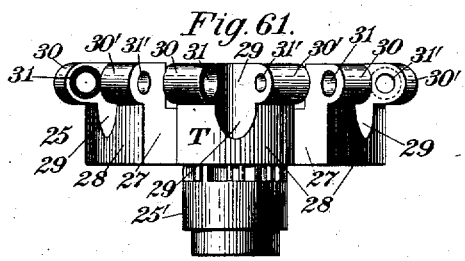
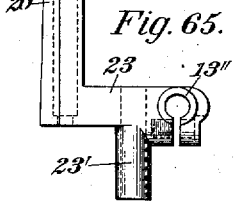
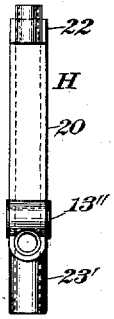
Witnesses:
J. L. Edwards Jr.
Fred. J. Dole.
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 16.
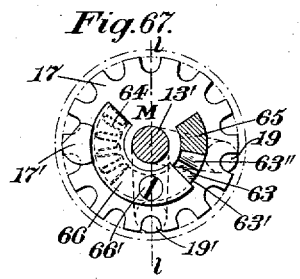
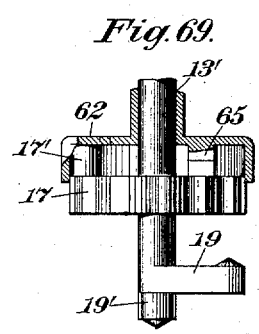
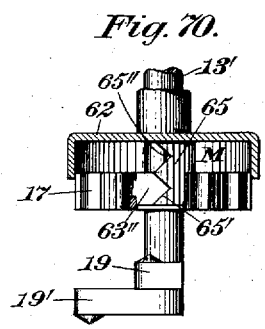
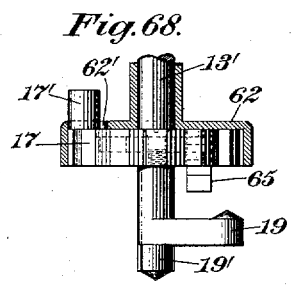
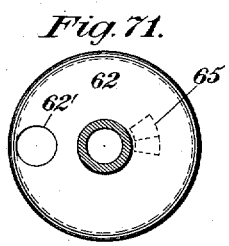
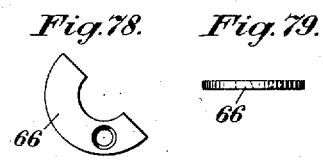
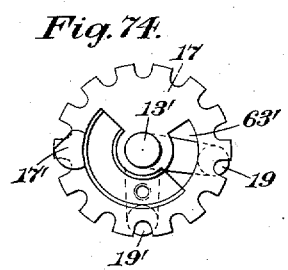
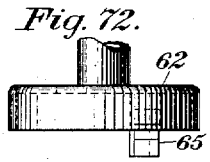
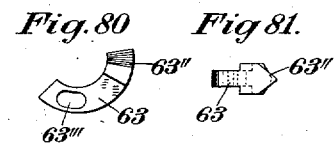
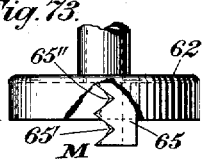
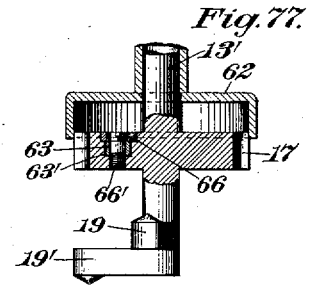
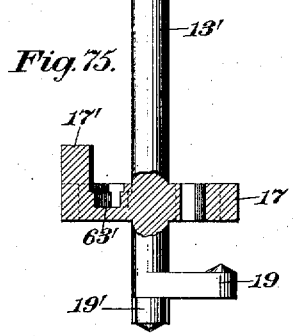
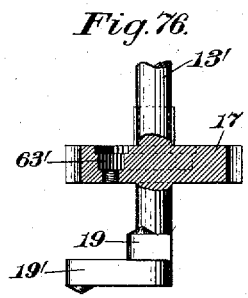
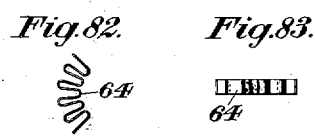
Witnesses:
J. L. Edwards Jr.
Fred. J. Dole.
Inventor:
F. H. Richards, No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 17.
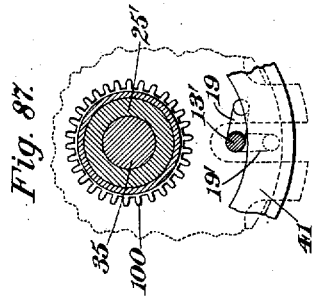
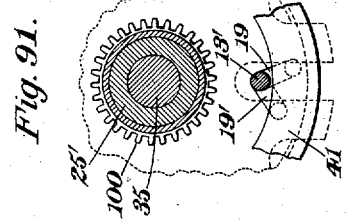
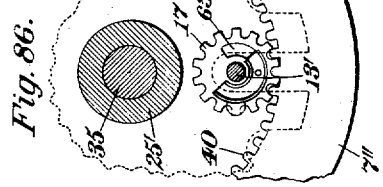
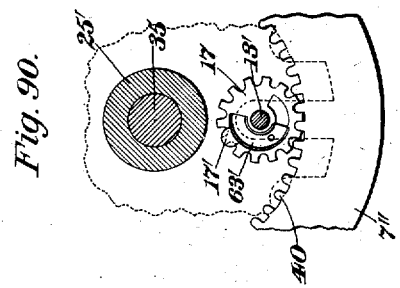
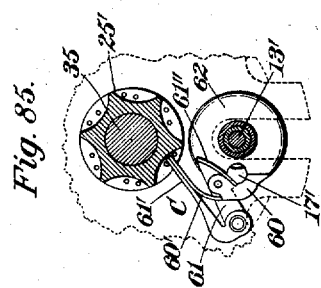
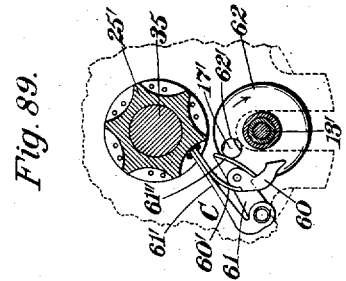
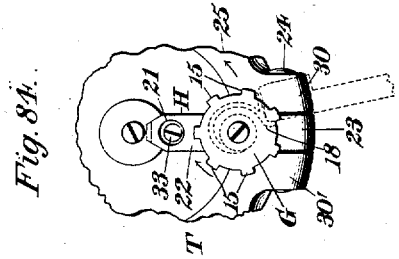
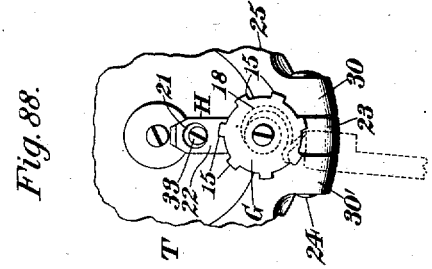
Witnesses:
J. L. Edwards Jr.
Fred. J. Dole
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 18.
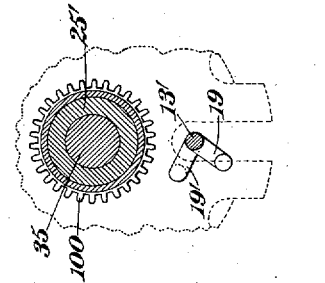
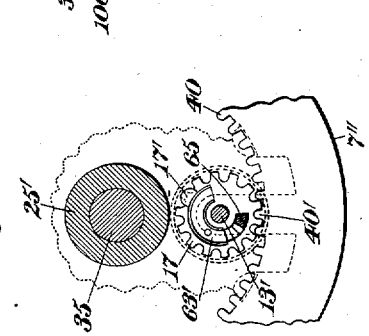
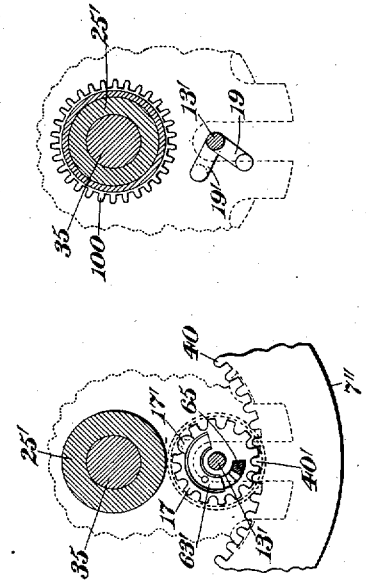
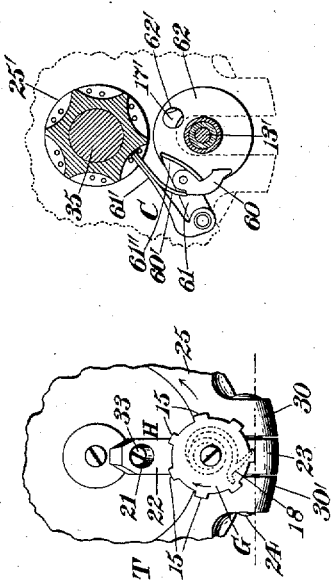
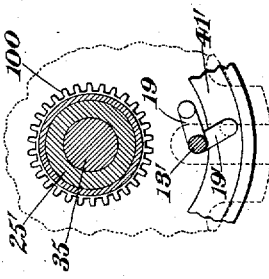
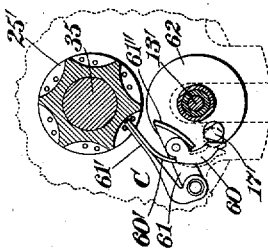
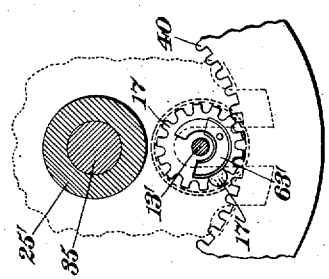
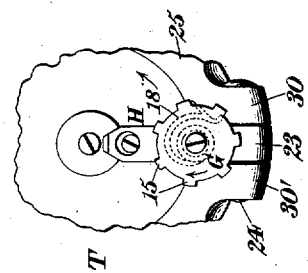
Witnesses:
J. L. Edwards Jr.
Fred. J. Dole.
Inventor:
F. H. Richards.

No. 852,452. PATENTED MAY 7, 1907.
F. H. RICHARDS.
MACHINE FOR MAKING IMPRESSIONS.
APPLICATION FILED JULY 24, 1896.
19 SHEETS—SHEET 19.
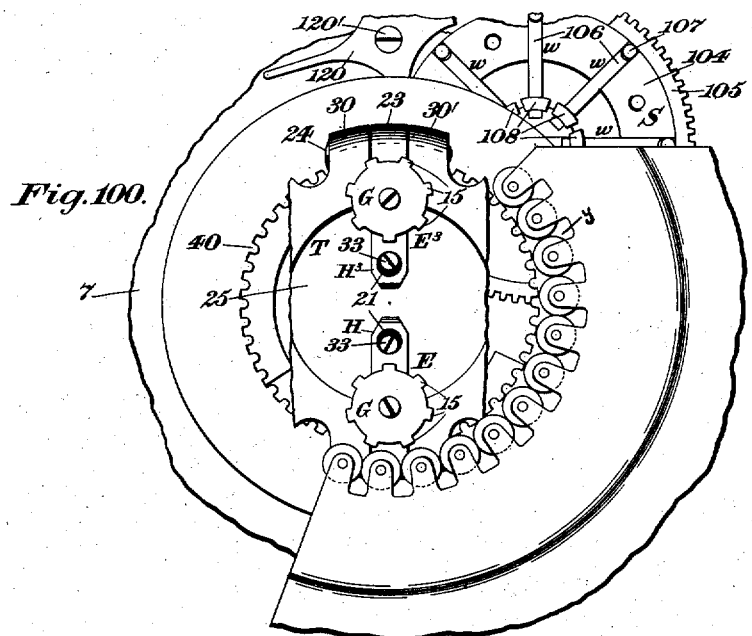
Fig.100.
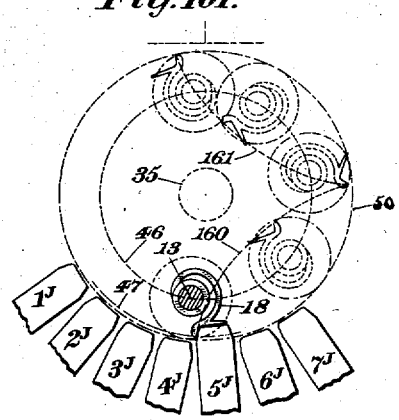
Fig.101.
Fig.103.
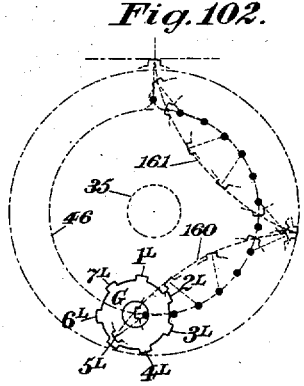
Fig.102.
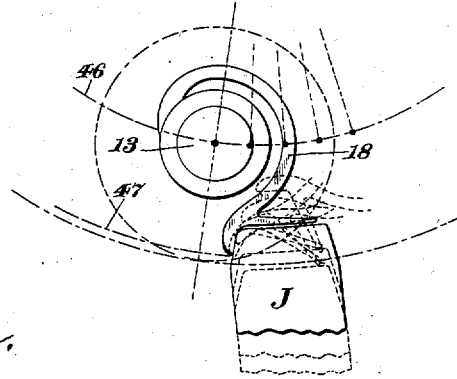
Witnesses:
F. L. Edwards Jr.
Fred. J. Dole.
Inventor:
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

MACHINE FOR MAKING IMPRESSIONS.

No. 852,452.  Specification of Letters Patent.  Patented May 7, 1907.

Application filed July 24, 1896. Serial No. 600,377.

*To all whom it may concern:*

Be it known that I, FRANCIS H. RICHARDS, a citizen of the United States, residing at Hartford, in the county of Hartford and State of Connecticut, have invented certain new and useful Improvements in Machines for Making Impressions, of which the following is a specification.

This invention appertains to machines for making impressions, and more especially to that class of machines in which the impression is made by devices having rotative movements, and is in some respects an improvement upon the machine shown and described in Letters Patent of the United States No. 403,216, granted to me May 14, 1889. In the machine described in the patent mentioned the impression mechanism, briefly stated, comprises a rotatable body or turret; means for imparting a normally continuous rotary movement to said turret; a series of impression-device carrier-shafts carried on the rotatable body or turret near the periphery thereof, and each of which shafts has a starting-arm located in a plane, longitudinally of the shaft, differing from that of the starting arm on any other shaft; a series of sets or tiers of shaft-starters or latches so disposed relatively to the starting-arms of the several shafts that the latches of one set are protrudable into the orbit of the starting-arm of one shaft and are adapted for starting the rotative movement of said shaft, and the latches of another set are likewise protrudable into the orbit of the starting-arm of another shaft and are adapted for commencing the rotative movement of said other shaft, and so on; a suitable keyboard having finger-keys for controlling the operation of the shaft-starters or latches; actuating connections between the latches and finger-keys, so organized and connected that upon the operation of a selected finger-key the latch controlled by said key will be protruded into the path of the starting-arm of that shaft controlled by the set of latches to which this latch belongs, and thereby start the said shaft in rotation at the requisite point in the orbital movement thereof for bringing the impression device corresponding to the character of the key-actuator into proper position for making an impression; means for continuing the rotative movement of said shaft until the impression is made; and means for returning the impression-device carrier to its normal, ineffective position. By reference to said patent it will be seen that each impression-device carrier of the machine therein described has a normally continuous, orbital movement concentric to a fixed axis, and that the impression is made by the rolling action of the impression device without any deflection of the carrier from its normal, concentric path, the impression-device carrier having a portion of its periphery notched or cut away to form a clearance-space, between the said carrier and platen and being normally so held in position relatively to the platen that it will pass clear of the same during an ineffective orbital movement of said carrier.

One object of my present invention is to furnish a machine embodying an impression-device carrier supported for diversified movements, and to provide means for imparting hypocycloidal movements to the impression-device thereon and for imparting an advancing and retracting impression movement to said carrier at a predetermined point in and simultaneously with the said hypocycloidal movement, whereby the impression will be made by a combined hypocycloidal and advancing movement of the impression device.

A further object of the invention is to provide, in connection with a platen-carriage, a platen and feed mechanism, improved means whereby the platen-carriage may be automatically shifted, longitudinally from its extreme, advanced position to its extreme, retracted position, and whereby the platen may be automatically rotated a space distance at or near the end of the retractive movement thereof; also to provide key-controlled devices for effecting retractive movement of the platen-carriage, irrespective of the location of said carriage, intermediate its two extreme positions; and also to provide key-controlled devices for shifting the carriage in a plane crosswise to the plane of its longitudinal movement.

A further object of the invention is to provide, in connection with a platen, improved means for cushioning the platen upon the retractive movement thereof.

A further object of the invention is to provide, in connection with a shiftable carriage and a suitable impression device, mechanism controlled by the operation of the impression device for feeding the carriage longitudinally a space-distance after each impression movement of the impression device, and embodying means whereby the indication for a feed movement of the carriage is made prior to the impression movement of said impression device, and also embodying devices for controlling the operation of the feed mechanism and said carriage.

A further object of the invention is to provide, in connection with a platen, improved devices for effecting a feed movement of said platen and for regulating the range of said feed movement.

While the invention is shown embodied in a type-writing machine, it is distinctly to be understood that it is not limited to such use, for it may be employed in many kinds of machines for making impressions, and it may be utilized in various arts.

Figure 2:
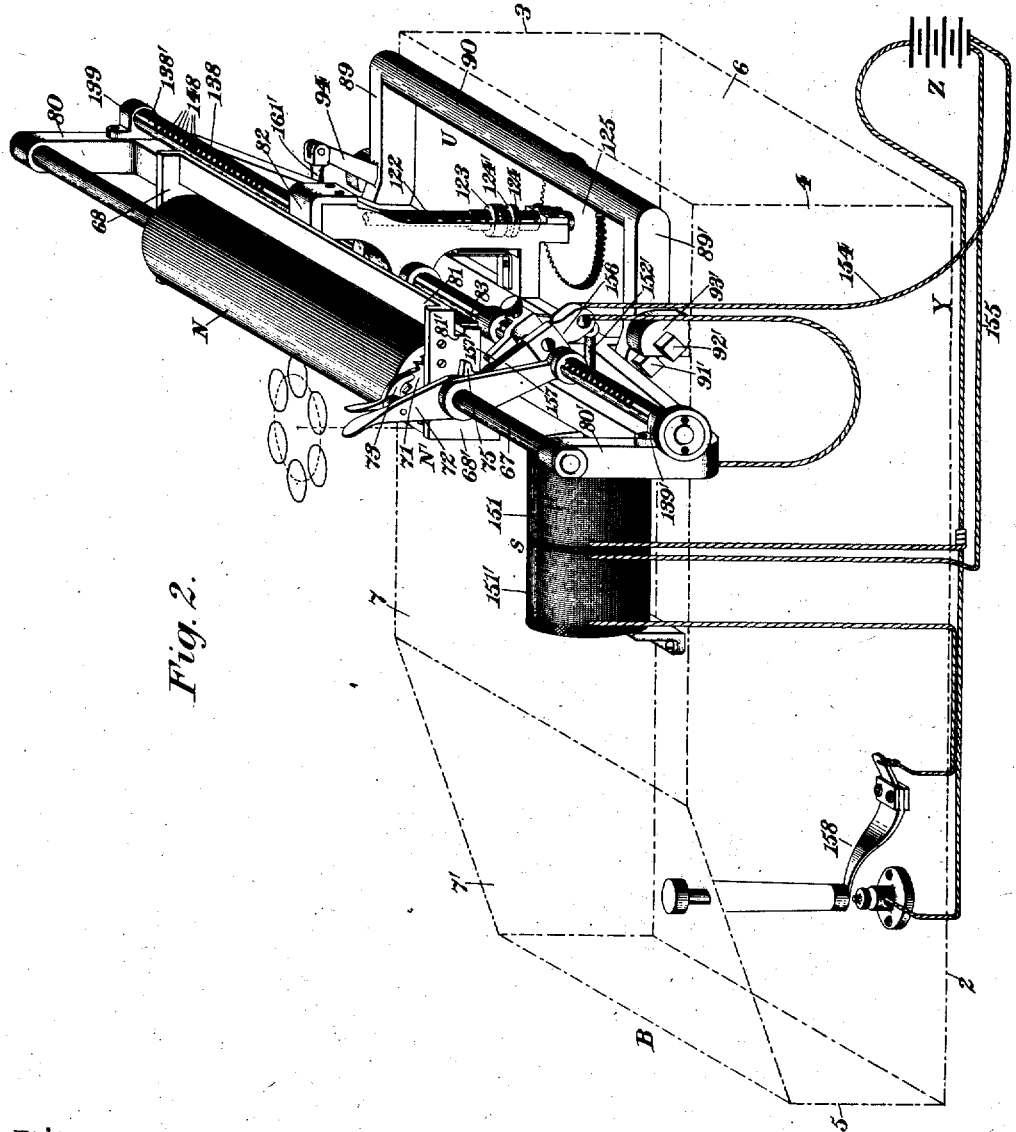
Figure 3:
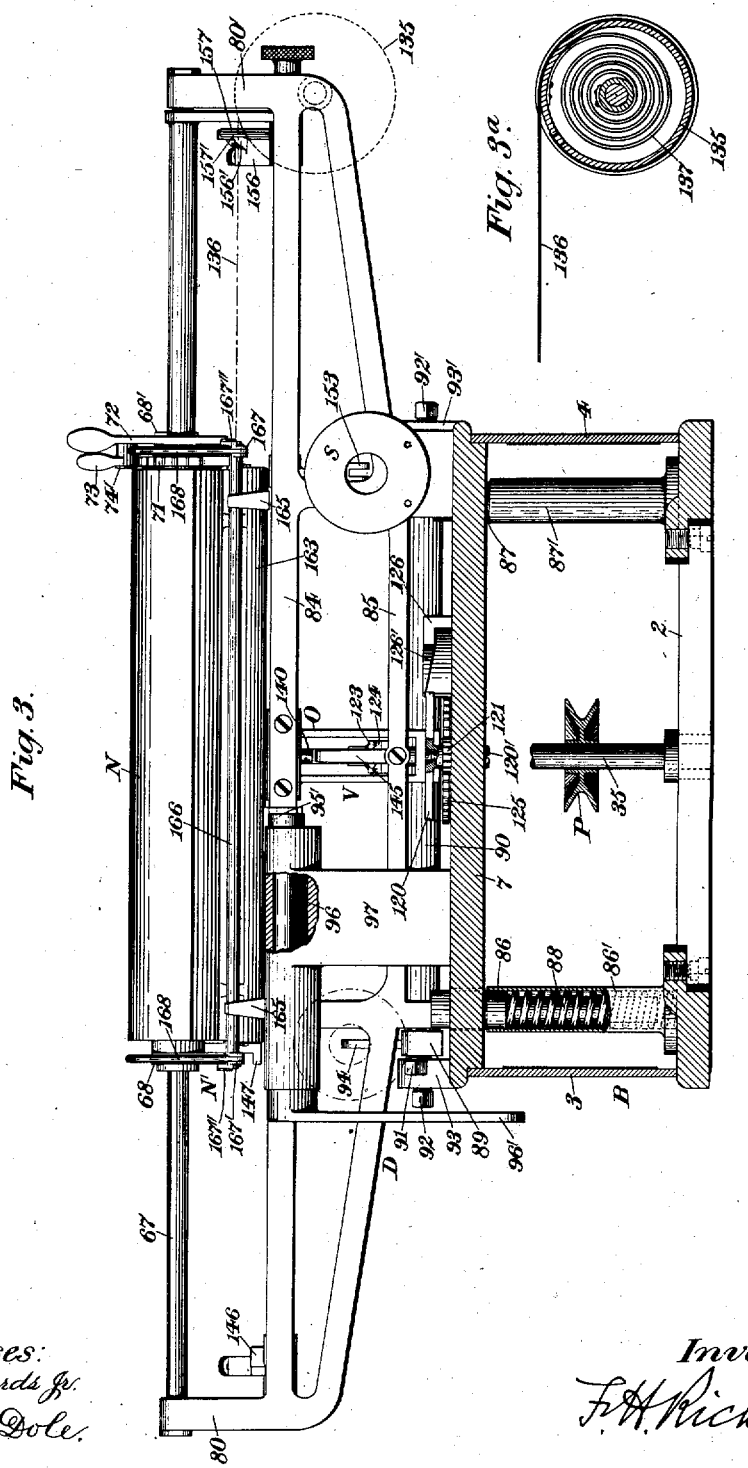
Figure 4:
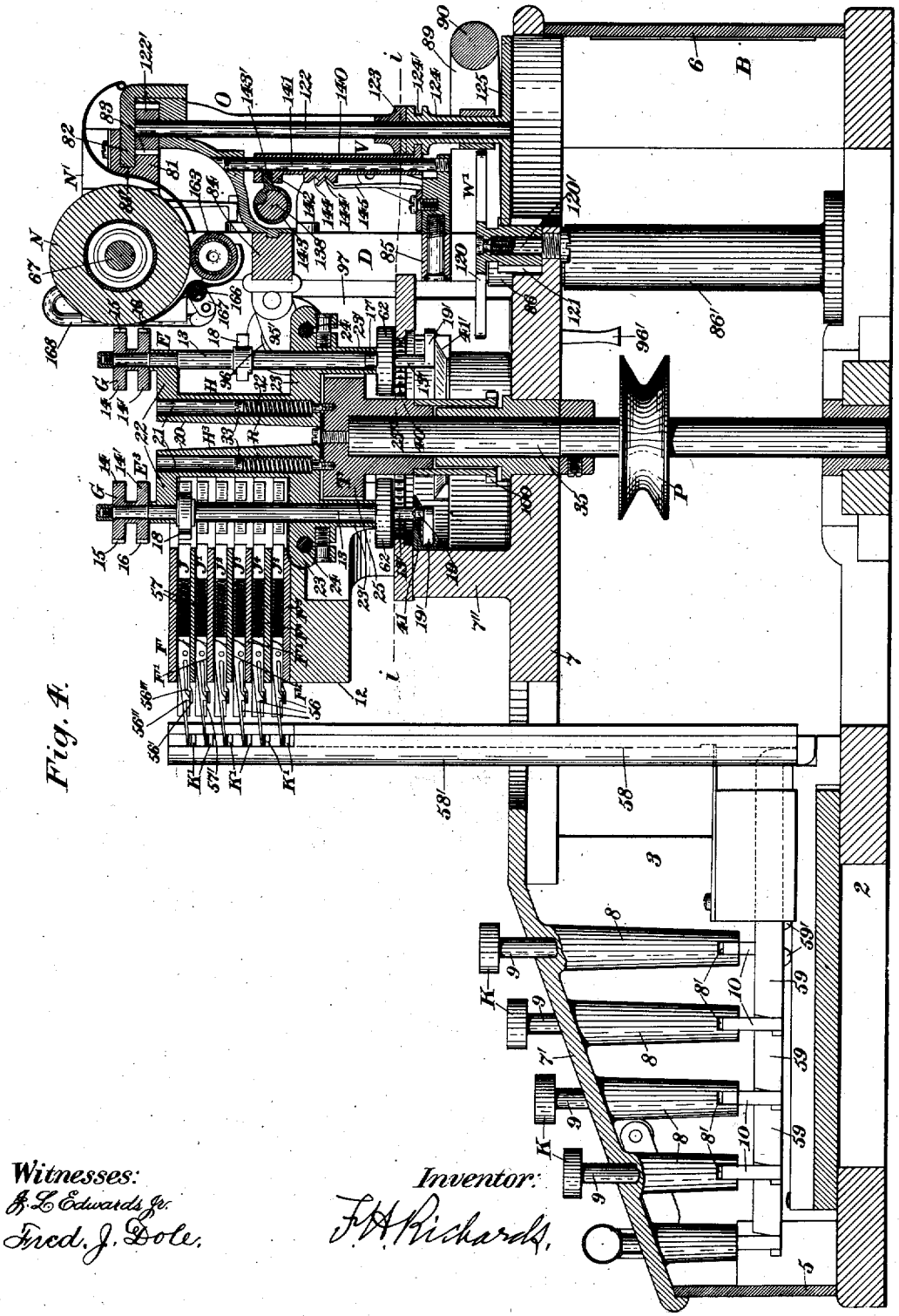
Figure 5:
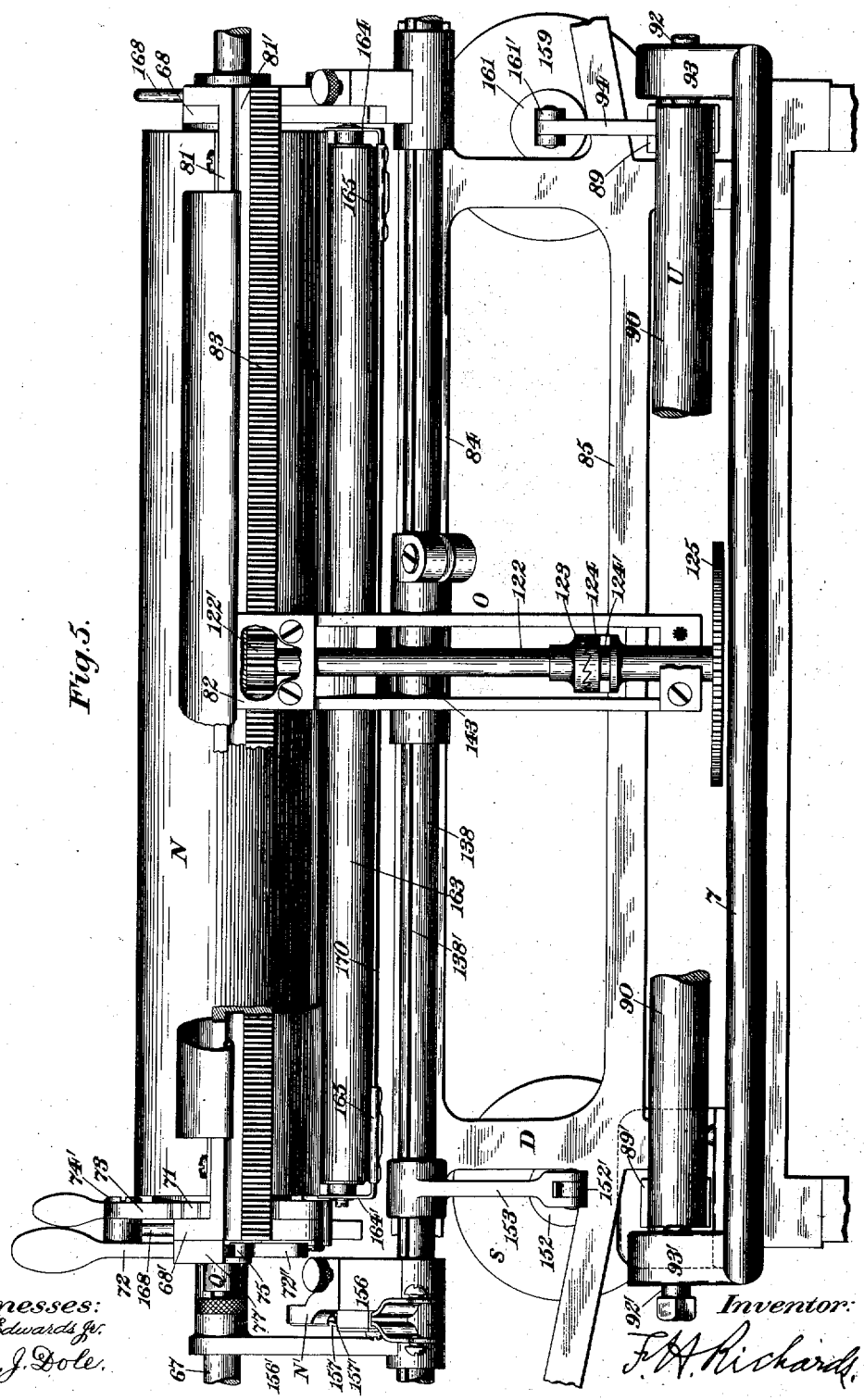
Figure 41:
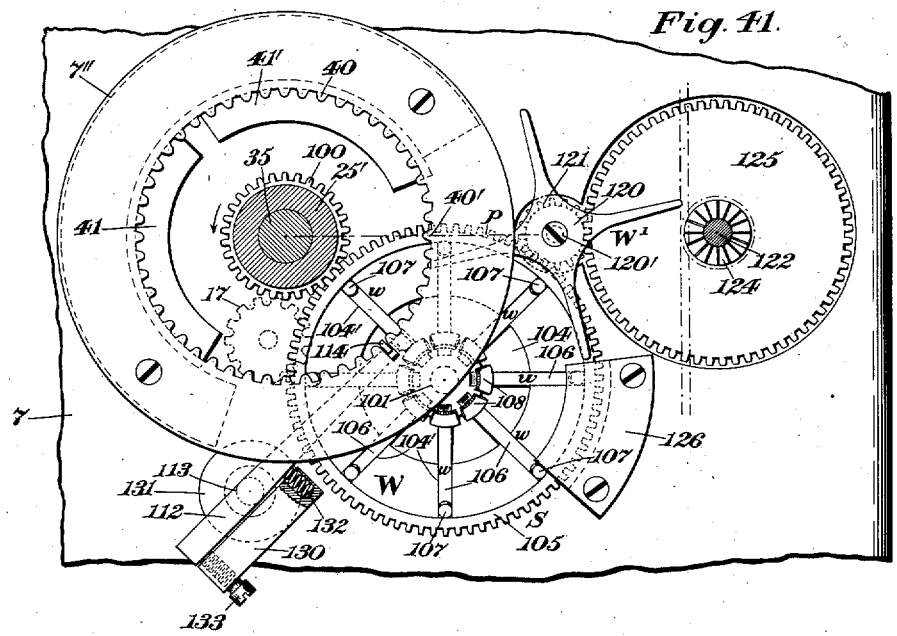
Figure 42:
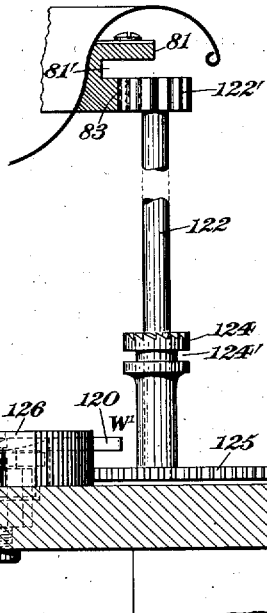
Figure 56:
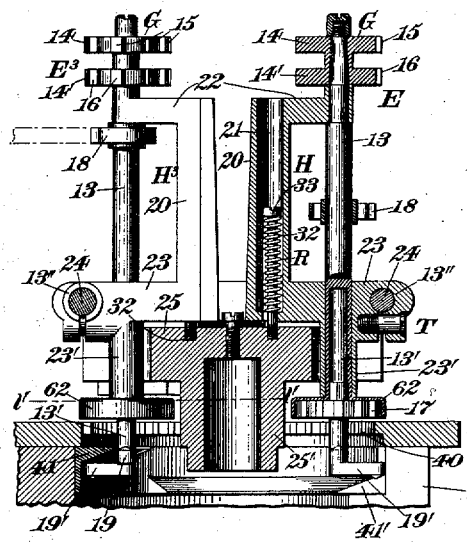
Figure 57:
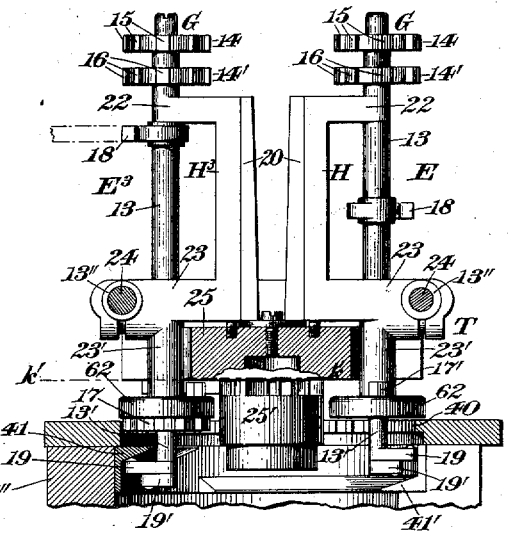
Figure 58:
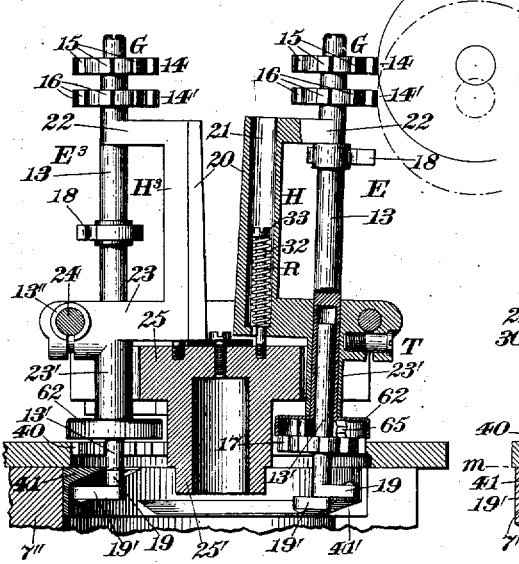
Figure 59:
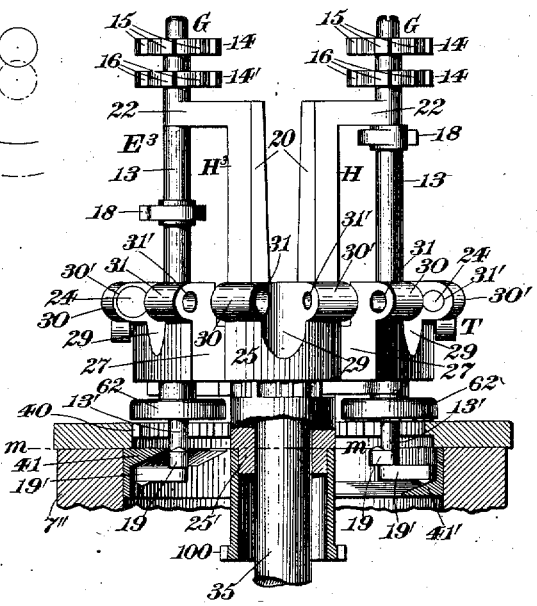

In the accompanying drawings Figure 1 is a plan view of a machine in which my invention is, for purposes of illustration, shown embodied, the impression-device carriers being in their normal, ineffective positions and the platen-carriage in a position midway of its two extreme positions, and a portion of the feed mechanism for the platen-carriage being shown in full and dotted lines. Fig. 2 is a perspective view of a portion of the machine, said figure being designed more particularly to illustrate the means for, and method of, operating the platen-carriage and subsidiary devices. Fig. 3 is a sectional front elevation of a portion of the machine, parts thereof being broken away, said figure showing, in part, a platen-carriage-supporting frame, means for normally maintaining said frame in one of its extreme positions transversely of the path of movement of the platen-carriage, and means for shifting said frame to the other of its extreme positions; the parts shown in this figure being in a position corresponding to the position of like parts in Fig. 1, and said figure also showing the platen-carriage-retracting device in dotted lines. Fig. 3ª is a sectional side view of a portion of a form of platen-carriage-retracting device which may be employed. Fig. 4 is a central vertical longitudinal section of the machine, on a relatively large scale as compared with that of Fig. 1, the platen-carriage and supporting-frame being shown in the positions they occupy preparatory to the formation of an impression, certain parts being removed. Fig. 5 is a rear elevation of a portion of the machine on the same scale as that of Fig. 4 and as seen from the right-hand end in Fig. 6, parts thereof being broken away to illustrate more clearly certain details. In this figure only portions of the supporting-frame and feed mechanism of the platen-carriage are shown, and the parts are in positions corresponding to the positions of like parts in Fig. 4. Fig. 6 is an end view of a portion of the machine, as seen from the left in Fig. 5, the platen-carriage-supporting frame being shown in its retracted or lower-case position, and the platen-carriage and platen-controlling devices being shown in their normal, operative relations. In this figure the carriage-releaser, which controls the feed mechanism and carriage, is shown in the position occupied when the feed mechanism is in effective relation with the platen-carriage and the feed-lever for the platen is shown in its normal, retracted position. Fig. 7 is a view similar to Fig. 6, showing the platen-carriage-supporting frame in its advanced or upper-case position and the carriage-releaser and its actuating devices in the positions they occupy when the feed mechanism and carriage are disconnected thereby. Fig. 8 is an end view similar to Figs. 6 and 7, showing the platen-carriage-supporting frame in its advanced or upper-case position and the carriage-releasing devices in the position thereof shown in Fig. 6, this figure being intended to illustrate the manner in which the platen is rotated a space-distance by the operation of the rock-shaft and subsidiary devices that control the carriage-releaser; the carriage in this figure being assumed to be in its extreme, retracted position and the circuit which controls the solenoid that operates the rock-shaft being closed, the core of said solenoid being shown in its advanced position and as having moved the rock-shaft and feed-lever actuator carried thereby sufficiently to throw the feed-lever into its extreme, advanced position. Fig. 9 is a central longitudinal section of the platen and platen-carriage and also shows some of the subsidiary devices partially in elevation and partially in section. Fig. 10 is an end view, partially in section, of the platen-carriage and platen as seen from the left in Fig. 9, said figure showing the feed-lever in its extreme, retracted position and showing the eccentric-stop, which regulates the throw of the feed-lever, in position for insuring the maximum throw of said lever. Fig. 11 is an end view similar to Fig. 10, showing the feed-lever eccentric-stop in position for effecting the minimum throw of said feed-lever. Fig. 12 is an end view of the platen-carriage and platen, as seen from the left in Fig. 9, showing the feed-lever in its extreme, advanced position. Fig. 13 is a sectional detail, taken on the plane of dotted line b—b, Fig. 12, of the eccentric-stop and carrier therefor. Fig. 14 is a cross-sectional view of a portion of the platen, the feed-roll, and the carrier for said feed-roll. Fig. 15 is a sectional side elevation of a portion of a keyboard, showing the spacer-bar and a series of finger-keys, together with the levers which are actuated by the finger-keys and control the operations of the shaft-starters or latches for the impression-device carrier, one of the key-stem bearings being shown in section for the purpose of illustrating the device for effecting the return movement of the key after the depression thereof. Fig. 16 is a plan view of the parts shown in Fig. 15. Fig. 17 is a front elevation of the parts shown in Figs. 15 and 16, as seen from the left in Fig. 15, the latch-tripping devices being shown in dotted lines. Fig. 18 is a cross-sectional view of the parts shown in Fig. 15, said section being taken on the plane of the dotted line c—c, Fig. 15, looking toward the right in said figure. Fig. 19 is a plan view of one of the parti-circular latch-frames in which one row or tier of shaft-starting latches is supported and guided, said figure showing the radially-disposed guideways for the latches. Fig. 20 is a front view of the latch-frames in their assembled positions and with the latches removed, this figure being drawn in projection with Fig. 19. Fig. 21 is a plan view of a portion of one of the latch-frames, showing one of the latches in its normal, ineffective, or retracted position thereon, said figure also showing an escapement and actuating spring for said latch. Fig. 22 is a front end view of the latch-frame and latch shown in Fig. 21. Fig. 23 is a cross-section of the latch-frame, taken on the plane of the dotted line d—d, Fig. 21, looking toward the left in said figure and showing the latch in its normal, retracted position and locked in this position by the escapement, which escapement is in the proper position to have its catch released from the catch of the latch by means of the trip-rod of the key mechanism. Fig. 24 is a view similar to Fig. 23, showing the latch in the same position and the latch-holding escapement in the position it occupies during the first stage of its latch-releasing movement. Fig. 25 is a sectional view similar to Figs. 23 and 24, showing the latch in its advanced or effective position, the detent-catch of the latch-holding escapement having been released from the catch of the latch, and said latch-catch having been engaged by the holding-catch of the escapement, this being the position the latch devices occupy after the finger-key, which is in connection with and controls the operation of said latch, is operated to start the effective movement of the impression-device carrier-shaft controlled by this latch. Fig. 26 is a sectional view similar to Figs. 23, 24, and 25, showing the latch thrown backward to and slightly beyond the normal or inoperative position shown in Fig. 23. In this figure the auxiliary or safety catch of the escapement is in engagement with the latch-catch and holds the latch in this position until the detent-catch of the escapement is brought into position by the reactive movement of said escapement for engaging the catch of the latch, when the parts will reassume the positions shown in Fig. 23. Fig. 27 is a cross-section of the latch-frame, taken on the plane of the dotted line e—e, Fig. 21, looking toward the left in said figure and showing the latch, the latch-escapement, and the escapement-detent or device for holding the latch and escapement in operative relation in their assembled positions in the latch-frame, said parts being illustrated in a position corresponding to the position of some of such parts in Fig. 23. Figs. 28 and 29 are plan and side views, respectively, of the escapement-detent or holding device shown in Fig. 27. Figs. 30 and 31 are plan and side views, respectively, of the latch-escapement. Figs. 32 and 33 are plan and side views, respectively, of the latch proper. Fig. 34 is a sectional plan view of a portion of the keyboard, showing the relative arrangement of the successive sets of actuating-connectors or key-levers and tripping-rods between the successive sets of latches and the finger-keys of the keyboard, the latches not being illustrated and the finger-keys being represented by dotted lines. Fig. 35 is a plan view, partially in section, of the primary feed device of the compound rotary feed mechanism, said figure showing the driving-pinion, the rotative pin-carrying member in mesh with said driving-pinion, and the settable pins or secondary feed-device actuators carried by said member, and also showing, in dotted lines, the orbitally-movable shaft-pinion of the impression-device carrier, the internal gear meshing with, and controlling the rotative movement of, said pinion, and the reciprocatory pin-actuating member located in position to be actuated by said pinion during the orbital and rotative movements thereof. This figure shows the settable pins or actuators, the pinion, and the reciprocatory member actuated by said pinion in their normal, ineffective positions, the pinion being illustrated as just approaching the point where it actuates the reciprocatory member. Fig. 36 is a view similar to Fig. 35, showing the pinion of the impression-device carrier-shaft in engagement with, and as having actuated the reciprocatory member, which member is shown, in dotted lines, as having engaged and shifted one of the pins or actuators into its extreme, effective position. This figure also shows, in plan view, the resetting-cam for the actuating-pins. Fig. 37 is a cross-sectional view, taken on the plane of the line f—f, Fig. 35, of the pin-carrying member, the driving-wheel in mesh with said member being omitted, said figure showing the parts in the same positions as like parts in Fig. 35. Fig. 38 is a cross-sectional view, taken on the plane of the line corresponding to the dotted line $g$—$g$, Fig. 36, looking in the direction in which the said resetting cam appears and showing the parts illustrated in Fig. 36 in positions corresponding to their positions in that figure and also showing the internal gear and reciprocatory pin-shifting member in full lines and partially in section. Fig. 39 is a cross-sectional view, taken on the plane of the line corresponding to the dotted line $h$—$h$, Fig. 36, of a portion of the pin-carrying member of the primary feed device and showing one of the settable pins or actuators and the detent device for holding the pin in either of its two extreme positions. This figure shows the pin in its normal, ineffective position. Fig. 40 is a view similar to Fig. 39, of the same part, showing the settable pin in its extreme, effective position, or in position for engaging and operating the actuating member of the secondary feed device. Fig. 41 is a cross-sectional view of a portion of the machine, taken on the plane of the line corresponding to the dotted line $i$—$i$, Fig. 4, and showing the compound feed mechanism in plan view, and also showing the internal gear which controls the rotative movement of the pinion for the impression-device carrier-shaft, which pinion in turn controls the effective action of the primary feed device of said mechanism. Fig. 42 is a sectional side elevation of those parts shown in Fig. 41, and also shows the feed-wheel and a portion of the platen-carriage and rack operated by said feed-wheel. Figs. 43, 44, and 45 are plan, side, and sectional views, respectively, of the toothed rim of the pin-carrying member of the primary feed device shown in Figs. 35 to 38, inclusive. Figs. 46, 47, and 48 are plan, side and cross-sectional views, respectively, of the radially grooved or recessed middle part or hub and web of the pin-carrying member of the primary feed device, to which part the toothed rim is removably secured, as indicated in Fig. 35. Fig. 49 is a plan view of the circuit of detent devices for holding the settable pins or shiftable actuators of the pin-carrying member of the primary feed device, this figure simply illustrating the relative positions of said detent devices when the parts are assembled as shown in Figs. 35 and 37. Figs. 50, 51, 52 and 53, are plan, side and left and right hand end, views of a settable pin or actuator. Figs. 54 and 55 are end and side views, respectively, of one of the detent members shown in Fig. 49. Figs. 56, 57, 58, and 59 are sectional elevations of a portion of the impression mechanism of the machine, showing, respectively, two orbital and rotarially-movable impression-device carriers in four successive positions thereof. In these figures, Fig. 56 shows said impression-device carriers and the impression devices in their normal, ineffective positions, with the driving-pinions of the shafts of the impression-device carriers out of mesh with the internal driving gear, for said pinions. Fig. 57 shows one of the impression-device carrier-shafts in the position it occupies when the shaft-starting latch shown in dotted lines in said figure has been protruded into the path of the starting-arm and has started said shaft in rotation and has turned the shaft sufficiently to bring the pinion-shifting member into engagement with the pinion-shifting cam to shift the pinion into mesh with the internal gear. Fig. 58 shows said impression-device carrier at its impression position, it having been advanced to effect an impression, the relation of the platen to the impression-device carriers being represented by parti-circular full and dotted lines. Fig. 59 shows the impression-device carrier returned to its normal ineffective position. Fig. 60 is a plan view of the turret or rotatable member on which the impression-device carriers are supported. Fig. 61 is a side view of the turret or rotatable member. Fig. 62 is a cross-sectional view of the turret or rotatable member, taken on the plane of the dotted line $j$—$j$, Fig. 60. Fig. 63 is a similar cross-sectional view of the turret or rotatable member, taken on the plane of the dotted line $k$—$k$, Fig. 60, and showing the parts at the left of said dotted line. Fig. 64, 65, and 66 are plan, side, and edge views, respectively, of a carrier such as shown in Figs. 56 to 59, inclusive, for the shaft of an impression-device carrier. Fig. 67 is a sectional plan view, on a relatively large scale, in full and dotted lines, of the two-part impression-device carrier-shaft, the pinion carried by one of said parts, the pinion-casing or hood carried by the other of said parts, and the detent device for holding the pinion in its shifted position with respect to the casing. Fig. 68 is a side elevation, partially in section, of the parts shown in full and dotted lines in Fig. 67, and shows the pinion held in its normal, ineffective position, or in the position shown in Fig. 56. Fig. 69 is a view similar to Fig. 68, showing the parts in the position illustrated in Fig. 58. Fig. 70 is a sectional side elevation of the parts shown in Fig. 69, illustrating the said parts in the same position, but as seen from the right in said Fig. 69. Fig. 71 is a sectional plan view of the pinion-incasing end of the impression-device carrier-shaft. Fig. 72 is a side or elevational view of the part shown in Fig. 71. Fig. 73 is a side view similar to Fig. 72, of the part shown in Fig. 71 as seen from the right in said Fig. 72, a portion of the rim of the pinion-incasing hood being broken away to show more clearly the catch member of the detent device. Fig. 74 is a plan view of the pinion-carrying member of the two-part impression-device carrier-shaft. Fig. 75 is a sectional side elevation of the pinion-carrying member of the two-part impression-device carrier-shaft.

Fig. 76 is a view similar to Fig. 75, of a portion of the pinion-carrying member, as seen from the right in said Fig. 75. Fig. 77 is a cross-sectional view of the parts shown in Fig. 67, said section being taken on the plane of the dotted line $l—l$, Fig. 67, and showing said parts in positions thereof illustrated in Fig. 69. Figs. 78 and 79 are plan and edge views, respectively, of the parti-circular cap which holds the detent of the shaft-pinion in place. Figs. 80 and 81 are plan and side views, respectively, of the bolt member of the detent device. Figs. 82 and 83 are edge and side views, respectively, of the serpentine spring that constitutes the impelling member of the detent device. Fig. 84 is a plan view of a portion of the impression mechanism, said figure showing part of the turret which carries the impression devices and also showing one of the impression-device carriers in a position corresponding to the position thereof shown in Fig. 56, the starting-arm on the shaft of one of the carriers of the impression devices being shown in dotted line in engagement with the latch, also shown in dotted lines which starts the shaft in rotation. Fig. 85 is a cross-sectional view of a portion of the impression mechanism, taken on the plane of the dotted line $k'—k'$, Fig. 57, and shows the detent device for holding the impression-device carrier-shaft normally in the inoperative position shown in Figs. 56 and 84. Fig. 86 is a cross-sectional view of a portion of the impression mechanism, taken on the plane of the dotted line $l\ l'$, Fig. 56, and shows the driving-pinion in the position it occupies when the shaft to which the impression-device carrier is secured is in the position shown in Figs. 84 and 85, the pinion-casing shown in Fig. 85 being removed, said figure also showing a portion of the internal gear, which is adapted for continuing the rotation of the pinion after the movement thereof is started. Fig. 87 is a cross-sectional view of a portion of the impression mechanism, taken on the plane of the dotted line $m—m$, Fig. 59, looking downward and showing the parts in positions corresponding to the positions thereof in Figs. 56 and 84. Figs. 88, 89, 90, and 91 are plan and cross-sectional views corresponding to the plan and cross-sectional views represented by Figs. 84, 85, 86, and 87, respectively, and showing the same parts in positions corresponding to the positions of these parts as illustrated in Fig. 57. Figs. 92, 93, 94, and 95 are plan and closs-sectional views corresponding to the plan and cross-sectional views in Figs. 88, 89, 90, and 91, and show the same parts in positions corresponding to the positions of these parts as illustrated in Fig. 58. Figs. 96, 97, 98, and 99 are plan and cross-sectional views corresponding to the plan and cross-sectional views illustrated in Figs. 92, 93, 94, and 95, and show the same parts in positions corresponding to the positions of these parts as illustrated in Fig. 59. Fig. 100 is a plan view of a portion of the impression mechanism, and shows one form of inking mechanism in its operative relation to the impression devices. Fig. 101 is a diagrammatic top view showing the successive latches for operating one impression-device carrier-shaft, and also showing, in full and dotted lines, five successive positions assumed by the starting-arm of the impression-device carrier-shaft during the orbital and rotary movement of the latter. Fig. 102 is a diagrammatic view illustrating, in full and dotted lines, a multiplicity of positions assumed by one impression-device of the impression-device carrier from the starting of its rotative movement to the completion of its impression movement. Fig. 103 is a diagrammatic view, on a relatively large scale, showing five successive positions of the starting-arm of one impression-device carrier-shaft during its latch-resetting movement.

Similar characters designate like parts in all the figures of the drawings.

In the preferred form thereof (shown) my improved machine comprises in part a framework of a suitable construction for carrying the several mechanisms and details thereof; impression mechanism embodying a movable support or turret; impression devices supported on said turret for diversified movement; means including latch mechanism, keys and connections for indicating and controlling the operation of said impression devices; indicating devices for the impression devices, when the invention is employed as a type-writer; a shiftable platen-carriage-supporting frame; a platen-carriage shiftably supported on said supporting-frame; a platen or work support rotatably supported on the platen-carriage; means for shifting the platen-carriage-supporting frame between two extreme positions with respect to the impression-device carrier; mechanism controlled by the operation of the impression mechanism for feeding the carriage and platen a certain distance immediately succeeding each impression movement of the impression device; means for connecting and disconnecting the feed mechanism and platen-carriage; means for retracting the carriage when disconnected from the feed mechanism; and means for releasing said carriage with respect to the feed mechanism and for effecting the feed movement of the platen, the construction, organization, and operation of all of which will be hereinafter set forth.

The framework of the machine, which may be of any suitable construction for carrying the operative parts, comprises, in the form thereof shown, a box-like frame, or base, which is designated in a general way by B; a supplemental or machine frame, which is designated in a general way by D and is supported on the base or box-like frame B; and other accessories hereinafter more fully described.

The base or box-like frame B preferably comprises the bottom plate 2; the side walls 3 and 4, respectively; front and rear end walls 5 and 6, respectively; and the top plate 7—which is shown having an inclined portion 7' at the forward end thereof—which constitutes the key-plate of the machine, and which also has a series of elongated key-stem bearings 8 in which the stems 9 of the manual keys K are seated and operate, as will be hereinafter more fully described. This top plate 7 also has, near the middle portion thereof, a substantially annular wall 7'', which is shown extending upward from the upper face thereof and forms a support for certain elements of the machine.

The supplemental or machine frame D is shown comprising a parti-circular base portion 12, upon which is supported a series of superimposed latch-frames, (herein shown as six in number, and designated by F, F', F², F³, F⁴, and F⁵, respectively,) and which, being of substantially duplicate construction, may be hereinafter referred to as the "latch-frame" or "frames" F, the inner and outer faces of the superimposed frames being concentric to the center about which the impression-device carriers have their orbital movements, as will be hereinafter described. Each latch-frame has a series of latch-receivers or latch-bearings, which are herein shown as seven in number and are radially disposed with respect to the center about which the impression-device carriers revolve.

Located in the latch-receivers of the successive latch-frames F, F', F², F³, F⁴, and F⁵, are successive sets or series of latch devices, (designated in a general way by J, J', J², J³, J⁴, and J⁵, respectively,) each set comprising, in the form shown, seven corresponding latch devices, the constructions, organizations, and operations of which will be hereinafter fully described in connection with the latch mechanism of the machine. For convenience these latch devices will be hereinafter referred to as the "latch J" or "latches J."

The impression mechanism, per se, comprises, in the preferred form thereof herein shown, one or more impression-device carriers, (herein shown as six in number, and designated in a general way by E, E', E², E³, E⁴, and E⁵, respectively,) which are preferably equidistantly disposed about a common center and are constructed and organized to have a normally-continuous, orbital movement about said common center and an intermittent rotative movement about their individual axes in a manner somewhat similar to that described in the patent hereinbefore referred to.

In contradistinction to the method of operation of the impression devices described in the patent mentioned, the impression-device carriers of the machine herein described are constructed, supported, and organized to have advancing and retracting movements in addition to the rolling actions described in said patent—that is to say, each carrier has a normally-continuous, orbital movement, which is, at a preselected point, converted into a rotary and orbital movement for bringing the impression device selected into the requisite position for making an impression when said carrier arrives at the impression-point of the machine; and in addition to these movements has imparted to it an advancing movement when the carrier brings the selected impression device to its working position. The object of this diversification in the movements of the impression-device carrier is to secure not only the advantageous results due to the rolling actions inherent to the impression-device carrier of the machine described in the patent referred to, but also the advantages of the lever-like blows, thereby especially adapting the present machine, when employed as a type-worker, for the production of what is known as "manifold" work.

In the preferred construction and organization thereof herein shown and described, each carrier of the impression devices is of a disk-like or cylindrical form, as shown at G, is mounted on a shaft consisting, preferably, of two telescoping and splined or equivalently connected members 13 and 13', and is located near the outer end of one shaft member and has, preferably, two independent circuits or series of impression devices, (shown for purposes of illustration as types or characters 15 and 16, respectively). A driving-pinion 17 is carried near the outer end of one shaft member, and a starting-arm 18 is located on one of said members between said pinion and the impression-device carrier in position to be engaged by one of the shaft-starters or latches hereinafter mentioned.

The several shafts of the impression-device carriers E, E', E², E³, E⁴, and E⁵, respectively, are shown relatively equidistantly disposed about a common center and are rotatably mounted in suitable bearings in frames H, H', H², H³, H⁴, and H⁵, respectively, which frames are pivotally supported, as at 13'', upon, and near the outer edge of, a rotatable support or turret, (designated in a general way by T,) and are designed to have a swinging movement imparted to them in a plane crosswise of the plane of rotation of the impression device, or in a direction radial to the axis of the turret.

Each frame, in the preferred form thereof shown, is in the nature of an angular bracket consisting of an upright or standard 20, having a longitudinal recess 21 and also having two laterally-projecting arms 22 and 23, located, respectively, one at each end thereof, which arms have shaft-bearings that are located in axial alinement relatively to, and in substantial parallelism with, the axis of the recess 21 of the standard, the bearing in the arm 23 being preferably elongated, see projection 23', which is shown extending considerably below the pivotal point of said frame.

As before stated each frame is pivotally supported on the turret T near the periphery thereof, as shown most clearly in Figs. 1 and 4 and 56 to 59, inclusive; and as a convenient means for pivotally supporting the frames on said turret, so as to facilitate swinging movements of said frames in planes crosswise of the axis of rotation of the impression-device carrier-shafts carried on said frames, each arm 23 extending from each frame is transversely bored near the outer end thereof to form a pivot-bearing and is shiftably supported, by means of a pivot 24, between the side walls or arms of a corresponding radial recess 27, formed in the periphery of the turret-head 25, as will be understood by reference to the figures referred to in this paragraph and as will be hereinafter more fully described.

The turret-head 25 of the turret T, upon which the several frames are pivotally mounted, is shown somewhat in the nature of a disk having a countersunk middle portion 26 and having the periphery thereof divided by the mentioned radially-disposed, elongated slots or recesses 27 into a series of segments 28, which are notched perimetrically, as shown at 29, intermediate between said elongated slots 27, to form independent sets of frame-supporting arms, each set embodying two arms 30 and 30', respectively, whose faces are substantially parallel, to the contiguous faces of adjacent sets. These arms are transversely bored, as shown at 31 and 31', to receive the pivot 24, which extends through said arms and through the bearing in the arm 23 of the shaft-frame and constitutes the fulcrum-pin upon which said frame swings. The turret and the shaft-frame are clearly shown in Figs. 60 to 63 and 64 to 66, inclusive and respectively.

The turret T, which may be of any suitable construction for carrying the impression devices, &c., comprises, in the form thereof herein shown and described, the turret-head or disk 25, having an axially recessed stem 25' in which is secured the turret-shaft 35, which is journaled in suitable bearings in the bottom plate 2 and top plate 7 of the box-like frame or base B of the machine.

As a means for rotating the turret T, I have shown in Fig. 4, the shaft of said turret provided with a pulley P, which may be driven from any suitable source of power. (Not shown.) It will be obvious, however, that any suitable means may be employed for rotating the turret, and also that the construction of the turret may be variously modified without departure from my invention.

For the purpose of normally holding the impression-device carrier-shafts with their longitudinal axes parallel to the axis of rotation of the turret, and so that the path described by the normally ineffective revolution of said shafts will be concentric to the axis of rotation of the turret, I have provided, in connection with each shaft-frame of the impression mechanism, a retracting device, (designated in a general way by R,) which, in the preferred form thereof shown in the drawings, consists of a retracting-spring 32, seated in the longitudinal recess of the standard 20 of the shaft-frame and bearing at its inner end against a shoulder on said frame, and a tension-regulating screw 33, which is extended through said spring and is screwed at its lower end into the upper face of the turret-head 25, as shown most clearly in Figs. 4, 56 and 58 with the head of said screw bearing against the outer end of and compressing the spring, the tension of said spring being regulated by the adjustment of the screw.

The rolling action or rotative movement of each impression-device carrier is herein shown effected preferably by means of an internally-toothed annulus or internal gear 40, (shown supported on the annular wall 7'' with the pitch-line of its teeth, for the greater portion of its length, concentric to the axis of orbital movement of said carrier.) This internal gear is located with its teeth in such relation to the teeth of the driving-pinion 17 attached to the member 13' of the shaft of each impression-device carrier that said pinion may be shifted into engagement with the internal gear at any desired point in the orbital movement of the shaft carrying said pinion. The pinions 17 of the several-impression device carrier-shafts normally revolve about their orbital axis in a plane parallel to and slightly above said internal gear. This internal gear constitutes a driving member for effecting a continued rotative movement of an impression-device carrier-shaft after the starting of said movement by the shaft-starter or latch, and is instrumental in converting the normal, orbital movement of the impression device on said carrier into a hypo-cycloidal movement.

For the purposes of this invention, and to facilitate the formation of two independent impressions by the operation of one key, each impression-device carrier devices E, E', E², E³, E⁴, and E⁵ is shown as a compound wheel— that is, each wheel or cylinder has two independent, transversely-separated annular flanges 14 and 14', which are shown located one above the other, and are each furnished with a suitable number of impression devices.

The platen or work-carrier of the machine is constructed and organized to have a shifting movement crosswise of the plane of rotation of the wheel or carrier, to bring the same into operative relation with the impression devices of one or the other set of flanges of the wheels, selectively, as will be hereinafter more fully described.

Five of the six carriers or compound wheels shown in the drawings each have fourteen utilized spaces, there being seven impression devices on each flange of said wheel, whereas each flange of the other carrier of the series has six utilized spaces and one "spacer-blank"; thus it will be seen that the entire series of wheels or carriers embody eighty-two impression devices and two spacer-blanks, which, as hereinafter more fully described, are controlled by forty-two keys, each key of the manual controlling two impression-devices or two spacer-blanks.

The starting-arms 18 on the shafts of said impression-device carriers are located in relatively different planes corresponding, respectively, to the different planes of the successive tiers of latches which coöperate with the starting-arms to start the rotative movement of said shafts. In other words, the starting-arm of the shaft of one impression-device carrier, as E, is located in position to be engaged by the latches of one tier of latches—as, for instance, those latches J, supported in the upper latch-frame F; and the starting-arm of the shaft of another impression-device carrier, as E', is located in position to be engaged by the latches J' of another latch-frame, as F', and so on, each impression-device carrier-shaft being controlled, as regards its initial rotative movement, by the latches of a different tier from that which controls the movements of the shafts of the other impression-device carriers. The adjacent latches of each tier are separated from each other by arc distances, corresponding to the arc distances between the impression devices of each circuit, as will be hereinafter more fully described.

Some suitable latch mechanism may be employed in my present machine for coöperating with the starting-arms on the shafts of the impression-device carriers for starting the rotative movement of said shafts during the orbital movements thereof, and therefore, I do not limit myself in the present instance to any special form of mechanism for accomplishing this purpose.

The latch mechanism shown in connection with the impression devices of my present machine, briefly stated, consists of a series of duplicate, superimposed tiers of shaft-starters or latches, tiers J, J', J$^2$, J$^3$, J$^4$, and J$^5$, supported for reciprocatory movement in the latch-frames F, F', F$^2$, F$^3$, F$^4$, and F$^5$, respectively, each tier consisting of a series of latches, which are shown corresponding in number to the number of impression devices on each flange of the impression-device carrier; a suitable keyboard having a series of keys K, corresponding in number to the number of shaft-starters or latches J, and connections or latch-tripping devices (designated in a general way by K',) operatively connecting the separate keys with the respective latches actuable by said keys.

Each shaft-starter or latch-device J, in the preferred form thereof herein shown, comprises a slide or latch proper fitted to have a reciprocatory movement in the latch bearing or groove $f$ (see Figs. 19, 20, and 21) in the latch-frame F; an escapement 56, located in the latch-recess and preferably having three catches 56', 56'', and 56''', located one in advance of the other and adapted one for engaging a catch 57' on and holding the latch-bolt in its normal retracted position and the other for limiting the advancing movement or throw of said latch; a spring 57, located in the latch-recess between the escapement and a projection on the latch-bolt and adapted for throwing the latch-bolt forward to protrude the same into the orbit of the starting-arm of a shaft of an impression-device carrier upon the release of the escapement-catch from said bolt; and a fulcrum support or suitable device for holding the escapement against longitudinal movement in the latch-recess.

The instrumentalities for actuating the escapement to trip the latch consist, in the form thereof herein shown, of a tripping rod or bar 58, supported for reciprocatory movement in an upright 58' of the frame of the machine, with its outer end in engagement with the actuating-arm of the escapement; a key-lever 59 in operative connection with, and adapted for actuating, the tripping-rod; and a reactionary key K in operative connection with, and adapted to be depressed to operate, the key-lever.

As a means for connecting the key-stem 9 of each key K to its respective key-lever, said key-stem—which is seated for reciprocatory movement in the elongated bearing 8, depending from the key-plate 7', as described—terminates considerably above the lower end of said bearing and is furnished with a pin 9' of relatively small diameter, which is fixed in the lower end thereof and extends downward through a relatively small opening 8' in the bottom wall of the bearing 8 and connects with a strap 10, which engages the outer end of the key-lever 59; and as a means for effecting a reactionary movement of such key-stem and key a spiral-spring 10' is provided, which spring surrounds the pin 9' and is seated in the bearing 8 between, and bears at its opposite ends against, the lower end of the key-stem and a shoulder near the lower end of the key-stem bearing, as will be readily understood by reference to Fig. 15 of the drawings. This spring not only constitutes a reactionary device for the key, but also cushions the working stroke of said key and thereby relieves the key-levers and latch connections, to some extent, from the injurious effects of unequally-applied blows, and is also conducive to a noiseless operation of the keys.

The operation of the latch-operating mechanism is, in effect, somewhat similar to that described in the patent hereinbefore referred to; and inasmuch as my present invention is not confined to any particular form of latch-operating mechanism, a more detailed description of the construction and organization of the parts constituting the latch-operating mechanism is deemed unnecessary to a full understanding of this feature; and in describing the operation of this feature of the machine it will suffice to say that when a selected key is struck, the outer end of the key-lever 59, which is shown fulcrumed at 59', is depressed, throwing the inner end thereof upward, which lifts the tripping rod or bar 58, and, through it, releases one of the escapement-catches from the latch-catch, whereupon the latch-actuating spring effects a working stroke of said latch and protrudes the same into the orbit of the starting-arm of one of the shafts carrying the impression devices, which will be readily understood by a comparison of Figs. 1, 4, 15 to 18 inclusive, and Figs. 56, 84, and 88.

In the operation of the impression devices it is necessary in the organization of mechanism herein shown, that the pinion 17 on the shaft of the impression-device carrier E shall be thrown into engagement with the internal gear 40 substantially simultaneously with the inception of the rotative movement of the impression-device carrier and shall be thrown out of engagement with said internal gear as soon as possible after an impression movement of an impression device has been effected; and any suitable mechanism or devices adapted for shifting the pinion 17 into and out of operative engagement with the internal gear 40 at the requisite points, respectively, in the orbital movement of said impression device carrier may be employed within the scope and limits of this invention.

One form of mechanism for shifting the driving-pinion 17 into and out of operative engagement with the internal gear 40 is shown in Figs. 4, 56, 57, 58, 59 87, 91, 95, and 99 of the drawings, and consists of two angularly-disposed arms 19 and 19' on the lower end of shaft member 13' and two oppositely-disposed arm-actuating cam-faces 41 and 41', (herein shown located below the internal gear at different points in the circumference thereof, and constituting parts of the annular wall 7" of the box-like frame B,) said cams 41 and 41' being located upon the inner face of said wall 7" within the path of movement of the arms 19 and 19'. The cam 41—which, in connection with the arm 19 of the shaft member 13' acts to shift the pinion 17 into mesh with the internal gear 40—is shown located below the latch-frames F, and will be of sufficient length to intersect the vertical planes of all the latches, it being in position to engage the arm 19 when the shaft is partially rotated on its own axis, which may be effected by the protrusion of any latch of the series into the orbit of the starting-arm 18 of said shaft; and the cam 41' will be so located as to engage the arm 19' and throw the pinion 17 out of mesh with the internal gear 40 immediately after the shaft passes the impression-point of the machine.

The movements of the starting-arm, itself, during the impression operation are illustrated in Fig. 101, in which the lines 160 and 161 represent the hypocycloidal path traced by the end of said arm during the first and second complete rotations, respectively, of the shaft, the corresponding movements of the impression-device carrier being similarly shown in Fig. 102. In these figures 35 designates the shaft of the turret; 46 the orbit of the impression-device carrier; and 47 the normal, orbital path of the end of the starting-arm. The impression-device circle, this being a circle is also indicated just circumscribing the impression devices on one carrier; and the line 50 is the impression-device path—that is, a circle circumscribing the impression-device circles of all the impression-device carriers.

The latches J in each tier are individually designated by a numeral prefix, as 1J, 2J, and so on, up to 7J in regular order from the first to the last of the series, (see Fig. 101,) the corresponding impression-devices on each flange of each impression-device carrier are individually designated by a corresponding numeral prefix, as 1L, 2L, up to 7L. The latches 1J, 2J, &c., of each tier of latches are intended to control the selections of those impression devices of each carrier having a corresponding numeral prefix; or in other words the latch 1J will, when protruded into the orbit of the starting-arm attached to the shaft member 13, start the rotative movement of the shaft at such a point in the orbital movement thereof as will bring the impression-device 1L into the requisite position at the requisite time for making an impression, and so on throughout the entire series of latches and impression-devices.

To select one impression device to the exclusion of the other impression devices, it may be assumed that the latch 1J is, through the operation of a finger-key and connected latch-operating devices, protruded into the orbit 47 (see Fig. 103) of the starting-arm 18 of one of the carrier-shafts, said shaft having a continuous orbital movement; and when this has been done the arm 18 will, when in juxtaposition to the latch 1J, engage the outer end of said latch, as shown in this figure, and thus begin the rotative movement of the shaft at that point in the orbital movement thereof which will insure the accurate positioning, at the proper time, of the impression device 1J, on the carrier to make an impression, said latch being located the requisite arc distance from the impression-point of the machine to insure the proper positioning of the selected impression device 1L when the said device arrives at the impression-point of the machine. Thus it will be seen that the latch 1J, for instance, may start the rotative movement of the impression device carrier shaft at such a distance from the impression-point of the machine that the impression-device 1L, selected, may make one complete revolution about the axis of the shaft before coming in juxtaposition to the impression-point of the machine, or it may make more than one or less than one complete revolution to bring the same into proper position to make the impression. This depends, of course, upon the location of the latch and the distance from the impression-point at which the orbital movement of the impression device it transformed into a hypocycloidal movement.

It will be seen that upon the beginning of the rotative movement of the impression-device carrier-shaft the pinion-shifting arm 19 is brought into engagement with the cam 41, which shifts the pinion into mesh with the internal gear 40, which continues the rotation of said shaft and converts the orbital movement of the impression-device into a hypocycloidal movement. This method of selecting one impression device upon a carrier and effecting an impression thereof to the exclusion of the other impression devices is more fully described in the patent hereinbefore referred to, and in Patent No. 438,724, dated October 21, 1890, to which reference may be had for a more complete description, if desired, of the method whereby this result is effected.

In contradistinction to the operation of the impression-device carrier described in the patents referred to, each impression-device carrier in my present machine has, in addition to the rolling action described in said patents, an advancing—preferably a radial—impression movement when the same arrives in juxtaposition to the impression-point. For this purpose the impression-device carriers, as before stated, are supported upon frames pivotally mounted for radial swinging movement upon the turret; and suitable means, hereinafter described, are provided for tipping each frame laterally during the orbital and rotary movement of the impression-device carrier carried by such frame when an impression device on said carrier is in proper position for making the impression. This advancing impression movement of the impression device may be effected in many different ways and by various forms of devices; and this invention is not limited to the devices shown, but includes within its scope any means for imparting advancing and retracting movements to the impression-device carrier at the desired point in its path of movement. As a simple means for accomplishing this result I have provided two intermeshing-gear elements, one of which is shown as the driving-pinion 17 of the type-wheel carrier, and the other of which is shown (see Figs. 41 and 94) as the internal gear 40, having an offset tooth portion 40' at that point in the circumference thereof which is in juxtaposition to, or in substantial radial alinement with, the impression-point $p$ of the machine—or, in other words, two or more of the teeth of the internal gear have their pitch-lines located somewhat in advance, in a radial direction, of the pitch-line of the other teeth of said gear. This offset portion 40' acts somewhat after the manner of a cam for throwing the driving-pinion 17 of the impression-device carrier-shaft inward with a sudden movement when the teeth of said pinion, during the rolling movement thereof, ride over the teeth of the offset, and the shaft frame being fulcrumed at a point intermediate the pinion 17 and the impression-device carrier E this movement of said pinion toward the axis of orbital movement thereof throws the said carrier outward as said pinion rides over the offset, thus causing an impression device on the carrier to make a sudden impression movement.

In practice the fulcrum of the shaft-frame will be so located with respect to the driving-pinion and impression-device carrier that a short inward movement of the driving-pinion will effect a relatively long impression-stroke movement to said carrier.

Immediately after the impression-device carrier has made its impression-stroke the retracting arm 19' on the shaft of said carrier is thrown, by the continued rotative movement of said shaft, into engagement with the cam 41', which lifts said arm, together with the shiftable shaft member 13', and throws the pinion 17, carried on said shiftable member, out of mesh with the internal gear, returning the parts to their normal, ineffective positions.

A detent (designated in a general way by M, Fig. 67) is provided, the construction and organization of which will be hereinafter more fully described, for holding the driving-pinion 17 in its operative and inoperative positions with relation to the internal gear.

As a convenient means for arresting the rotation of the impression-device carrier, after the impression movement thereof has been consummated and at such point in the orbital movement thereof as will bring the starting-arm 18 to rest in its normal position or in a position to insure its engagement with a projected latch, I have provided, in connection with said impression-device carrier-shaft, a self-acting, reciprocatory detent device, (designated in a general way by C,) which is constructed, organized, and adapted for controlling the impression-device carrier after the impression movement thereof and after the driving-pinion 17 has been thrown out of mesh with the internal gear, and is also adapted for arresting the rotative movement of said impression-device carrier-shaft when the starting-arm 18 thereof arrives at its normal position, and to do this without interfering with the orbital movement of said carrier. This detent device, in the preferred form thereof, (shown most clearly in Figs. 85, 89, 93, and 97,) is in the nature of a compound reactionary detent consisting of two detent members 60 and 61, respectively, the member 60 of which is carried by, and is pivoted to, the other member 61 intermediate the ends thereof, and said other member 61 of which is pivoted at the outer end thereof to the turret-head 25; a spring-arm 61', connected at its outer end to the outer pivoted end of the carrying member 61 and having its inner end in engagement with a pin or projection on the turret-stem 25', which spring-arm 61' is adapted for normally holding the inner end of the member 61 in position to intersect the path of movement of a projection or pin 17' on the pinion 17; and a spring 60', connected with the pivoted end of the carrier-detent member 60, which spring is in engagement at its inner end with a pin or projection on the turret-stem 25' and is adapted for normally holding the free end of said member 60 in a position intersecting the path of rotative movement of said stop-pin 17'. The inner end of the member 61 is furnished with a projection 61'', which is in position to engage the member 60 at one side of the pivotal point thereof and limit the inward movement of the free end of said member 60, as will be understood by a comparison of Figs. 93 and 97.

The stop-pin 17' is preferably carried on the upper face of the pinion 17 and extends through an opening 62'' in a cap, which constitutes a casing for the pinion when the same is in its normal, ineffective position relatively to the internal gear 40. This stop-pin has a portion of its periphery cut away at opposing sides to correspond to the curvature of the stop-engaging face of the projection 61'', which face is in the nature of a cam and is adapted to coact with the stop for holding the pinion and connected parts in their normal, ineffective positions, as shown in Fig. 85.

The operation of the self-acting compound detent device is clearly illustrated in Figs. 85, 89, 93, and 97, which illustrate succeeding positions of the stop-pin and detent device during one cycle of movements of the impression-device carrier. In Fig. 85 the stop-pin is shown engaged between the working-faces or holding-faces of the two members 60 and 61 of the detent device. In Fig. 89 the shaft of the impression-device carrier is shown rotated sufficiently to release the stop-pin from the position shown in Fig. 85, said stop-pin being shown advanced to a point in juxtaposition to the extreme, inner end of the member 61 of the detent. During this movement of the stop-pin the inner end of the detent member 61 is forced outward from the position shown in Fig. 85 to that shown in Fig. 89, which throws the inner end of the member 60 inward, in consequence of the greater resistance of the spring 61' over that of the spring 60'. During a further advancing movement of the stop-pin from the position shown in Fig. 89 the stop-pin is carried successively to the positions shown in Figs. 93 and 97, and upon arriving at the position shown in Fig. 97—which it does immediately after the impression movement of the impression-device carrier is effected—it engages the inner end of the detent member 60, forcing the same outward sufficiently to allow the stop-pin to enter between the stop-engaging faces of the two members 60 and 61, where it is brought to rest (in the normal position shown in Fig. 85) with a slight vibratory action—due to the resilient actions of the two members 60 and 61.

In machines of this class it is necessary for practical operation to rotate the turret at a very high rate of speed, and in consequence of the momentum attained by the impression devices at the time that they arrive at the impression-point considerable difficulty has been experienced in providing means for arresting the rotative movement of the impression-device carrier-shafts and bringing them to a state of rest in their normal, ineffective positions with their starting-arms in the requisite position to engage their respective latches, and to do this with precision and without injury to the parts by arresting the rotative movement too abruptly. By the provision of a self-acting, resilient, compound detent device such as hereinbefore described, I am enabled to arrest the rotative movement of the impression-device carrier-shaft and bring the same to a state of rest in the requisite, normal position unabruptly and without injury to the parts, said detent engaging a stop of the impression-device carrier-shaft and exerting a gradually-increasing resistance until said stop reaches the normal position shown in Fig. 85, where it will have a gradually-decreasing vibratory movement until brought to a state of rest in this position, as will be understood by reference to Figs. 97 and 85 of the drawings.

The two stop-pin-engaging faces of the two detent members 60 and 61 are so disposed with relation to each other as to form a V-shaped bearing or seat for centering the stop-pin 17', said faces acting upon opposite sides of the stop-pin and holding the same with a yielding pressure, which pressure is of sufficient magnitude to prevent the accidental unseating of the stop-pin.

The detent device for holding the pinion 17 in its two extreme positions—in or out of mesh with the internal gear—comprises, in the form thereof shown most clearly in Figs. 67 to 83, inclusive, a parti-circular annular bolt or slide 63, seated for shifting movement in a corresponding slideway 63', formed in the upper face of the pinion 17; a serpentine spring 64, seated in said slideway and bearing against the detent-bolt; and a catch-plate 65 on the pinion casing or cover 62, extending through an opening in the pinion 17 in position to be engaged by the sliding bolt of the detent device. This catch-plate has two catches 65' and 65'', located one above the other in positions corresponding to the inoperative, and operative positions, respectively, of the pinion relatively to the internal gear, said catches being shown somewhat V-shaped, and the detent-bolt having a similarly-shaped end 63'', adapted to engage in said catches, the inclination of the cam-like face of the working end of the bolt being such as to facilitate the retractive movement of the detent-bolt when the member 13', which carries the pinion, is shifted longitudinally by means of the cams 41 and 41' and arms 19 and 19', as hereinbefore described. The detent-bolt is held in position in the slideway of the pinion by a suitable cap 66, secured to the pinion by a screw 66', which extends through an elongated opening 63'' in said bolt, as will be understood by reference to Figs. 67 and 77 of the drawings.

The starting-arm 18 in the normal or idle position thereof (shown most clearly in Fig. 103) has its working end in advance of, or oblique to, a radial line 49, intersecting the axis of the impression-device carrier-shaft and the axis of the turret and will, immediately after its engagement with the latch that starts the rotative movement of said shaft, act somewhat after the manner of a toggle-joint to push back the latch as described in Patent No. 438,724, hereinbefore referred to. Thus it will be seen that when a latch is once protruded into the orbit 47 of the starting-arm, said latch will be automatically returned by the toggle action of the starting-arm immediately after, and not before, it has performed its function of starting the rotative movement of said shaft.

When the machine is employed as a typewriter and the impression-device carriers are equipped with type, to secure the best results in printing it is important that the type having the character to be printed be inked after the selection, and immediately before the printing of, such character; and for this purpose I have provided an inking apparatus comprehending a series of ink-rolls, which are located out of the normal, orbital path of the type-carriers and against which the type-character is forced after the selection of such type-character, which inking apparatus will be hereinafter more fully described.

In the preferred form thereof herein shown and described the platen, which is designated in a general way by N and which has novel characteristics that will be hereinafter fully described, is rotatably mounted upon a suitable platen-carriage, (designated in a general way by N',) which in turn is supported for reciprocatory movement in a plane corresponding to the plane of rotation of the impression-device carrier.

The platen-carriage-supporting frame (designated in a general way by O) is supported to have a shifting movement in a plane substantially parallel to the axis of rotation of the impression-device carrier, or in a direction crosswise of the path of movement of said carrier, and is also supported in such a manner as to traverse a curved path during such shifting movement; and means are provided, as will be hereinafter more fully described, whereby said platen-carriage-supporting frame may be adjusted to set the impression-face of the platen at different selected distances within the range of movement of the type-carrier.

The platen N, which is shown of tubular form, is rotatably supported upon a rod 67 between the end plates 68 and 68' of the platen-carriage, the said rod extending entirely through the platen and end plates of the carriage and being fixed at opposite ends thereof to the uprights 80 and 80' at opposite ends of the platen-carriage-supporting frame O. This rod, which constitutes the guide-rod and support for the platen-carriage and platen N, is coincident with the axis of the platen and is preferably constructed to constitute one member of a dash-pot device for cushioning the retractive stroke or movement of the platen and platen-carriage. For this purpose this rod has at one end thereof (shown as the right-hand end in Fig. 1) an enlarged, elongated portion 67', which is of less diameter than the internal diameter of the platen and which extends into one end of said platen, as shown most clearly in Fig. 9, and is adapted to enter, upon the retractive movement of the platen, a dash-pot cylinder 69, which is shown fixed to, and extending into, the opposite end of the platen and which is of an internal diameter corresponding substantially to the external diameter of said enlarged portion or plunger 67'.

For the convenient operation of the dashpot comprised in the two members 67' and 69—that is, the plunger and the dash-pot cylinder—the platen has an axial recess of considerably greater diameter than the diameter of either the plunger or cylinder to form a convenient chamber for the operation of the dash-pot, the plunger-formative end of the rod 67 being extended through a bushing 67'', fitted into the end of the tubular platen, as shown in Fig. 9; and the dash-pot cylinder is journaled upon a tubular bearing 69', through which the opposite reduced end of the rod 67 extends, and which tubular bearing is fixed to the end plate 68' of the platen-carriage, the perimeter of the dash-pot cylinder being supported from the interior wall of the platen, preferably by a sleeve 69'', as shown.

In practice the opposite ends of the platen may be hermetically sealed by bushings to prevent the escape of air from the interior of the chamber, which chamber is designated by 70.

The two dash-pot members 67' and 69 are so located with relation to each other and are of such length that the plunger member 67' will, upon the retractive movement of the carriage and platen, enter the dash-pot cylinder 69 just before the carriage arrives at the end of its retractive stroke, thus compressing the air contained in the dash-pot cylinder and cushioning the retractive stroke of the platen, said dash-pot as a whole performing its function in substantially the same manner as the dash-pots employed in connection with engines, &c.

I do not limit myself to the particular construction and organization of dash-pot illustrated in the drawings, as other mechanism may be employed as a substitute therefor without departure from this invention.

The platen N is provided at one end thereof with a feed-wheel or ratchet-wheel 71, of suitable construction, whose axis is coincident with the axis of the platen-supporting rod 67; and as a means for effecting a rotative feed movement of the platen I have provided a feed device, which, in the form thereof shown, consists of a pawl 73, pivotally carried upon a feed-lever 72 near the upper end thereof, said lever being pivotally supported upon the platen-supporting rod 67 at one side of the feed-wheel. By this construction and organization of feed device for the platen the feed-wheel-actuating pawl has a working stroke in a plane concentric to the axis of rotation of the platen, which is advantageous, as the thrust of the working end of the pawl is in a direction coinciding with the orbit of the teeth of the feed-wheel and is in the true circle of rotation of the platen, thereby securing the greatest effective leverage with the least possible applied force.

As a means for retaining the working end of the pawl in yielding engagement with the teeth of the feed-wheel, said pawl has a laterally-projecting, annular flange, which is rotatably supported upon a tubular bearing 72' on the feed-lever, which bearing has its external diameter reduced at the outer end thereof to provide a recess between said bearing and the annular flange of the pawl for the reception of a pawl-actuating spring 74, which spring is shown of spiral form and has one end thereof in engagement with the flange of the pawl and the opposite end thereof in engagement with the feed-lever and tends to rotate the pawl upon its axis in a direction requisite to maintain the working end of said pawl in effective relation with the teeth of the feed-wheel, a screw 74' being shown as extending through the flange or sleeve of the pawl and into the bearing of the feed-lever to hold the pawl in place, the head of said screw being diametrically reduced to constitute a bearing for the outer end of said pawl-sleeve.

It will be obvious that the means for retaining the pawl in operative relation with the feed-wheel may be modified without departure from this invention.

For the purpose of regulating the effective throw of the feed-lever said feed-lever is provided at one side near the lower end thereof with a stop-arm 75, and a stop device or feed-movement limiter (designated in a general way by Q) is mounted on the end plate of the platen-carriage in the path of movement of said stop-arm. This feed-movement limiter is shown in the nature of an eccentric-stop consisting of a disk 76, (see Figs. 10 to 13, inclusive,) having an ecentrically-disposed hub 76', journaled in a bearing formed in a carrier-plate 77, fixed to the outer face of the end plate of the platen-carriage. The outer end of said stop-disk hub is furnished with a head by means of which the disk may be rotated to increase or decrease the throw of the feed-lever, as will be understood by reference to the figures referred to in this paragraph.

In practice the feed-limiter—owing to its nature—will be hereinafter referred to as the "eccentric-stop," which will preferably be adjustable between two extreme positions, one of which positions will facilitate a "one-space" movement of the feed-lever, and the other of which positions thereof will permit a "two-space" feed movement of the feed-lever; and as a means for holding the eccentric-stop in either of its adjusted positions the disk 76 of the eccentric-stop is provided on one face thereof with the pin or projection 78, adapted to enter, selectively, one of two oppositely-disposed recesses 78', formed in the adjacent face of the carrier-plate 77; and a push-spring 79 is provided for holding the projection 78 in one or the other of the recesses 78', said spring abutting at one of its ends against a shoulder on the hub 76' and at its opposite end against the outer face of the end plate of the carriage, as will be understood by reference to Fig. 13.

In Fig. 10 of the drawings the feed-movement limiter or eccentric-stop Q is shown adjusted in such relation to the stop-arm of the feed-lever as to secure the maximum throw to the feed-lever, whereas in Fig. 11 said eccentric-stop is shown adjusted to secure the minimum throw to said feed-lever.

As a means for preventing the accidental retractive movement of the platen I have provided a stop-pawl 79', which is pivotally supported intermediate the ends thereof on the carriage, one end of said pawl being rigid and having a cam-faced projection, which normally engages a tooth of the feed-wheel, and the opposite end of said pawl constituting a resilient spring-arm for maintaining the working end of the pawl in engagement with the teeth of the feed-wheel, the free end of said spring-arm having a bearing engagement with a projection on the platen-carriage, as will be readily understood by reference to Fig. 11 of the drawings.

The platen-feed lever has at the lower end thereof an arm 72", located in position to be operated by the feed-lever-actuating devices, as will be hereinafter fully described.

The platen-carriage in my present machine has a longitudinal, step-by-step feed movement from right to left, and is provided with a rotatable platen and a suitable friction-roller for holding the work, and is also provided with devices whereby the platen may be rotated to feed the work a line-space distance for impressing the successive lines, but the carriage and platen in themselves differ materially in construction and organization from other devices of this kind in that the carriage, in connection with its feeding and accessory apparatus, is organized to have an automatic return movement and to automatically feed the work during such return movement; the means for effecting these results will be hereinafter fully described.

The platen-carriage N', in the form thereof herein shown and described, is in the nature of a rectangular, oblong frame and comprises the two end plates 68 and 68', through which the supporting-rod 67 extends, and the rear wall 81 rigidly connecting these plates and longitudinally grooved, as shown at 81', to receive the gib 82 on the upper end of the platen-carriage-supporting frame, which gib constitutes a guide for holding the platen-carriage in proper working position and for guiding said carriage during the longitudinal movements thereof. The rear wall 81 of the platen-carriage is shown toothed from end to end thereof at a point below the guide-groove 81' to form a rack 83, which constitutes one of the platen-carriage-feed instrumentalities, as will be hereinafter more fully described.

The platen-carriage-supporting frame—which may be an open framework, as shown in Fig. 3, and of any suitable construction for carrying the operative parts—comprises, in the form thereof herein shown and described, two parallel, horizontal beams 84 and 85, located one above the other, the upper one, 84, of which is of sufficient length to permit the maximum longitudinal movement of the platen-carriage between the extreme ends thereof, and the lower one, 85, of which is slightly less than the width of the base B of the machine and is connected with the beam 84 by inclined bars at opposite ends thereof, as shown in said Fig. 3.

At the opposite ends of the beam 84 are the uprights 80 and 81', respectively, through which are extended the opposite ends of the platen-supporting rod 67, which is shown secured thereto by nuts. These nuts may be tightened up to increase the tensile strain on the rod, the framework—owing to its bow-like construction and resiliency—tending, when the nuts on the ends of the rod 67 are screwed up tight, to exert a longitudinal pull upon the opposite ends of said rod and prevent vibration thereof.

Extending downward from the opposite ends of the lower beam 85 are two circular posts or plungers 86 and 87, which are seated for reciprocatory movement in post-bearings 86' and 87', secured to the bottom plate 2 of the bed B of the machine and terminating at their upper ends in close proximity to the under side of the top plate 7 of said bed, said top plate being recessed, as shown in dotted lines in Fig. 3, to allow the posts to extend through said plate into their respective bearings.

As before described the platen-carriage-supporting frame is shiftable vertically between two extreme positions to bring the platen into operative relation, respectively, with one or the other of the two circuits of impression devices of an impression-device carrier E; and for the purpose of my present invention it is desirable to retain the supporting-frame O in such position that the platen will normally be held in operative relation with the upper circuit of impression devices; and as a means for normally retaining the platen-carriage-supporting frame in its upper position each of the posts or plungers 86 and 87 has the lower end thereof diametrically reduced to provide a spring-receiving space between the periphery thereof and the wall of the bearing in which said post is seated. A spiral-spring 88, which surrounds the lower end of said post and upon which the shoulder thus formed rests, is seated in the bearing and acts as a lifting-spring for normally holding the platen-carriage-supporting frame in its elevated position.

To afford a means for depressing the platen-carriage-supporting frame, or for shifting the same to its lower position, which means also, in part at least, tends to reinforce the action of lifting-springs 88, 88'', I have provided a counterweighted lever or frame, (designated in a general way by U,). This counterweighted lever or frame, in the preferred form thereof herein shown, comprises two lever-arms 89 and 89', connected together at their outer ends by a bar 90, whose weight tends to retain the counterweighted frame or lever in its normal, depressed position, as shown in Figs. 2, 3, 4, 7, and 8 of the drawings. The inner ends of the two lever-arms 89 and 89' are shown pivotally connected at 91 and 91' to the upper, angular ends of the posts 86 and 87 at the rear side of the longitudinal axis (designated by the line 90', Figs. 6 and 7) of the platen-carriage-supporting frame O and are fulcrumed, as shown at 92 and 92', (see Figs. 2, 3, and 7,) upon posts or supports 93 and 93' on the upper plate 7 of the base B, said fulcrum being slightly in the rear of the pivotal points 91 and 91' of the lever-arms 86 and 87. This U-shaped counterweighted lever is shown provided at one end thereof with a lever-shifting arm 94, which is located in juxtaposition to the fulcrum of said counterweighted lever and, to which lever-shifting arm shifting instrumentalities are connected, hereinafter more fully described.

For the purpose of adjusting the platen to different positions within the range of movement of the impression-device carrier I have provided means, in connection with the platen-carriage-supporting frame, whereby the upper or platen-carrying end of said frame may be adjusted in a direction transverse to its normal, vertical line of movement, or toward and from the axis of movement of the impression-device carrier. This means, in the preferred form thereof herein shown, comprises a crank-shaft 95, journaled for movement in an eccentric 96, which in turn is journaled in a standard 97, constituting a part of the top plate of the base B of the machine, said crank-shaft having a crank 95', pivoted in a bearing fixed to the platen-carriage-supporting frame at a point substantially midway with respect to the vertical height of the frame, this pivotal connection being located slightly in advance of the longitudinal axis 90' of said frame; and as a means for shifting the eccentric to adjust the upper end of the platen-carriage-supporting frame to set the platen at different distances within the range of the working stroke of the impression-device carrier, said eccentric, which is elongated, is shown provided at one end thereof with a shifting-lever 96'. The crank-shaft 95 will be fitted to move freely in the eccentric 96, whereas the eccentric will have a sufficiently tight fit in its bearing to prevent accidental movement thereof during the operation of the crank-shaft, so that when said eccentric is adjusted to change the position of the upper end of the platen-carriage-supporting frame the eccentric will be held by friction in its adjusted position.

By connecting the platen-carriage-supporting frame to the crank-shaft in the manner just described, it will be seen that the upper end of said frame will traverse a curved path in passing from its upper-case to its lower-case position that is, from its highest to its lowest position. The object of this is to cause the platen to move outward in the arc of a circle with relation to the orbit of the impression devices of the impression-device carrier when being shifted into operative relation, selectively, with one or the other of the circuits of impression devices, thereby leaving sufficient clearance to preclude the possibility of interference with the impression devices during this shifting movement of said platen.

The platen-carriage-supporting frame also affords means for supporting certain instrumentalities which control the automatic feed movement of the platen, and also certain accessories for controlling the effective and ineffective operation of certain parts of the feed mechanism, as will be hereinafter fully set forth.

The feed mechanism, in the preferred form thereof herein shown and described, is in the nature of a compound feed mechanism, and comprises two co-operative feed devices, (designated in a general way by W and W', respectively,) one of which devices is capable of movement independent of, and constitutes the controlling actuator for, the other. The feed device W, which may be herein termed the "primary" feed device, has a normally continuous, although normally ineffective, operation, it being constantly driven through the medium of the turret-shaft 35. The device W', which may be herein termed the "secondary" feed device, is idle in its normal condition dependent upon actuating instrumentalities or devices comprised in the primary feed device and its operation is controlled by the movements of an impression device of the machine said device W' being employed for actuating the platen-carriage N', as will be hereinafter described.

The primary feed device, in the preferred form thereof shown in Figs. 35 to 41, inclusive, comprises two rotatable members, one of which is shown as a pinion 100, carried on the lower end of the turret-stem 25', and the other of which is shown as a peculiar form of peripherally-toothed wheel, which may be hereinafter termed the "indicator-wheel" or "feed-wheel-actuating" device and which is designated in a general way by S. This indicator-wheel or feed-wheel-actuating device is shown rotatably mounted, independently of the turret, upon a stud 101, fixed to the top plate of the box-like frame B, and it meshes with, and is normally continuously driven by, the pinion 100 upon the turret-stem.

The indicator-wheel, which constitutes a controlling device for the secondary feed device W', has a series of radially-disposed secondary feed-device actuators, (designated in a general way by w,) which are supported to have a shifting movement, transversely of the plane of rotation of the rotatable indicator-wheel S, between two extreme positions. These actuators w for the secondary feed device, which are shown as eight in number and as equidistantly disposed about the axis of the indicator-wheel, are in the nature of angle-levers fulcrumed near their inner ends, as shown at 106', in bearings circumferentially disposed about the hub 104 of the indicator-wheel S, said actuators extending radially to a point near the inner face of the rim 105 of said indicator-wheel. Each feed-wheel actuator, in the form thereof herein shown, consists of an oblong bar 106, having a rounded inner end 106', which fits in a corresponding socket formed in the periphery of the hub 104 of the indicator-wheel S, and having upon the upper face, near the extreme outer end thereof, an upwardly-extending pin 107, which may be herein termed a "settable" pin, the bar 106 constituting the carrier therefor. This pin is adapted to be set, without interrupting the rotation of said wheel S, with its upper end above the upper face of the rim 105 of said wheel and in position to engage the actuating-wheel or feed-wheel 120 of the secondary feed device and advance the same a predetermined angular distance as the said wheel S rotates, as will be hereinafter more fully described.

As a means for actuating the bar 106 it has at the inner end thereof a vertically-disposed actuator-arm 108, which preferably extends above the upper face of the hub 104, as will be understood by reference to Figs. 37 and 38 of the drawings. The horizontally-disposed bar 106 has at the extreme end thereof a depending portion 109, upon each of the side faces of which are formed two locking-notches 109' and 109'', respectively, which locking notches are located one above the other in position to be engaged by one of a series of compound detent devices, hereinafter described, which devices are adapted to engage said notches alternately to hold the actuator in its effective and ineffective positions, as will be understood by a comparison of Figs. 37, 38, 39, and 40.

As shown in Fig. 37, the primary feed-actuators in their normal inoperative positions are set with the upper faces of the pins 107 in juxtaposition to, but preferably slightly below, the upper edge of the rim 105 of the wheel, and the notched portion of said actuator extends into an opening 110, formed in the web of said wheel. The actuator-arms 108 are shown, when the actuators are individually in this position, tilted toward the periphery, with their upper ends a short distance away from the upper end of the hub of the indicator-wheel and in position to be operated, as hereinafter described.

As a convenient means for causing the set of the settable pins or primary feed-device actuators from an operating impression-device carrier-shaft and shifting said actuators into their effective positions, (one of which actuators is shown in this position in Fig. 38,) I have provided a reciprocatory member 112, which is pivotally supported near the outer end thereof upon the framework of the machine, as shown at 113, see Fig. 42, and has an upwardly-extending arm 114 at the inner end thereof located in the orbital path of movement of the pinions 17 of the impression-device carrier-shafts when engaged with gear 40, and a downwardly-extending arm 115, (herein shown as an angle-arm,) which is located normally in close proximity to, but slightly at one side of, the orbital path of movement of the actuator-arms 108 and in position to engage and shift the actuator-arm adjacent thereto, inward, to throw the settable pin upward upon the shifting movement of the reciprocatory member 112 of the impression device.

As will be noticed by reference to Figs. 35 and 36 of the drawings, which are intended to illustrate the successive positions of the indicator-wheel just preparatory to, and immediately after, the actuation thereof by the pinion 17 of an impression device carrier, the working end of the reciprocatory member 112 is so located relatively to the orbital path of the rotating pinion and relatively to the plane of the impression-point of the machine (which plane is represented by the radial line 150 in said figures) that the pinion will come in juxtaposition to, and effect a working stroke of, the reciprocatory member before said pinion arrives at the plane of the impression-point 150 of the machine, so that one of the actuators of the indicator-wheel will be set into its effective position just before the impression-device carrier-shaft carrying said pinion arrives at the impression-point of the machine and before an impression movement of the impression-device carrier has been consummated.

The secondary feed device, which is intermittently operated by the primary feed device, comprises, in the preferred form thereof herein shown, a train of gears embodying a feed-wheel or star-wheel 120, as herein shown mounted upon a stud 120', secured to the framework of the machine and having four blades, or arms which are so located with respect to the actuators w that said blades successively intersect the path of movement of the pins 107 of operated actuators; a barrel-pinion 121, mounted on said stud 120', concentric to and below the star-wheel; a feed-shaft 122, journaled in suitable bearings in the shiftable platen-carriage-supporting frame O and having a feed-pinion 122' at the upper end thereof in mesh with the rack 83 of the platen-carriage N' and also having a ratchet-toothed member 123, fixed thereto near the lower end thereof, which member constitutes one clutch member of a clutch device that is instrumental in establishing an effective connection between the feed mechanism and carriage; an opposing clutch member 124, shiftably mounted on the shaft 122 and having teeth adjacent to the teeth of the clutch member 123; and a gear-wheel 125, fixed with relation to said shiftable clutch-member and meshing with the barrel-pinion.

In practice the secondary feed device W' will have normally an operative connection with the platen-carriage, although the retractive movement of the carriage may take place without changing the positions of the controlling members of the feed mechanism; and for accomplishing this a clutch (which as a unitary device will be designated in a general way by V) is provided; and as a means for actuating the clutch I have provided instrumentalities, which, for convenience, may be herein termed, inclusive of the clutch, the "carriage-releasing" device, which instrumentalities will be hereinafter fully described.

Referring again to the primary and secondary feed devices W and W', respectively, the actuating member or feed-wheel 120 is so located with relation to the indicator-wheel and the settable actuators thereof, and the train of gears comprising the primary feed device are so timed in their movements with relation to the effective orbital movement of the shafts of the impression-device carriers E and the pinions 17, which operate the settable actuators, that the pin of the actuator w, last set in operative position by the movement of a pinion 17, will have an idle or ineffective movement during the orbital travel of the pinion from its pin-setting position to the impression-point of the machine, and will, immediately after the said pinion passes the impression-point of the machine, engage a wing of the star-wheel and move said star-wheel sufficiently to effect a feed movement of the carriage N', through the medium of the secondary feed device. Thus it will be seen that the indication for the feed movement of the secondary feed device is made prior to the impression movement of the impression-device carrier, and that the feed movement of the carriage is effected after such impression movement. It is plain furthermore that the effective operation of the feed mechanism is dependent upon the working movement of an impression-device carrier, the actuators of the indicator-wheel being set, as before stated, by the actuating-pinion 17 of each impression-device carrier-shaft, as said impression-device carrier approaches the impression-point p of the machine, and said actuators operating the actuating member or star-wheel of the secondary feed device after the impression movement of each impression-device carrier.

As a convenient means for returning the actuators w to their normal, ineffective positions, after they have operated the actuating member of the secondary feed device, I have provided a segmental plate or returning-cam 126, which extends over the upper face of the indicator-wheel and has an inclined face 126' in position to engage the upper faces of the pins 107 after they have operated the said actuating member of the secondary feed device, whereby said pins, together with their accessories, are shifted from their effective positions (shown at the left hand in Fig. 38) to their ineffective positions. (Shown at the right hand in said Fig. 38.)

In the form thereof herein shown each detent device for holding each settable actuator w in the one or the other of its extreme positions, as shown in Figs. 39 and 40, comprises two detent slides or bolts 127 and 127', located one at each side of the notched portion 109 of said actuator and two push-springs 128, bearing against the outer ends of said bolts and normally retaining said bolts in the upper or lower set of notches 109' or 109'', as the case may be.

In the form thereof shown in the drawings the detent devices are circumferentially disposed about the indicator-wheel about midway the width of the rim thereof, an annular chamber 129 being formed for the reception of said devices; and for convenience the bolts are so disposed about the annular chamber that one spring actuates two opposing bolts, one bolt for two succeeding actuators, as will be readily understood by a comparison of Figs. 35 and 49 of the drawings.

As illustrated in Figs. 43 to 48, inclusive, the indicator-wheel proper, S, is constructed preferably in two parts—i. e., a hub portion 104, having a peripherally-stepped web, which constitutes the main portion of the wheel proper and also provides a cap for holding the actuator-detents in place, and a rim 105, L-shaped in cross-section, and having a series of transverse openings in the web-section of said rim for the reception of the depending portions of the actuators, the rim being secured to the web of the hub portion 104 by suitable screws, as shown most clearly in Figs. 35 and 36. This hub portion of the indicator-wheel is radially slotted, as shown at 104'', to form guideways for the settable actuators w, which guideways prevent transverse movement of said actuators.

As a convenient means for shifting the reciprocatory member 112 to its normal position, after the same has been struck by a pinion 17, and as a means for regulating the stroke of said member, I have provided, in connection with the pivoted end of said member, a retracting device and stroke-limiter, which, in the preferred form thereof herein shown, comprises a block 130, fixed to the post 131, on which the reciprocatory member is pivotally supported and having a push-spring 132, which bears against the reciprocatory member between the working end and the pivotal point of said member, and also having an adjustable stop-screw 133, which extends through the block, as shown in Fig. 41, and normally bears at its inner end against the reciprocatory member at the opposite side of a pivotal point thereof and is adapted for limiting the return stroke of said reciprocatory member.

One means for imparting a retractive movement to the platen-carriage is partially shown in Fig. 3ª of the drawings, which retracting device, in the form thereof shown in said figure, comprises a winding-drum 135, embodying two concentrically - disposed members, one of which may be fixed as against rotation to a suitable member of the platen-carriage-supporting frame, and the other of which is supported for rotation relatively to the fixed member and is connected to a suitable part of the platen-carriage by a strap 136, which is of a suitable length to permit the requisite longitudinal movement of the platen-carriage and is wound upon the drum, the device causing the retraction of the carriage through the tension of a helical spring 137, contained within said drum and secured at its inner end to the fixed member and at its outer end to the rotatable member of said drum in the usual manner.

Inasmuch as the construction and operation of spring-actuating devices for imparting a movement to the platen-carriage are well known in the art, and as this invention is not confined to any particular form of device for this purpose, a more detailed description of this feature is deemed unnecessary.

As a means for actuating the clutch device V, to release one member thereof from operative engagement with the other member, when it is desired to disconnect the feed mechanism and platen-carriage to effect a retractive movement of said carriage, I have provided an organization of instrumentalities, which, collectively, may be herein termed the "carriage-releasing mechanism". This carriage-releasing mechanism, in the preferred form thereof herein shown and described, comprises a rock-shaft 138, which is located below the plane of the carriage in parallelism with the plane of the carriage-supporting rod and extends from end to end of, and is supported in suitable bearings 139 and 139' on, the platen-carriage-supporting frame O; a clutch; a reciprocatory clutch-member-actuating connector 140 between and operatively connecting the rock-shaft 138 and the shiftable clutch member 124; and means for actuating the rock-shaft.

In the form thereof shown most clearly in Fig. 4 of the drawings, the connector 140 is in the nature of a sleeve shiftably supported upon a guide-rod 141, fixed to some suitable part of the platen-carriage-supporting frame, as shown; and said sleeve has a lateral projection at the lower end thereof, which engages in an annular groove 124' in the clutch member, and also has a bifurcated or slotted oppositely-disposed projection 142, engaged by a crank-arm 143' on a sleeve 143, splined to the rock-shaft 138, as shown in said figure.

The clutch-actuating connector or shiftable sleeve 140 will have a longitudinal movement sufficient to throw the shiftable clutch member 124 into and out of engagement with the clutch member 123, as will be understood by reference to said Fig. 4; and as a means for holding the sleeve in its adjusted position, said sleeve is provided with two notches 144 and 144' near the middle portion thereof; and a detent device 145 is provided to engage said notches, said detent device being shown in the nature of a spring having a V-shaped lateral projection at the free end thereof adapted to engage said catches alternately, and said spring being secured at the opposite end thereof to a fixture on the platen-carriage-supporting frame.

As a means for actuating the rock-shaft 138 to throw the shiftable clutch member 124 out of operative engagement with the clutch member 123, to thereby disconnect the feed mechanism and the carriage, I have provided two independently-operable rock-shaft-actuating devices one of which is automatically controlled by the platen-carriage on its advancing movement, and the other of which is controlled by the manipulation of a finger-key; and as a means for actuating the rock-shaft to throw said clutch member 124 into operative engagement with the clutch member 123 and thereby re-establish connection between the feed mechanism and platen-carriage, I have provided a rock-shaft actuator, which, in the form thereof herein shown, is automatic in its operation and is controlled by the carriage on its retractive movement.

The rock-shaft-actuating device, which is controlled by the platen-carriage, on its advancing movement, comprises, in the form thereof most clearly shown in Fig. 3, two co-operative cam-like arms 146 and 147, the arm 146 being adjustably secured to the rock-shaft (see Fig. 1) and being located in the path of movement of the arm 147, which arm 147 is fixed to the platen-carriage see Fig. 3 and has a cam-face adapted for engaging the arm 146 to shift said arm laterally, and thereby rock the shaft 138 to throw the clutch member 124 out of engagement with the clutch member 123, thus temporarily disconnecting the feed mechanism and the carriage, whereupon the retracting device immediately acts to return the carriage to its normal starting position.

For the purpose of automatically effecting a retracting movement of the carriage, through the medium of the two co-operating arms 146 and 147 just described, at any predetermined point in the advancing movement thereof, the rock-shaft is longitudinally grooved, as shown at 138', and has formed therein a series of notches 148, set a distance apart or a distance equal to the distance traversed by the carriage at each step-by-step movement thereof, and shaft-actuating cam 146 is adjustably secured to said shaft and has a pin or projection adapted to engage in the successive notches. By this construction the shaft-actuating arm 146 may be set and secured at different distances from the impression-point of the machine, and thereby limit the advancing movement of the platen-carriage.

The electrically-actuated devices for rocking the shaft 138 in one direction automatically to again connect the feed mechanism and carriage, and also for rocking said shaft in an opposite direction to disconnect said feed mechanism and carriage, comprise, in the preferred form thereof, a compound solenoid (designated in a general way by S)—that is, a solenoid having dextrorsal and sinistrorsal coils 151 and 151', adapted for moving a core in opposite directions, respectively, the shiftable core 152, having an extension 152' in operative connection at its outer end with a crank-arm 153, splined to the rock-shaft 138; a compound circuit (designated in a general way by Y) having an electrical source, which is represented in Fig. 1 of the drawings by the lines marked Z, said compound circuit comprising, practically, two normally open circuits 154 and 155, respectively, in one of which the coil 151 is located, and in the other of which the coil 151' is located; an automatically-operable contact device or circuit-closer 156, splined to the rock-shaft 138 and having contact-points 157 and 157', which are connected with the electrical conductors of the circuit 154, are located in the path of movement of a fixture on the platen-carriage and are adapted, upon the retractive movement of said carriage, for automatically closing the circuit 154 to thereby energize the solenoid-coil 151, causing the core 152 to be thrown outward into the position shown in Figs. 2, 6, and 8, and thereby rock the shaft in a direction to throw the shiftable clutch member 124 into operative engagement with the clutch member 123 and re-establish the connection between the feed mechanism and carriage; and a key-actuated contact device or circuit-closer 158, located in, and operative for closing, the circuit 155, to thereby energize the solenoid-coil 151' to retract the core 152, and thereby shift the rock-shaft into position to separate the clutch members 123 and 124 to again disconnect the feed mechanism and carriage.

From the foregoing description it will be seen that when the carriage reaches the end of its advancing movement, the device comprising the two co-operating arms 146 and 147 will operate automatically to actuate the rock-shaft and thereby release the carriage, whereupon said carriage is retracted through the medium of the device before described, and that when the carriage reaches the end of its retractive movement the contact-points 157 and 157' of the circuit-closer 156, located at this end of the machine, will be forced together and thus close the circuit 154, the closing of this circuit, through the medium of the solenoid-coil energized thereby, acting to shift the core in a direction to re-establish connection between the feed mechanism and carriage, thus rendering these operations of the carriage automatic. Furthermore, by means of the key-actuated electromechanical instrumentalities hereinbefore described it will be seen that a retractive movement of the carriage may be effected at any time by operating the key-actuated circuit-closer irrespective of the advanced position of the carriage.

The contact device or circuit-closer 156, which is operated by the carriage automatically to re-establish an effective connection between the feed mechanism and carriage, also constitutes an automatic actuator for the platen, said contact device having an arm 156', located in position, when the rock-shaft 138 is in its carriage-releasing position and when the carriage is in its retracted position, to engage the arm 72" at the lower end of the feed-lever 72, as shown most clearly in Fig. 7, so that when the contact-points of said circuit-closer are forced together to close the circuit and energize the solenoid this arm on the circuit-closer will, simultaneously with the rotative movement of the shaft from the position shown in Fig. 7 to the position shown in Fig. 6, throw the feed-lever 72 from the position shown in Fig. 6 to that shown in Fig. 8, and thereby automatically effect a rotative feed movement of the platen, all of which will be readily understood by a comparison of Figs. 1, 2, 4, and 6 to 8, inclusive, of the drawings.

As a means for shifting the platen-carriage-supporting frame from its upper position, where it is normally sustained by means of the lifting-springs, hereinbefore described, to its lower position, I have provided a solenoid 159, which is energized from an electrical circuit (designated by 160) and which has a core 161, having an extension 161' in operative connection with the lever-shifting arm 94 of the counterweighted lever U, as shown most clearly in Figs. 1 and 5; and for closing said circuit to energize said solenoid I have shown a key-actuated contact device or circuit-closer 162, located in said circuit, which contact device may be of any suitable construction and will, in practice, be similar to the contact device 158. (Shown most clearly in Fig. 2.) This solenoid 159 will be wound so as to draw the core 161 inward to thereby shift the counterweighted lever or frame from the position shown in Fig. 7 to that shown in Fig. 6, and thereby lower the platen-carriage-supporting frame, suitable stops being provided for limiting the movements of said frame.

The feed-roll 163, which is located preferably in vertical alinement with the axis of, and its periphery in contact with, the platen, is, in the form thereof shown, yieldingly and rotatably supported for movement toward and away from said platen between end plates 164 and 164' of the guard-plate 170, sheet-metal springs 165 bearing at their upper ends against rod 166, which in turn is carried at the opposite ends of the platen-carriage at the free ends of the depending crank-arms 167 and 167', pivoted at 167'' to the end plates of the platen-frame; and as a means for holding the feed-roll against the platen under the requisite tension the crank-arms 167 and 167' are each connected with the lower end of one arm of a corresponding link 168, each link having a relatively short arm 168', seated in a vertical bearing formed in the end plate of the platen-carriage and resting upon a spiral-spring 169, tending to push the link upward and thereby maintain a bearing relation between the feed-roll and platen, as will be readily understood by a comparison of Figs. 10 and 14 of the drawings.

As will be understood springs 165 bear at one end against the free end of the guard for the feed-roll 163 and at their opposite ends against flattened portions of rod 166, the result being that as the feed-roll is depressed the guard-plate 170 is thrown away from the platen, as shown in Fig. 14.

The guard-plate 170 for the front side of the platen is carried by the feed-roll-carrying device and is shiftable toward and away from said platen with said roll, as will be understood by a comparison of Figs. 4 and 14 of the drawings.

When the machine is employed as a typewriter, as a convenient means for inking the type of the impression devices I have shown (see Fig. 100) a series of inking-rolls y, circumferentially-disposed about the type-wheel orbit, said rolls, which may be rotated by any suitable means, (not shown,) being supplied with ink in any suitable manner.

By reference to Fig. 100, it will be seen that the inner faces of the ink-rolls bear such relation to the type-wheels (two of which are shown) that when said type-wheels are moving in their normal, ineffective positions in an orbital path there is sufficient clearance between the peripheries of the type-wheels and ink-rolls as will prevent contact; and it will be readily understood that as soon as the type-wheel shafts are shifted and are started in rotation the selected type thereof will, before reaching the printing position, come into contact with, and be inked by, one or more ink-rolls.

It will be understood that the inking mechanism may be variously modified without departure from this invention.

Having described my invention, I claim—

1. The combination, with a platen, of an impression-device-carrier, and actuating mechanism including instrumentalities for imparting to the impression-device carrier an orbital movement and at will a rotative movement, and for imparting thereto, an advancing movement to cause an impression device thereon to make an impression and a retracting movement to withdraw said impression-device carrier to its normal position.

2. A machine for making impressions, comprehending a series of movably-supported impression-device carriers, and actuating instrumentalities constructed and organized to revolve adapted to rotate at will said impression-device carriers and to advance an impression-device carrier to cause it to make an impression during its rotative movement.

3. The combination, with a movable support and with means for actuating said support, of a series of impression-device carriers mounted on said support, and means for imparting at will to said impression-device carriers combined rotary and advancing impression movements independent of their movement with said support, the advancing impression movement of each carrier taking place during its rotative movement.

4. The combination, with a rotary support and actuating means therefor, of a series of impression-device carriers mounted on said support, and means for imparting at will to each carrier a rotary and an advancing impression movement concurrently with said rotary movement.

5. The combination, with a movable support and with actuating means therefor, of a series of impression-device carriers mounted circumferentially upon said support, and means constructed and operating to impart at will to each impression-device carrier a rotary movement and an advancing impression movement concurrently with said rotary movement, both of said movements being independent of the movement of said carrier with said support.

6. An impression device carrier having two independent and relatively transverse axes of movement, one of rotation and the other of oscillation, combined with means for imparting curvilinear movements to said carrier about both axes concurrently and for rotating the carrier during the act of making an impression.

7. In a machine for making impressions, an impression device carrier, combined with actuating instrumentalities constructed and operated to impart to said impression-device carrier an orbital movement, simultaneous advancing and rotary movements, and a rotary movement during the act of making an impression.

8. In a machine for making impressions, an impression member having three independent axes of movement, two of which are parallel and vertically disposed, and the other of which is horizontally disposed, combined with means for concurrently imparting curvilinear movements to said impression member about its two vertical axes and for concurrently imparting a curvilinear radial movement to said member about its horizontal axis.

9. The combination, with a rotative carrier, of a rotative impression device having an axis of movement independent of the carrier-axis; means for rotating the carrier constantly in one direction; means for concurrently rotating at will the impression device on its own axis in a direction opposite to the direction of rotation of the carrier; and means operative at a predetermined point in the rotation of the impression device for imparting a radial impression movement to said device.

10. A rotatable impression device shaft supported for radial movement and carrying a starting-arm; combined with a key-actuated device which engages the starting-arm to start the rotative movement of the shaft; means for continuing the rotative movement of said shaft; and means for moving the same radially at a predetermined point in and during the rotative movement thereof.

11. The combination of a rotative impression-device carrier supported for orbital and radial movements, means for effecting rotative, orbital, and radial movements of said carrier and means for initiating at will the rotative and radial movements.

12. A rotative impression-device carrier supported for orbital and radial movements, combined with means for effecting a continuous orbital movement of the impression-device carrier and for intermittently effecting rotative and radial movements of said carrier during the orbital movement thereof and means for initiating at will the rotative and radial movements.

13. An impression-device carrier supported for orbital, rotative, and radial movements, combined with means for effecting a normally-continuous orbital movement of said carrier and for intermittently rotating said carrier about its own axis simultaneously with the orbital movement thereof and also for moving said carrier radially of said axis at a predetermined point in the orbital and rotative movements thereof and means for initiating at will the rotative and radial movements.

14. An impression device carrier supported for rotative movement about its own axis and for orbital movement about an independent axis and also supported for movement radially of its orbital axis, in combination with carrier-actuating mechanism comprehending means for rotating the impression-device carrier on its own axis in an orbital path and for intermittently moving said carrier radially of its orbital axis at a predetermined point in the orbital movement thereof and means for initiating at will the rotative and radial movements.

15. The combination, with a rotative and orbitally-movable impression device carrier arranged to have a radial movement toward and away from its orbital axis, of means for imparting orbital movement to said carrier; means for imparting at will a rotative movement to the carrier; and means for moving said carrier radially without interrupting its orbital movement.

16. The combination with a turret, of a radially-movable, rotative wheel having impression devices carried by said turret with its axis remote from the turret-axis; turret-rotating mechanism; means for rotating the wheel at will about its own axis during the rotation of the turret; and means for imparting a radial movement to said wheel during the rotation of the turret.

17. The combination with a rotative member supported for orbital and lateral movements and having a starting-arm and a driving-pinion thereon, of means for effecting an orbital movement of said member; a latch shiftable into the orbital path of the starting-arm of said member for starting the rotative movement of said member; means for actuating said latch; a gear meshing with the pinion on said member and effective for continuing the rotation of said member; and means for moving said member laterally at a predetermined point in the orbital movement thereof.

18. A series of rotative impression-device wheels supported for differential movements with their normal axes substantially equidistant from a common center, combined with means for synchronously revolving said wheels about said common center and for intermittently and at will rotating said wheels upon their own axes and also for independently moving said wheels radially of said common center.

19. The combination with a rotative turret and with means for normally continuously rotating said turret, of a series of rotative impression-device carriers having their normal axes of movement substantially equidistant from and at one side of the turret-axis; means for and intermittently at will rotating said carriers on their respective axes during the rotation of the turret; and means for intermittently moving said carriers away from and toward the turret-axis.

20. A rotative turret combined with a series of independently-rotative impression-device wheels movably supported on said turret with their axes of rotative movement normally in parallelism with, and substantially equidistant from, the turret-axis; means for rotating the turret on its own axis and for rotating at will the wheels on their own axes; and means for intermittently and independently moving said wheels radially of the turret-axis during the rotation of said turret and type-wheel.

21. The combination with a turret and with rotating mechanism therefor, of a series of impression-device wheels normally located in the same horizontal plane about the axis of, and carried by, the turret; means for intermittently and at will rotating said wheels; and means for independently moving said wheels radially at predetermined points in the rotation of said wheels and during the rotation of the turret.

22. A movably-supported member combined with means for imparting an orbital movement to said member and for rotating at will said member on its own axis in a direction opposite to the direction of orbital movement thereof, and means for effecting a radial movement of said member at a predetermined point in the orbital and rotative movements thereof.

23. A rotative impression-device carrier having two independent impression-device carrying flanges and each impression-device carrying flange having a series of circumferentially-disposed impression-devices, combined with a shiftable platen; means for imparting orbital, rotative, and radial movements to the impression-device carrier; and means for shifting the platen transversely of the said flanges.

24. The combination, with a rotative impression-device carrier having two independent circuits or sets of impression-devices and with means for imparting hypocycloidal and radial movements to said carrier, of a shiftable platen, and means for shifting the platen transversely of the path of rotation of the impression-devices.

25. A machine for making impressions, it comprehending an impression member supported for radial movements; impression-member-actuating means including two intermeshing gear elements, one of which has an offset tooth portion for imparting an advancing movement to the impression member; and means for rotating one gear element relatively to the other.

26. In a machine for making impressions, the combination, with an impression member supported for orbital and advancing movements, of impression-member-actuating means including two intermeshing gear elements, one of which has an offset tooth portion for imparting an advancing movement to the impression member at a predetermined point in the orbital movement of said member; and means for imparting an orbital movement to the impression member and for rotating one gear element relatively to the other.

27. A wheel supported for orbital and advancing movements, combined with a gear adapted to mesh with said wheel, and having an offset portion for advancing the wheel during the orbital movement thereof.

28. The combination with a wheel arranged to have a rotative movement on its own axis, an orbital movement about a remote axis, and a radial movement with respect to said axes, and with means for moving said wheel in an orbital path; of a gear for imparting a rotative movement to said wheel and comprehending means for imparting a radial movement to said wheel at a predetermined point in the orbital and rotative movements thereof.

29. A rotative impression-device carrier supported for advancing movement and carrying a pinion, combined with an internal gear adapted to mesh with said pinion and having an offset portion for effecting an advancing movement of said carrier and pinion during the rotation thereof.

30. Two gears adapted to intermesh one of which has a fixed axis and the other of which has a movable axis and one of which has an offset tooth portion for effecting an advancing movement of the other, combined with means for actuating one of said gears.

31. A rotative impression-device carrier supported for orbital and radial movements and carrying a pinion; combined with an internal gear adapted to mesh with said pinion and having an offset tooth portion adapted to co-operate with the tooth portion of the pinion at a predetermined point in the orbital movement of said pinion, to move said pinion toward the axis of the internal gear; and means for imparting an orbital movement to said pinion and carrier.

32. The combination with a rotative impression-device carrier; of actuating mechanism therefor, comprising two gears adapted to intermesh, the first of which is concentric to said carrier and is arranged to have an orbital movement about the axis of the second gear, and the second gear of which is fixed and has an offset portion adapted for shifting the first gear with respect to the axis of said second gear; and means for imparting an orbital movement to the first gear and said carrier.

33. The combination of a platen supported for longitudinal movement; an impression member supported for diversified movements; means for imparting an orbital movement to said impression member and for intermittently rotating said member upon its own axis in a direction opposite to the direction of orbital movement thereof; means for effecting a radial movement of said impression member at a point in the orbital and rotative movements thereof; and means for shifting the platen longitudinally subsequent to each successive radial movement of said member.

34. The combination of a longitudinally-shiftable platen; a rotative impression member arranged to have an orbital movement in a plane corresponding to the plane of the longitudinal axis of the platen and to be advanced with respect to said platen; means for imparting an orbital movement to said impression member; means for advancing the impression member and simultaneously rolling the same with respect to the platen; means for retracting the impression member; and means for shifting the platen longitudinally subsequent to each successive retraction of said impression member.

35. The combination with an impression member supported for orbital, rotative, and advancing movements; of actuating mechanism for the impression member, comprehending means for imparting a normally-continuous, orbital movement to said impression member, for starting a rotative movement of the impression member at a predetermined point in the orbital movement thereof, for continuing the rotation of the impression member after the starting of such movement, and for imparting an advancing impression movement thereto at a selected distance from the starting-point of rotation without interrupting the rotative or orbital movement of said impression member.

36. The combination with an impression member supported for rotative movement about its own axis for orbital movement about an independent axis and for radial movement with respect to said independent axis; of actuating mechanism for said impression member, comprehending means for imparting a normally-continuous, orbital movement to said impression member, for normally holding said impression member against rotative movement about its own axis during the orbital movement thereof, for starting the rotary movement of the impression member at a preselected point in the orbital movement thereof, for continuing the rotation of the impression member throughout a predetermined arc distance, for imparting a radial impression movement to said member at a predetermined point in the rotative movement thereof and without interrupting the rotative and orbital movements of said member, and for returning said impression member to its normal position immediately succeeding the impression movement thereof.

37. The combination of a platen; an impression member supported for rotative and radial movements; means for intermittently rotating the impression member a predetermined arc distance and in a direction to effect a rolling action between said member and platen; and means located and organized to effect a radial impression movement of the impression member at a preselected point in, and without interrupting, the rotative movement thereof.

38. The combination of a platen; an impression member supported for rotative and radial movements; means for intermittently rotating the impression member a predetermined arc distance and in a direction to effect a rolling action between said member and platen; means located and organized to effect a radial impression movement of the impression member at a preselected point in, and without interrupting, the rotative movement thereof; and means for shifting the platen longitudinally after each successive impression movement of the impression member.

39. The combination of a shiftable platen; an impression member supported to have differential movements toward and away from the platen; means for imparting hypocycloidal and radial impression movements to said impression member; and feed mechanism embodying a rotative member controlled by the movements of the impression member for shifting the platen longitudinally a predetermined distance subsequent to each successive impression movement of the impression member.

40. An orbitally-movable impression device supported to have a rolling toggle action with respect to a work-carrier; combined with a work-carrier; and actuating mechanism for imparting a radial movement to the impression device at a preselected point in the orbital movement thereof and simultaneously effecting a rolling toggle action between the impression device and work-carrier.

41. In a machine for making impressions, impression mechanism including a supporting member and an impression member, both of which are adapted to concurrently rotate in relatively opposite directions during impression, and the impression member being carried by and movable radially of the support during the rotative movement of said impression member, combined with actuating means for said members.

42. A machine for making impressions, including two oppositely-rotative members having different axes of movement, one of the members constituting an impression member rotatable during the act of impression and being carried by and shiftable toward and from the axis of the other member, combined with mechanism for actuating said members.

43. Two oppositely-rotative members having relatively remote axes of rotation in substantially parallel planes, and one member of which is carried by, and is orbitally and radially movable with respect to the axis of, the other member; combined with actuating mechanism organized, timed, and operating to impart a normally-continuous, rotative movement to the carrying member and an incidental, orbital movement to the carried member, and also to intermittently and at will rotate the carried member in a direction opposite to the direction of rotation of the carrying member; and means for intermittently imparting a radial movement to the carried member at a predetermined point in the rotative movement thereof.

44. Two oppositely-rotative members one of which is supported by, and is orbitally and radially movable with respect to the axis of, the other member; combined with actuating mechanism organized, timed, and operating to impart orbital and rotative movements of substantially-coinciding velocities to the radially movable member, and also for imparting a radial movement to said member at a predetermined point in the orbital and rotative movements thereof.

45. An impression member supported for orbital, rotative, and radial movements; combined with actuating mechanism organized, timed, and operating to impart to said impression member orbital and rotative movements of coinciding velocities in opposite directions, and comprehending means for imparting radial movements to said member at preselected points in the orbital and rotative movements thereof.

46. The combination with a rotative carrier, of an impression-wheel journaled on the rim of said carrier and having three independent and controllable movements—to wit, a rotative movement on its own axis, an orbital movement on the axis of the carrier, and a radial movement with respect to said carrier-axis; and means for actuating said carrier and impression-wheel.

47. The combination with a rotative impression member having an orbital movement and having a starting-arm, of a latch interposable in the path of said starting-arm and adapted for starting the rotative movement of the impression member; means for continuing the rotation of the impression member; means for moving the impression member radially at a predetermined point in the rotative movement thereof to make an impression without interrupting the said rotative movement; means for subsequently interrupting the rotative movement of the impression member; and means for returning said impression member to its normal position.

48. The combination in a machine of the class specified, having an impression-point; of a wheel having a series of impression devices on the periphery thereof and supported for orbital, rolling, and radial movements, and also having a starting-arm; means for imparting a normally-continuous, orbital movement to the wheel; a series of starting devices separately interposable in the orbital path of the starting-arm and located to engage said starting-arm at successive predetermined distances from the impression-point of the machine corresponding to the desired successive rolling distances of the several impression devices on the wheel from said impression-point, whereby each starting device will operate to start the rotative movement of the wheel at the requisite distance from the impression-point to bring a particular impression device into operative position; means for continuing the rotation of the wheel a predetermined arc distance; and means for moving the wheel radially when the same arrives at the impression-point of the machine.

49. The combination with a rotatably-supported member and with supporting and actuating devices therefor, of a self-setting reciprocatory detent located to engage the rotatable member and gradually stop the rotation thereof and adapted to hold said member normally in a predetermined position with respect to its carrier.

50. The combination with a rotatably-supported member and with supporting and actuating devices therefor, of a spring-actuated, oscillatory detent located to engage the rotatable member and gradually stop the rotation thereof and organized to normally hold said member in a predetermined, peripheral position with respect to its carrier.

51. The combination with a rotatable member and its support and with actuating mechanism therefor, of a self-setting, oscillatory detent normally engaging said rotatable member.

52. The combination with a rotatable member and its support, of a self-setting, reciprocatory detent normally engaging and holding the rotatable member at rest in a predetermined, peripheral position with respect to its support; and means for intermittently rotating said member and simultaneously unsetting the detent.

53. The combination with a frictionally-mounted, rotatable member; of a spring-actuated, oscillatory detent normally engaging and holding the rotatable member in a predetermined position; and means located to intermittently engage the rotatable member and release the same from the detent and simultaneously rotate said member.

54. The combination with a rotatable impression member supported for orbital movement, of actuating means for imparting a normally-continuous orbital movement to said impression member and for intermittently rotating the same during the orbital movement thereof; a self-acting, reciprocatory detent normally holding the rotatable member at rest in a predetermined operative position with respect to its support and embodying resilient means for effecting a gradual stopping of the rotation of the said rotatable member.

55. The combination of two rotatable members one of which is carried by the other for orbital movement; means for imparting a normally-continuous, rotary movement to the carrying member and an orbital movement to the carried member; means for intermittently rotating the carried member during the orbital movement thereof; and a resilient, reciprocatory detent device carried by the carrying member in position to engage and gradually stop the rotation of the carried member and hold the same at rest in a predetermined peripheral position with respect to the carrying member.

56. The combination of a movable body and with means for moving said body, of an impression device pivotally supported thereon; a resilient, reciprocatory detent device located to intercept and normally hold the impression device against rotation and in an inoperative position; and means for engaging the impression device during the movement of the body, and which on engaging the impression device rotates the same opposite to the direction of movement of said body.

57. The combination with a rotatable body and with means for rotating said body, of a shaft journaled on said body for rotative and orbital movements and having a starting-arm; a shaft-starter interposable in the path of the starting-arm to start the rotative movement of said shaft; means for continuing the rotation of said shaft; and a resilient, reciprocatory detent device located and organized to engage the shaft during the rotation thereof with a gradually-increasing resistance, and thereby gradually bring the shaft to rest at, and normally hold the same in, a predetermined, peripheral position with respect to said body.

58. The combination with two oppositely-rotatable members one of which is carried by, and is orbitally movable with respect to the axis of, the other member and with means for rotating said members in opposite directions, one continuously and the other intermittently; of a self-acting, reciprocatory detent device located and organized to intermittently engage the carried member during the rotation thereof with a gradually-increased resistance and hold the same at rest in a predetermined peripheral position with respect to the carrying member intermediate to intermittent rotations of said carried member.

59. The combination with a movable body and with means for imparting movement to said body, of an intermittently-rotatable member carried on said body; means for intermittently rotating said member; a detent device normally engaging and holding the rotatable member at rest and in an inoperative position and comprising resilient instrumentalities shiftable in the plane of movement of the rotatable member and organized to intermittently engage the rotatable member during the rotation thereof with a gradually-increasing resistance and thereby gradually stop the rotation of said member.

60. The combination with a rotatable member supported for orbital movement and with means for imparting an orbital movement to said member; of two alternately-operable intercepting devices, one of which constitutes a starting device for, and is interposable in the orbital path of movement of, the rotatable member to inaugurate the rotation of said member, and the other of which constitutes a stopping member or detent device and comprises resilient instrumentalities self-shiftable into the path of rotative movement of the rotatable member and is effective for engaging said member with a gradually-increased resistance at a predetermined point in the rotative movement thereof, to thereby bring the same to a state of rest in operative position.

61. The combination with a rotatable member and with an oscillatory detent device in normal effective engagement with said member, of actuating means located and organized to intermittently start the rotative movement of said member and simultaneously release the detent from effective engagement therewith; and resilient means comprised in the detent device, for re-establishing an effective engagement between said device and rotatable member at a predetermined point in the rotative movement of said member.

62. The combination with a movable body and with a rotatable member carried by said body, of a reciprocatory detent carried by the movable body and normally engaging the rotatable member and holding the same in a predetermined, peripheral position with respect to the movable body and comprising resilient instrumentalities for effecting an automatic re-engagement of the detent device of the rotatable member intermediate to intermittent rotations of said member; and means located and organized to intermittently rotate said member and thereby simultaneously release the detent device for effective engagement therewith.

63. The combination with a rotatable member supported for oscillatory movement and means for imparting orbital movement to said rotatable member, of an oscillatory detent device located in position to engage and hold the rotatable member in a predetermined peripheral position with respect to its support and comprising resilient means organized to effect a resetting action of the detent device subsequent to its release from, and intermediate to intermittent rotations of, the rotatable member; and actuating means for intermittently rotating the rotatable member and simultaneously unsetting the detent device.

64. In a machine of the character specified, the combination, with a rotatable turret; a shaft-carrying frame supported on said turret for movement in a plane crosswise of the path of rotation of said turret on said shaft; an impression-device-carrier shaft rotatably mounted on said frame and shiftable back and forth during this rotative movement; and means for actuating said turret and impression-device-carrier shaft independently of the said shifting movement of said shaft.

65. The combination with a rotatable turret and with means for rotating the same, of a shaft-carrying frame pivotally supported on said turret near the periphery thereof for movement in a plane radial to the axis of said turret; an impression-device carrier-shaft rotatably mounted on said frame; and means for rotating said shaft during the act of impression.

66. In a machine of the character specified, the combination, with a rotatable turret and with rotating means therefor, of a frame pivotally supported on, and at one side the axis of said turret and having its pivot-axis at right angles to the axis of said turret; an impression-device carrier-shaft journaled in bearings on said frame with its axis at right angles to the pivot-axis of said frame; and means for intermittently rotating said shaft.

67. In a machine of the character specified, the combination, with a rotatable turret, of a frame supported on said turret near the periphery thereof; a shaft rotatably mounted on said frame with its axis normally parallel to the axis of the turret; means for rotating the turret; means for intermittently rotating the shaft; and actuating mechanism for intermittently moving the carrying frame in a plane crosswise of the path of movement of the turret.

68. The combination with a rotatable body, of a shaft-carrying frame carried on said body for orbital and radial movements with respect to the axis of said body; means for imparting an orbital movement and at will a simultaneous rotative movement to said body and frame, respectively; means located to intermittently impart to the frame a radial advancing movement with respect to the axis of the body in one direction at a preselected point in the orbit thereof; and means for automatically retracting said frame.

69. The combination with a rotatable body or turret, of a shaft-carrying frame supported on said body for movement in a plane crosswise of the plane of movement thereof; a shaft journaled in said frame with its axis normally parallel to the axis of the rotatable body; means for rotating said body to impart an orbital movement to the frame and shaft; and actuating devices located and organized to advance and retract at will the frame and shaft in a radial direction with respect to the axis of the rotatable body at a preselected point in the orbital movement of the frame and shaft.

70. The combination of a rotatable body; a shaft-carrying frame pivotally connected with said body near the periphery thereof; a retracting device normally holding the frame against movement with respect to the body; actuating mechanism for rotating the body and simultaneously imparting an orbital movement to the frame carried thereon; a shaft journaled on the frame with its axis in normal parallelism with the axis of said body; and means organized to impart to the shaft and its carrying-frame an advancing movement in a plane radial to the axis of said rotatable body.

71. The combination of a rotatable body; a shaft-carrying frame pivotally connected with said body near the periphery thereof; a retracting device normally holding said frame against movement with respect to the body; actuating mechanism for rotating the body and simultaneously imparting an orbital movement to the frame carried thereon; a wheel-carrying shaft journaled on the frame with its axis in normal parallelism with the axis of the body; means located in the orbital path of movement of the shaft and organized to impart to the shaft and its carrying-frame an advancing movement in a plane radial to the axis of said rotatable body; and a wheel or impression member carried on said shaft.

72. The combination with a turret, of a shaft-carrying frame pivoted to the turret at one side of the axis and near the periphery thereof, for oscillatory movement in a plane crosswise of the plane of movement of said turret; means for continuously rotating the turret, to impart an orbital movement to said frame; and actuating means located with relation to the frame, to impart oscillatory movements to said frame at predetermined points in the orbital movement thereof.

73. A carrying-frame supported for orbital and radial movements; combined with an impression wheel carrier supported on said frame for rotative movement in a plane coinciding with the plane of the orbital movement of said frame; a resilient device for normally holding the frame against radial movement; actuating means for imparting an orbital movement to the frame; means located to intermittently rotate the impression-wheel carrier during the orbital movement thereof; and means for oscillating the carrying-frame at a predetermined point in the orbital movement thereof.

74. An impression member supported for rotative and radial movements; combined with actuating means for rotating said member and for moving said member radially at some preselected point in, and without interrupting, the rotation of the impression member; and a reciprocatory detent device located to interrupt the rotation of the impression member intermittently and hold said member in a predetermined, peripheral relation with respect to its support.

75. The combination of an impression member supported for rotative and radial movements; means for intermittently rotating said impression member; an actuating device for imparting a radial movement to the impression member during the rotative movement thereof; and an oscillatory detent device normally holding the impression member at rest in a predetermined, peripheral position with respect to its support, and comprising resilient means organized to stop the rotation of the impression member immediately after the radial movement thereof.

76. The combination with a rotatable carrier supported for orbital movement and having a starting-arm and with means for imparting a normally-continuous orbital movement to said carrier; of a latch or starting device interposable in the orbital path of the starting-arm, to start the rotative movement of said carrier; actuating instrumentalities for continuing the rotative movement of said carrier and for imparting a radial movement to said carrier during the orbital and rotative movements thereof; and a resilient, oscillatory detent device located to engage the carrier immediately succeeding the rotary movement thereof and to stop and hold the same at rest in a predetermined, peripheral position with respect to its support.

77. The combination with a rotatable impression-wheel carrier supported for orbital and radial movements and having a starting-arm and a stop-arm; of an oscillatory detent device in normal, effective engagement with the stop-arm of, and normally holding, said carrier in a predetermined, peripheral position with respect to its support and comprising resilient means for effecting an automatic resetting movement of said device intermediate to intermittent rotations of the carrier; a starting device located at one side, and protrudable into the path of movement of, the starting-arm of the carrier; means for imparting an orbital movement to the carrier; starting-device-actuating means organized to protrude said starting device in the orbit of said starting-arm, whereby to start the rotative movement of the impression-wheel carrier and simultaneously unset the detent device; actuating mechanism for continuing the rotative movement of said carrier; and means for moving the carrier radially at a predetermined point in, and during the rotation of, the carrier.

78. The combination of a rotative impression-wheel carrier supported for orbital and radial movements and having a starting-arm and a stop-arm; means for imparting an orbital movement to said carrier; alternately-effective starting and stopping instrumentalities shiftable into the paths of movements of the starting-arm and stop-arm, respectively, to start and stop the carrier, and the latter of which instrumentalities embodies self-resetting means organized to be unset by the starting of the rotative movement of the carrier; and means for imparting a radial movement to the carrier during the orbital movement thereof.

79. A rotatable two-part impression-device carrier-shaft pivotally supported for oscillatory movement in a plane crosswise of its axis of rotation, and one of which parts is shiftable longitudinally of the other, combined with a driving-pinion fixed to the end of one part of said shaft at one side its pivotal point; an impression-device carrier fixed to the end of the other part of said shaft at the opposite sides of said pivotal point; and means for rotating said shaft and for intermittently rocking the same on its pivot without interrupting the rotation thereof.

80. An impression-wheel carrier comprising a two-part shaft, one part of which is shiftable longitudinally of the other part and has a driving-pinion fixed thereon in combination, with means for shifting the driving pinion axially to render the same effective for rotating the shaft.

81. A rotatable impression-device carrier support mounted for movement crosswise of its axis of rotation and comprising a two-part shaft, one part of which is shiftable longitudinally of the other and has a driving-pinion fixed thereon, combined with means for shifting the pinion axially to render the same effective for rotating the shaft.

82. An impression-device carrier support comprising a two-part shaft supported for orbital, rotative, and radial movements, and one of which parts is shiftable longitudinally of the other, combined with a driving-pinion fixed to one part of said shaft; means for imparting an orbital movement to the shaft; means for automatically shifting one part of said shaft longitudinally of the other at a predetermined point in the orbital movement thereof; means for engaging and rotating the driving-pinion upon the shifting movement thereof, whereby to effect a rotative movement of said shaft; and means for moving said shaft radially at a predetermined point of the orbital and rotative movements thereof.

83. The combination with a rack; of an impression-wheel carrier supported for orbital, rotative, and radial movements and having a driving-pinion which is shiftable longitudinally of the carrier into and out of engagement with the rack; means for imparting an orbital movement to the carrier; means located to shift the pinion intermittently into and out of engagement with the rack at predetermined points in the orbital movement thereof, whereby to intermittently rotate the carrier; and means located to impart a radial movement to the carrier at a predetermined point in the orbital and rotative movements thereof.

84. A rotatable impression-wheel carrier supported intermediate its ends for movement in a direction crosswise to its axis of rotation and having a driving-pinion shiftably supported thereon at one side of its pivotal point and an impression-wheel mounted thereon at the opposite side of the pivotal point; combined with means for automatically shifting the driving-pinion longitudinally of the carrier; a resilient detent device for holding the driving-pinion in its different positions; means for rotating said pinion; and means located to impart a movement to the impression-wheel carrier in a direction crosswise of its axis of rotation at a predetermined point in the rotative movement thereof.

85. An impression-wheel carrier comprising two telescoping members supported for orbital, rotative, and radial movements, and one of which members is shiftable longitudinally of the other and has a driving-pinion fixed thereon; combined with means for imparting an orbital movement to said carrier; a circular rack located in position to engage the pinion upon a shifting movement thereof; means for automatically shifting the pinion into engagement with the rack at a preselected point in the orbital movement thereof; a detent device located on the carrier and holding the shiftable member in its shifted positions; means for imparting a radial movement to the impression-wheel at a predetermined point in the orbital and rotative movements thereof; and means for shifting the pinion out of engagement with the rack at a predetermined point in the orbital movement thereof.

86. An impression-wheel carrier comprising two members supported for orbital, rotative, and radial movements, and one of which members is shiftable longitudinally of the other and has a driving-pinion fixed thereon; combined with means for imparting an orbital movement to said carrier; a starting-arm on one of said members; a latch protrudable into the orbit of the starting-arm to start the rotative movement of the carrier; a circular rack; a driving-pinion fixed to the shiftable member of the carrier and normally held out of engagement with the rack; means controlled by the carrier as it starts in rotation for automatically shifting the pinion into engagement with the rack; a detent for holding the shiftable member in its different positions longitudinally of the other member; means located to automatically impart a radial movement to the carrier at a predetermined point in the orbital movement thereof; means controlled by the continued rotation of the carrier for shifting the pinion out of engagement with the rack; and a stopping device located to automatically stop the rotation of the carrier.

87. The combination with a suitable frame provided with an internal gear or circular rack, of a rotatable impression-wheel carrier supported for orbital and radial movements with respect to said rack and having a driving-pinion shiftable in the plane of the axis of the carrier into and out of engagement with the rack; means for imparting an orbital movement to said carrier; a starting device located to intermittently engage and start the rotative movement of the impression-wheel carrier; means controlled by the rotative movement of said impression-wheel carrier, for automatically shifting the driving-pinion thereon into operative engagement with the rack, to thereby continue the rotative movement of said carrier; and means for intermittently imparting a radial movement to the carrier during the rotative movement thereof.

88. The combination with a driving-gear or circular rack, of a driven gear; means for carrying the driven gear in an orbital path; means for starting the rotation of the driven gear; means controlled by the rotation of the driven gear and operative for shifting said driven gear into and out of engagement with the driving gear at a predetermined point in the orbital movement thereof; and means for moving the driven gear in a direction crosswise of its orbital path of movement at a preselected point in the orbital movement thereof.

89. A hypocycloidally and independently outward-movable member, combined with means for automatically imparting an outward movement to said member and a hypocycloidal movement thereto when the member has reached its extreme outward position.

90. An outwardly-movable impression device, combined with means organized to move said device in a hypocycloidal path when in its extreme outward position.

91. An impression member supported for independent hypocycloidal and outward movements, combined with means organized to synchronously impart these movements to said member and a hypocycloidal movement thereto when the member is in its extreme outward position.

92. An impression member supported for diversified movements, combined with member-actuating mechanism comprising instrumentalities organized to impart hypocycloidal movement to said impression member, to also intermittently effect an outward movement of the member at a predetermined point in the hypocycloidal movement thereof, and to continue such hypocycloidal movement during the act of impression.

93. An impression member mounted to have a hypocycloidal movement in its approach to the impression point of the machine, and an independent outward movement to make and a continued hypocycloidal movement during the act of making an impression.

94. The combination with a longitudinally shiftable platen, of an impression device supported to have a hypocyclodial and an outward movement in the plane of longitudinal movement of the platen; actuating mechanism comprising instrumentalities for effecting a hypocycloidal and intermittent outward movement of the impression device; and means for shifting the platen, longitudinally, intermediate to intermittent, outward movements of the impression device.

95. The combination with a fixed internal gear having a vertical axis, of an impression-wheel carrier supported for orbital and radial movements with its axis normally parallel to the internal gear and having a driving-pinion shiftable longitudinally thereof into and out from engagement with the internal gear; means for imparting a normally-continuous, orbital movement to the carrier; automatically-operable means for shifting the pinion into engagement with the internal gear at a predetermined point in the orbital movement of said pinion, to thereby rotate the carrier; a detent for normally holding the pinion in its shifted position; means for changing the angular position of the impression-wheel carrier with respect to the axis of the internal gear at a predetermined point in the rotative movement of the pinion; and means effective on the rotative movement of said pinion for returning the same to its normal inoperative position with respect to the internal gear.

96. The combination with a rotatable body, of an impression-wheel-carrier-supporting frame pivotally supported on said rotatable body, a fixed, internal gear located below the pivotal point of the carrier-frame and having its teeth concentric to the axis of rotation of said body; an impression-wheel carrier rotatably supported in the pivoted frame; an impression-wheel having impression devices mounted on said carrier above the pivotal point of the frame; a driving-pinion located below the pivotal point of the carrier-frame with its axis coincident with the axis of the carrier and shiftable longitudinally of said carrier into and out from engagement with the internal gear; means for rotating the movable body to impart an orbital movement to the frame and impression wheel carrier; means located to shift the pinion of the impression-wheel carrier into operative engagement with the internal gear at a predetermined point in the orbital movement of said carrier; means for effecting a centripetal movement of the pinion with respect to its orbit at a predetermined point in the rotative movement thereof, to thereby effect a centrifugal movement of the upper impression wheel-carrying end of the carrier.

97. A rotative impression-device support pivotally supported intermediate its ends for movement in a direction crosswise of its longitudinal axis, combined with actuating devices connected with said support at one side of its pivot and including two intermeshing gear elements one of which has an offset portion for effecting a lateral movement of the other, whereby to rock the support on its pivot at a predetermined point in the rotation thereof; an impression device mounted on said support at the opposite side of said pivot; and means for imparting an orbital movement to said support.

98. The combination, with a rotatable turret and with means for rotating said turret of a rotary impression-device support pivoted near its middle portion, to the turret, near the periphery thereof for movement in a plane crosswise of the path of rotation of the turret; a driving-pinion carried on the support at one side of said pivot; an impression device mounted on said support at the opposite side of said pivot; and means for intermittently rotating the pinion, said means including a fixed internal gear meshing with the driving-pinion and having an offset portion for shifting said pinion laterally to rock the support on its pivot at a predetermined point in the rotative movement thereof.

99. The combination, with a rotatable turret and with means for rotating said turret of a rotatable impression-device support pivoted intermediate its ends on the periphery of said turret for movement in a plane crosswise the path of movement of said turret; an impression device mounted on the support at one side the pivotal point thereof; a driving-pinion in shiftable connection with said support at the opposite side of said pivotal point; an internal gear fixedly supported with its teeth concentric to the axis of the turret and in position to rotate said pinion when the same is in mesh therewith and embodying an offset tooth portion effective at a predetermined point in the revolution of said pinion about said internal gear for shifting the same laterally; and means for shifting the pinion into and out of mesh with the internal gear at predetermined points in the orbital movement of the support.

100. In a machine for making impressions, the combination, with a horizontally-rotative turret and with means for rotating the same, of a shaft-carrying frame pivotally mounted on said turret at one side the axis thereof for radial movements with respect to said axis; a two-part shaft journaled in vertical bearings in the frame and one part of which is shiftable longitudinally of the other part, and the other part of which is held as against longitudinal movement; an impression device fixed to the non-shiftable part; a pinion fixed to the shiftable part; means for shifting the pinion and the part carrying said pinion vertically at predetermined points in the rotation of the turret to throw the pinion into and out of mesh with an internal gear; and means including an internal gear having an offset tooth portion for controlling the rotative movements of the pinion and two-part shaft, and for effecting a radial movement of said pinion at a predetermined point in the orbital and rotative movements of said shaft.

101. A hypocycloidal train of gears comprising two members one of which is rotatably supported and is shiftable in the plane of its axis of rotation and in a direction crosswise to said axis, combined with means for shifting one member into and out of engagement with the other member.

102. In a machine for making impressions, the combination, with a rotatable turret having an impression device mounted thereon for rotative movement independent of said turret and with a reciprocatory carriage, of feed mechanism in operative relation with the turret and carriage, and embodying two co-operative devices both of which are supported independent of the turret, and one of which is capable of movement independent of, and constitutes a controlling-actuator for, the other.

103. In a machine for making impressions, the combination, with a rotatable turret having an impression device supported thereon for rotative movements independent of said turret, and with a reciprocatory platen-carriage, of power-driven feed mechanism in operative relation with the turret and carriage and embodying two co-operative devices both of which are supported independent of the turret for rotative movements, and one of which is capable of movement independent of, and constitutes a controlling-actuator for, the other.

104. The combination, with a shiftable carriage, of compound feed mechanism in operative connection with said carriage and comprising two independent feed devices supported in co-operative relation, and one of which devices includes a series of radially-disposed, pivotally-supported actuators shiftable in planes transverse to the path of rotation of said device and into position for engaging and actuating the other feed device.

105. The combination, with a rotatable turret and turret-rotating mechanism and with a rotatable impression device mounted upon said turret, of a shiftable carriage; a compound feed mechanism in operative connection with the carriage and comprising a primary and a secondary rotary feed device, both of which are supported independent of the turret, and the former of which is normally active, and the latter of which is normally inactive, and which primary feed device includes a shiftable actuating instrumentality controlled by the impression device for intermittently actuating the secondary feed device.

106. The combination, with a shiftable carriage and with a rotatable impression device, of compound feed mechanism in operative connection with the carriage and comprising a primary feed device having a series of settable actuators disposed radially about a common center for orbital movements, and independently shiftable in planes transverse to the orbit into two extreme positions; a secondary rotary feed device in operative connection with the carriage and disposed in position to be engaged and rotated by successive actuators when in one of their extreme positions, whereby to intermittently advance the carriage a space-distance; and means operated by the rotatable impression device for independently setting said actuators into position for operating the secondary feed device.

107. In a machine for making impressions, the combination, with a rotatable turret and actuating means therefor and with a rotatable impression device mounted on said turret for hypocycloidal movements, and means for rotating said impression device, of a carriage having a feed-rack, and carriage-feed mechanism including a feed-wheel in geared connection with the rack of the carriage; a reciprocatory actuator pivotally supported independent of the turret for movement into a position for engaging and rotating the feed-wheel; a rotatable carrier for said actuator said carrier being independent of the turret; and a reciprocatory member normally intersecting the path of movement of, and actuated by, the impression device for setting the feed-wheel actuator in a feed-wheel-actuating position at a predetermined point in the orbital movement of said impression device.

108. In a machine for making impressions, a shiftable carriage; a rotatable turret; a rotatable impression member carried on said turret; and means for actuating the turret and impression member, combined with a primary feed device in operative connection with, and constructed and organized to be continuously rotated by, said turret, and including a feed-wheel actuator supported independent of the turret and operated by the impression member for intermittently actuating a secondary feed device, and a secondary feed device in operative connection with the carriage and including a feed-wheel disposed in position to be intermittently operated by the said actuator.

109. In a machine of the class specified, a compound feed mechanism comprising a continuously-progressive and an intermittently-progressive feed device, the former of which includes a rotary member having a series of radially-disposed, pivotally-supported feed-wheel actuators, each having at the free end thereof a pin settable into position for actuating a feed-wheel, and the latter of which includes a feed-wheel with radial arms disposed in position to be successively engaged and operated by the pins of the actuators.

110. The combination, with an impression-device support and rotating means therefor, of a shiftable carriage, and feed mechanism operatively connecting the carriage and support and comprising a rack on the carriage, an intermittently-progressive feed device including a feed-wheel in geared connection with the carriage-rack, a continuously-progressively feed device including two intermeshing gear-wheels, one of which is mounted on the support and the other of which is supported independent of the turret for rotative movement and has a series of feed-wheel actuators independently shiftable into position for engaging and rotating said feed-wheel.

111. In a machine for making impressions, the combination, with a rotatable turret and actuating means therefor, and with a rotatable impression device mounted on said turret for orbital movement, and rotating means for said impression device, of a shiftable platen-carriage; a feed-wheel in geared connection with said carriage; an indicator-wheel supported at one side the axis of, and in geared connection with, the turret, and having a series of settable feed-wheel actuators independently shiftable into the path of rotation of the feed-wheel; means operable by the impression device, in its orbital movement with the turret, for setting the actuators into position for operating the feed-wheel; and means for retracting the set-actuator at a predetermined point in the rotative movement of the indicator-wheel.

112. In a machine for making impressions, the combination with a turret and with means for rotating said turret, of an impression device rotatably mounted on said turret; means for imparting a rotary movement to said impression device independent of its orbital movement with said turret; a reciprocatory carriage including a rack; a star-wheel in geared connection with said rack; an indicator-wheel supported for rotation at one side of, and in geared connection with, said turret; a series of pins carried by said indicator-wheel and shiftable into position for engaging an arm of, and rotating, the star-wheel; and means disposed in the path of orbital and rotative movements of the impression device, and operated by said impression device prior to its arrival at the impression-point for setting a pin into position for operating the feed-wheel, and said indicator-wheel being so timed in its rotative movements, and the star-wheel being so positioned relatively to said wheel that a movement of the star-wheel will be effected after the arrival of the impression device at the impression-point.

113. In a machine of the class specified, the combination, with a rotatable turret and means for rotating the same, and with a shiftable carriage, of an impression member mounted on the turret for hypocycloidal movement; feed mechanism in operative connection with the carriage and comprising an intermittently-operable carriage-actuating train of gears; a continuously-operable train of gears embodying a series of shiftable indicating-actuator ssupported by one of said gears for orbital movement independent of said turret and shiftable into and out of operative relation with the actuating member of the intermittently-operable train of gears; and means operable by the impression member at a predetermined point in the hypocycloidal movement thereof for shifting the indicating-actuator into and out of operative relation with the intermittently-operable train of gears.

114. A turret; means for rotating said turret; a series of independent impression devices mounted on said turret for hypocycloidal movements; means for actuating said impression devices, combined with a reciprocatory carriage; carriage-feed mechanism in operative relation with the turret and carriage and comprising a train of gears, one of which includes a feed-wheel and another of which includes a series of independently-operable actuators shiftable into position for operating the feed-wheel, and which actuators are independent of the turret; and means operative by the impression devices at a common point in their respective hypocycloidal movements for shifting the actuators into position for operating the feed-wheel.

115. An impression device supported for hypocycloidal movements, means for imparting these movements to said impression device, combined with a reciprocatory carriage; and a carriage-feed train of gears embodying a feed-wheel, and a series of orbital, movable feed-wheel actuators having their common orbital axis at one side, and independent of, the impression device, and supported, organized, and operating, with respect to said impression device, to effect a feed movement of the train subsequent to an impression movement of said device.

116. The combination, with a shiftable carriage and with an impression device supported for combined orbital and radial impression movements, of a carriage-feed train of gears in operative connection with the carriage, and independent actuating devices relatively organized and timed to effect an impression movement of the impression device, and a movement of the feed train, the former movement in advance of the latter.

117. The combination, with a shiftable carriage and with an impression device supported to have hypocycloidal and advancing movements in making an impression, of a carriage-feed train of gears in operative connection with the carriage and embodying a feed-wheel; and independent actuating devices relatively organized and timed in their movements to effect a combined hypocycloidal and advancing impression movement of the impression device and a carriage-advancing movement of the feed-wheel, the former in advance of the latter.

118. In a machine of the class specified, the combination, with a rotatable turret, of a rotatable impression device carried on said turret; rotating instrumentalities for the turret and impression devices; a shiftable carriage having a rack; carriage-feed mechanism comprising a primary train of intermeshing gears, one gear of which is carried by the turret and another of which is mounted independent of said turret and has a series of shiftable indicating-actuators constructed and organized to be set by the operation of the impression device so as to intermittently actuate a secondary train of gears; and a secondary train of gears in operative connection with the carriage-rack and embodying a star-wheel adapted to be rotated by a set-actuator of the primary train.

119. The combination, with a rotatable turret and means for rotating the same, of an impression device mounted on the turret for hypocycloidal and advancing and retracting movements; a shiftable carriage including a rack; and carriage-feed mechanism embodying a constantly-rotating device and an intermittently-rotatable device, the former of which includes an indicator-wheel mounted independent of the turret and having a series of indicating-actuators shiftable at a predetermined point in the operation of the impression device into and out of the path of movement of the intermittently-rotatable device and constructed and organized to intermittently actuate said device and thereby effect an intermittent feed movement of the carriage.

120. A rotatable turret; an impression device supported for hypocycloidal and advancing and retracting movements on said turret; a shiftable carriage, and means for actuating the turret and impression device, combined with feed mechanism comprising two independent trains of gears, one of which is in operative connection with the turret, and the other of which is in operative connection with the carriage, and the former of which includes an indicator-wheel supported for rotation independent of the turret and has a series of shiftable actuators controlled by the impression device at a predetermined point in the hypocycloidal movement thereof, and the latter of which has a star-wheel located to be intermittently operated by said actuators.

121. The combination, with a rotatable turret, of a pinion fixed to, and rotating with, said turret; an independently-supported gear-wheel meshing with said pinion and carrying a series of settable pins shiftable transversely of the plane of said wheel into and out of the path of movement of a complementary rotatable device; means for independently setting said pins in operative relation with the complementary device; a complementary rotatable device having a member located in operative relation with, and adapted to be operated by, said pins; and means located to return said pins to their normal inoperative positions at predetermined points in the rotative movement of the pin-carrying gear-wheel.

122. The combination, with a rotatable turret and with an impression device supported on said turret to have orbital and radial movements, of actuating mechanism for said turret and impression device; a feed-wheel actuating device supported for rotation at one side of said turret and having a series of circumferentially-disposed pins shiftable between two extreme positions transversely of the path of said device; means for rotating said feed-wheel actuating device; a pin-shifting device located in the path of movement of the impression device and organized to advance the pins to one of their extreme positions independently; a shiftable carriage; gearing in operative engagement with said carriage and embodying an intermittently-rotatable feed-wheel disposed in position to be actuated by the shiftable pins when in one of their extreme positions and means located in the path of, and adapted for retracting, said pins.

123. A key-controlled device comprising a rotatable pin-carrying member having a series of pivotally-supported, radially-disposed actuators, each having a pin at the free end thereof shiftable transversely of the path of movement of said member into two extreme positions, combined with means constructed and organized to shift said pins automatically during the rotation of said member, first into one and then into another extreme position; and complementary mechanism intermittently actuated by said pins while in one of their extreme positions.

124. A key-controlled device comprising a rotatable pin-carrying member having a series of pivotally-supported, radially-disposed actuators, each having a pin at the free end thereof shiftable transversely of the path of movement of said member into two extreme positions, combined with means constructed and organized to automatically shift said pins, during the rotation of said member, first into one and then into another extreme position; complementary mechanism intermittently actuated by said pins while in one of their extreme positions; and means for locking the actuators in their shifted positions.

125. A key-controlled device comprising a rotatable pin-carrying member having a series of pivotally-supported, radially-disposed actuators, each having a pin at the free end thereof shiftable transversely of the path of movement of said member into two extreme positions, combined with means constructed and organized to shift said pins, during the rotation of said member, first into one and then into another extreme position; complementary mechanism intermittently actuated by said pins while in one of their extreme positions; and automatically-operative detent devices for engaging the actuators and for holding them in their advanced and retracted positions alternately.

126. In a machine for making impressions, the combination, with an impression device supported for differential movements and with power-operated key-controlled mechanism for imparting an impression movement to said device, of a shiftable carriage; and power-actuated feed mechanism constructed, organized, timed and operating to have an ineffective or idle movement during the first portion of the impression movement of said device and to have a carriage-actuating movement succeeding the impression movement of said impression device.

127. In a machine for making impressions, the combination, with an impression member supported for differential movements, of power-actuated key-controlled mechanism for imparting to said impression member a hypocycloidal movement to bring the proper character to the impression point, and for imparting a radial impression movement to said device at a predetermined point in the hypocycloidal movement thereof; a shiftable carriage; a power-actuated feed mechanism constructed, organized, timed, and operating to have an ineffective or idle movement during the first portion of the hypocycloidal movement of the impression device and to have a carriage-actuating movement succeeding the impression movement of said impression device.

128. In a machine for making impressions, the combination, with an impression member and means for imparting an impression movement to said member, of a shiftable carriage; and a compound power-actuated feed mechanism comprehending a normally-rotative feed device, the former of which includes a series of settable actuators controlled by the impression member, and which actuators are adapted for controlling the intermittent movements of the secondary feed device, and which feed mechanism is so constructed and organized, and is so timed in its movements relatively to the movement of the impression member as to have an idle or ineffective movement during the first part of the impression movement of said member and to have a carriage-shifting movement immediately succeeding the impression movement of said impression member.

129. The combination, with a shiftable carriage; of a movable impression device; means for imparting an impression movement to said device; power-actuated feed mechanism in normal effective relation with the carriage and controlled in its carriage-feeding operation by the impression device at one point in the movement thereof, and organized to effect a step-by-step advancing movement of said carriage; key-controlled instrumentalities for temporarily disconnecting the feed mechanism and carriage; and means organized to retract the carriage automatically concurrently with the disconnection of the feed mechanism and said carriage.

130. The combination, with a shiftable carriage and with a rotatable power-operated impression device, of power-driven feed mechanism organized to impart a step-by-step movement to the carriage at predetermined points in the rotative movement of the impression device and embodying a clutch for normally maintaining connection between the feed mechanism and carriage; key-actuated instrumentalities for releasing the clutch; and means organized to retract the carriage on the release of said clutch.

131. The combination, with a rotary turret and rotating means therefor, and with a rotary impression device mounted on said turret for hypocycloidal movements and means for rotating said impression device, of a shiftable carriage; power-operated feed mechanism controlled by the impression device at predetermined points in the hypocycloidal movements thereof for effecting a step-by-step advancing movement of said carriage and embodying a clutch normally connecting the feed mechanism and carriage; and key-actuated devices constructed and organized to release the clutch to disconnect said feed mechanism and carriage and permit a retractive movement of said carriage.

132. The combination, with a shiftable carriage and with a rotatable impression device and means for rotating said impression device, of a compound rotary feed mechanism organized to impart a step-by-step movement to the carriage and comprising a primary feed device embodying settable instrumentalities controlled by the impression device, and a secondary feed device controlled in its movements by the ordinary feed device and embodying a clutch; a power-rotated instrumentality for actuating the primary feed device; key-actuated devices for releasing the clutch, whereby temporarily to disconnect the feed mechanism and carriage; and means for automatically retracting the carriage.

133. The combination with a shiftable carriage, of power driven impression devices, power driven rotatable feed mechanism in normal in-operative connection with said carriage and organized to impart a step-by-step advancing movement to the carriage, means for actuating the step-by-step mechanism, means for retracting the carriage, and key controlled instrumentalities constructed, organized and operable for temporarily disconnecting the operative connection between parts of the feed mechanism normally in operative connection and for thereupon automatically permitting the retractive movement of the carriage.

134. The combination with a shiftable carriage of rotatable feed mechanism in normal operative connection with said carriage and organized to impart step-by-step advancing movement to the carriage; key controlled instrumentalities for temporarily disconnecting the operative connection between the parts of the feed mechanism normally in operative connection and thereupon automatically effecting a retractive movement of the carriage; and a turret for rotating said feed mechanism.

135. The combination with a shiftable carriage of a rotatable impression device; means for imparting an impression movement to said impression device; rotary feed mechanism in normal operative connection with said carriage and controlled by the impression device for imparting an advancing movement to said carriage subsequent to each impression movement of said device; and key controlled instrumentalities for temporarily disconnecting the operative connection between the parts of the feed mechanism normally in operative connection and for thereupon automatically effecting a retractive movement of the carriage.

136. The combination with a shiftable carriage of a rotatable impression device, and with power driven means for imparting a step-by-step movement thereto, of clutch-operating and spring-actuated instrumentalities for automatically effecting a retractive movement of the carriage.

137. The combination with a platen, of feed mechanism for imparting a step-by-step feed movement thereto, continuously active driving mechanism normally disconnected from the feed mechanism, means comprising settable pins carried by said continuously active mechanism for connecting the same with said feed mechanism for effecting a single step of the step-by-step feed, means operative at a predetermined point in the path of advance of the platen for automatically effecting a retractive movement of the platen, and means operative at a predetermined point in said retractive movement for imparting a rotative movement to the platen.

138. The combination with a platen, of feed mechanism for imparting a step-by-step advancing movement to said platen, a clutch for normally connecting said platen to said feed mechanism, means adjustable at various points in the path of movement of the platen for releasing the clutch, means effective upon the release of the clutch for retracting the platen, and means operable by the platen at a predetermined point in its retractive movement for effecting a rotative movement thereof.

139. The combination, with an impression device supported for hypocycloidal movement, and with power mechanism for actuating the same, of a shiftable carriage; feed mechanism in operative connection with said carriage and organized to impart a longitudinal advancing movement thereto; key-controlled instrumentalities including a solenoid operable for temporarily disconnecting the feed mechanism and carriage and for effecting a retractive movement of said carriage; and mechanism including a solenoid operable for shifting the carriage in a plane transverse to the path of longitudinal movement thereof.

140. The combination, with a rotatable impression-device carrier supported for orbital movement and having a series of rows or circuits of impression devices, and with a shiftable platen located in operative relation with said impression-device carrier, of actuating devices organized to impart orbital and rotative movements to the impression-device carrier and a longitudinal feed movement to the platen; and key-controlled instrumentalities, including a solenoid, constructed and operable for shifting the platen in a plane transverse to the path of rotation of the impression-device carrier.

141. The combination, with an impression device supported for hypocycloidal and radial movements, and with means for actuating said device, of a platen-carriage supporting-frame; means organized to shift said frame from one to another extreme position transversely of the hypocycloidal path of the impression device; a platen-carriage shiftably mounted on said frame; feed mechanism organized to impart a feed movement to the platen-carriage in a plane at right angles to the plane of movement of its carrying frame; a platen rotatably supported on said platen-carriage; and actuating devices for said platen.

142. The combination, with an impression device supported for rotative and radial movements, and with means for imparting these movements to said impression device, of a platen-carriage supporting-frame; means organized to shift said frame from one to another extreme position transversely of the path of rotation of the impression device; a platen-carriage shiftably mounted on said frame; power-driven rotary-feed mechanism organized to impart a feed movement to the platen-carriage in a plane at right angles to the plane of movement of its carrying frame; a platen rotatably supported on said platen-carriage; and actuating devices for said platen.

143. The combination, with an impression-device carrier supported for rotative, orbital, and radial movements, and with means for imparting these movements to said carrier, of a platen-carriage supporting-frame shiftable between two extreme positions transversely of the path of rotation of the impression-device carrier; key-controlled actuated devices including a rock-shaft and a solenoid for shifting said frame from one to another extreme position; a platen carriage supported for movement on said frame; feed mechanism for imparting a step-by-step advancing movement to the platen in a plane at right angles to the movement of its supporting-frame; and key-controlled instrumentalities for disconnecting the feed mechanism and carriage and for effecting a retractive movement of said carriage.

144. The combination, with an impression-device carrier supported for rotative, orbital, and radial movements, and with means for imparting these movements to said carrier to make the impression, of a platen-carriage supporting-frame shiftable between two extreme positions transversely of the path of rotation of said carrier; key-controlled actuating devices including a rock-shaft and a solenoid for shifting said frame from one to another extreme position; a platen-carriage supported for movement on said frame, rotative power-driven feed mechanism controlled by the impression device at a predetermined point in the orbital movement thereof for imparting a step-by-step advancing movement to the carriage in a plane at right angles to the movement of its supporting frame; and key-controlled instrumentalities for disconnecting the feed mechanism and carriage and for effecting a retractive movement of said carriage.

145. The combination, with an impression-device carrier having a plurality of circuits of impression devices, and with means for imparting hypocycloidal and radial impression movements thereto, of a platen carriage supporting-frame shiftable between two extreme positions crosswise of the path of hypocycloidal movement of said carrier and pivotally supported so as to move in the arc of a circle during such shifting movement; key-controlled devices in operative connection with, and effective for shifting, said frame from one end to the other of its extreme positions; a platen-carriage supported on said frame for movement in two directions one movement with, and the other independent of, said frame and having a platen in operative relation with the impression device carrier; and means for actuating the platen-carriage and platen.

146. The combination, with a carrier having a plurality of circuits of impression devices, and with means for imparting hypocycloidal and radial impression movements thereto, of a platen-carriage supporting-frame shiftable between two extreme positions crosswise of the path of hypocycloidal movement of said carrier and pivotally supported so as to move in the arc of a circle during such shifting movement; key-controlled devices in operative connection with, and effective for shifting, said frame from one to the other of its extreme positions, a platen-carriage supported on said frame for movement in two directions one movement with, and the other independent of, said frame, and having a platen in operative relation with the impression-device carrier; power-actuated mechanism in operative connection with, and effective for imparting a step-by-step longitudinal advancing movement to, the platen-carriage and embodying a clutch operable for normally retaining the same in operative relation with said carriage; means controlled by the impression device at a predetermined point in the hypocycloidal movement thereof for effecting a carriage-feed movement of the feed mechanism; means for releasing the clutch to disconnect the feed mechanism and carriage; and means for automatically retracting the carriage on the release of said clutch.

147. The combination, with a rotatable turret and with means for rotating said turret, of an impression device pivotally supported on said turret at one side the axis thereof for orbital, rotative, and radial movements; a reactionary platen-carriage-supporting-frame shiftable in the arc of a circle between two extreme positions transversely of the orbit of the impression-device; a rock-shaft having a crank-arm pivotally connected with said frame; an adjusting device in connection with said rock-shaft; means including a solenoid in operative connection with the crank and effective for shifting the platen-carriage supporting-frame from one to another of its extreme positions; a platen-carriage mounted on said frame and having a longitudinal movement in a direction crosswise the direction of movement of said frame; and power-actuated feed mechanism in operative connection with the carriage and turret and effective at predetermined points in the orbital movements of the impression device for imparting a longitudinal movement to the platen-carriage.

148. The combination of a rotatable impression-wheel carrier; a reactive carriage-supporting frame shiftable between two extreme positions in the plane of the axis of movement of said impression-wheel carrier; means for shifting said frame from one to the other of its extreme positions; an adjustably-supported crank-shaft in operative connection with the frame and effective for rocking or moving the frame laterally during the shifting movement thereof; and means for adjusting said crank-shaft to increase or decrease the range of lateral movement of the frame with respect to a given point.

149. The combination with a suitable support, of a platen-carriage-supporting frame pivotally mounted on said support and shiftable between two extreme positions; a platen-carriage mounted on said frame for longitudinal movement independently thereof; key-controlled instrumentalities including a solenoid and suitable connections for shifting the frame from one to the other of its extreme positions; means in connection with, and adapted for effecting a rocking movement of, the frame during the shifting movement thereof from one to the other of its extreme positions; and means for controlling the movements of the platen-carriage.

150. The combination with framework, of a rotatable impression-wheel carrier; an impression-wheel mounted on said carrier and having two independent circuits of impression devices; means organized and connected to rotate said impression-wheel carrier and impart an impression movement thereto; a platen-carriage-supporting frame shiftable between two extreme positions in a plane crosswise of the plane of movement of the impression-wheel; a platen-carriage shiftably supported on said platen-carriage-supporting frame and having a platen shiftable with said frame into operative relation with one or the other circuits of impression devices, selectively; a frame-shifting lever in pivotal connection with and effective for shifting the frame from one to the other of its extreme positions to bring the platen into operative relation with one or the other circuits of impression devices; an electromagnet having an electrically-actuated device in operative connection with said frame-shifting lever and effective for actuating said lever to shift the frame; an electrical circuit connected to energize the magnet; and a key-actuated circuit-closer located in said circuit and operative for controlling the energization of said magnet.

151. The combination with framework, of a rotatable impression-wheel carrier; an impression-wheel mounted on said carrier and having two independent circuits of impression devices; means organized and connected to rotate said wheel carrier and impart an impression movement thereto; a platen-carriage-supporting frame shiftable between two extreme positions in a plane crosswise of the plane of movement of the impression-wheel; a platen-carriage shiftably supported on said platen-carriage-supporting frame and having a platen shiftable with said frame into operative relation with one or the other of the circuits of impression devices; a frame-shifting lever in pivotal connection and effective for shifting the frame from one to the other of its extreme positions to bring the platen into operative relation with one or the other of the circuits of impression devices; of an electromagnet having an electrically-actuated device in operative connection with said frame-shifting lever and effective for actuating said lever to shift the frame; an electrical circuit connected to energize the magnet; a key-actuated circuit-closer located in said circuit and operative for controlling the energization of said magnet; a crank-shaft pivotally connected with the frame, remote from and between the opposite ends thereof and effective for moving the frame laterally during the shifting movement thereof to cause the platen to traverse a curvilinear course in its movement from one to the other of its operative positions with relation to the two circuits of impression-devices; and an adjusting device in connection with said crank-shaft.

152. The combination with the main framework; of a rotatable impression-wheel having two independent circuits of impression devices; means organized to rotate said impression-wheel and impart an impression movement thereto; a platen-carriage-supporting frame shiftable between two extreme positions in a plane crosswise of the plane of rotation of the impression-wheel; means organized to normally hold the platen-carriage-supporting frame in one of its extreme positions; a frame-shifting lever in operative connection with the platen-carriage-supporting frame; a solenoid having a shiftable core in operative connection with said lever and operative for actuating said lever to shift the platen-carriage-supporting frame from its normal to its other extreme position; an electrical circuit embodying a key-actuated circuit-closer for energizing the solenoid; a platen-carriage mounted on the carriage-supporting frame for movement in a plane crosswise of the plane of movement of said frame and having a platen in normal operative relation with one of the circuits of impression devices of the impression-wheel and shiftable with the carriage-supporting-frame into operative relation with the other circuit of impression devices; and independent devices for advancing and retracting the carriage.

153. The combination, with a reactionary shiftable carriage, of power-rotated feed mechanism in operative connection with, and effective for imparting step-by-step advancing movements to the carriage and embodying a carriage-releaser; a rock-shaft connected to operate the releaser; and an electromagnet having means connected with, and operable for controlling the operation of, said rock-shaft.

154. The combination, with a shiftable carriage, of power-driven rotary feed mechanism in normal operative connection with, and effective for imparting a step-by-step advancing movement to, the carriage and including a carriage-releaser; a rock-shaft connected to operate the releaser; means including an electromagnet in operative connection with, and effective for controlling the operation of, said rock-shaft; and means effective on the release of the carriage for automatically retracting the same.

155. The combination, with suitable frame, of a carriage mounted on said frame; power-driven rotary feed mechanism in normal effective connection with said carriage and embodying a clutch device operable for disconnecting the feed mechanism and carriage; means including an electromagnet, a rock-shaft and intermediate connections for releasing the clutch device; means for energizing and deënergizing said magnet to control the operation of the clutch device; and means for retracting the carriage on the release of said clutch device.

156. A longitudinally-shiftable carriage and power-driven rotary feed mechanism in normal effective connection with said carriage and adapted for feeding said carriage in one direction and embodying a carriage-releaser; combined with releaser-actuating means comprising a rock-shaft in operative connection with the releaser; an electrical circuit; a solenoid in said circuit and having a shiftable core in operative connection with the rock-shaft; a circuit-closer located in said circuit; a key for actuating said circuit-closer; and means operable upon the release of said carriage for shifting said carriage in a direction opposite to the direction of its feed movement.

157. A rotary turret; means for rotating said turret; an impression device supported in said turret for hypocycloidal and radial movements; and means for actuating the impression device, combined with a longitudinally shiftable carriage; power-driven rotary feed mechanism controlled by the impression device and in normal effective connection with said carriage and embodying a carriage-releaser; a rock-shaft in operative connection with the releaser; rock-shaft-actuating devices controlled by the feed movement of the carriage to actuate said shaft and thereby disconnect the feed mechanism and carriage at a predetermined point in the feed movement of said carriage; and carriage-retracting means operable upon the actuation of said rock-shaft for retracting the carriage.

158. The combination with a rotary power-actuated turret, and with a power-actuated impression device supported thereon for rotative and radial movements, of a shiftable supported carriage; power-driven feed mechanism controlled by the impression device at a predetermined point in its orbital movement, and in normal operative connection with said carrier; a rock-shaft journaled in bearings on said frame in operative relation with the carriage and having a rocker-arm thereon; a rock-shaft actuator located on the carriage in position to engage the rocker-arm and thereby rock the rock-shaft; means intermediate of the feed mechanism and rock-shaft and controlled by the movement of said rock-shaft to release the carriage; and means for effecting a retractive movement of said carriage.

159. The combination, with a reactive carriage having a rotatable platen, and with means for advancing said carriage with a step-by-step movement, of a longitudinally-fixed rock-shaft disposed in parallelism with the platen; a carriage-releaser operable by said rock-shaft; and rock-shaft actuating instrumentalities comprising a cam-faced rocker-arm fixed to said rock-shaft and a rocker-arm actuator located on the carriage in position to co-operate with, and partially rotate, the rocker-arm and the rock-shaft at a predetermined point in the advancing movement of said carriage, whereby to operate the releaser, free the carriage, and permit a retractive movement of said carriage.

160. The combination, with a reactive carriage having a rotatable platen, and with means for advancing said carriage with a step-by-step movement, of a longitudinally-fixed rock-shaft disposed in parallelism with the platen; a carriage-releaser operable by said rock-shaft; rock-shaft actuating instrumentalities comprising a cam-faced rocker-arm fixed to said rock-shaft and a rocker-arm actuator located on the carriage in position to co-operate with, and partially rotate, the rocker-arm and the rock-shaft at a predetermined point in the advancing movement of said carriage, whereby to operate the releaser, free the carriage, and permit a retractive movement of said carriage; and means in connection with said carriage and rocker-arm and effective at a predetermined point in the retractive movement of said carriage for automatically imparting a rotative movement to the platen.

161. The combination, with a suitable frame, of a longitudinally shiftable carriage having a rotatable platen; feed mechanism in normal effective relation with the carriage and organized to impart a step-by-step advancing movement to said carriage and which feed mechanism includes a clutch; carriage-retracting means operative on the release of said clutch for retracting said carriage; a rock-shaft journaled in bearings on the frame with its axis in parallelism with the longitudinal axis of the platen and having a cam-faced rocker-arm in position to be actuated by a fixture on the carriage at a predetermined point in the advancing movement of said rocker; a fixture on said carriage co-operative with the rocker-arm to actuate the rock-shaft; and a clutch-actuating device operable on the movement of the rock-shaft in one direction for disconnecting the feed mechanism and carriage, and operable on the movement of the rock-shaft in the opposite direction for connecting the feed mechanism and carriage.

162. The combination, with a shiftable reactive carriage having a rotatable platen and with a feed mechanism in normal effective connection with said carriage and effective for imparting a step-by-step advancing movement thereto, and embodying a carriage-releaser, of a rock-shaft in operative connection with the carriage-releaser and supported with its axis in parallelism with the longitudinal axis of the platen; means including a cam-faced arm operable at a predetermined point in the advancing movement of the carriage for rocking the rock-shaft in one direction to release the carriage from effective connection with the feed mechanism; means operable at a predetermined point in the retractive movement of the carriage for rocking the carriage in an opposite direction, whereby to reëstablish an effective connection between the feed mechanism and carriage; and means operable at a predetermined point in the retractive movement of said carriage for imparting a rotative movement to the platen.

163. The combination, with a shiftable carriage having a rotatable platen, and with feed mechanism embodying a clutch operable for connecting and disconnecting the carriage and feed mechanism, of a rock-shaft supported with its axis in parallelism with the axis of the platen and including a clutch-actuating device; two independent rock-shaft actuators, one of which includes a cam-faced rocker-arm and is effective at a predetermined point in the advancing movement of the carriage for rocking the rock-shaft in one direction to release the clutch, and the other of which is operative at a predetermined point in the retractive movement of the carriage to rock the shaft in an opposite direction to reëngage the clutch members; and means operable upon the disconnection of the feed mechanism and carriage for automatically retracting said carriage.

164. The combination, with a shiftable reactive carriage having a rotatable platen, and with feed mechanism embodying a clutch operable for connecting and disconnecting the carriage and feed mechanism, of a rock-shaft supported with its axis in parallelism with the axis of the platen and including a clutch actuating device; two independent rock-shaft actuators, one of which includes a cam-faced rocker-arm and is effective at a predetermined point in the advancing movement of the carriage for rocking the rock-shaft in one direction to release the clutch, and the other of which is effective at a predetermined point in the retractive movement of the carriage for rocking the shaft in an opposite direction to reëngage the clutch members; and means for automatically retracting said carriage, when the clutch is disconnected.

165. The combination, with a reactive shiftable carriage, of a platen rotatably mounted on said carriage and having a feed-wheel; a feed-lever in operative connection with the feed-wheel; carriage-feed mechanism embodying a clutch, between said feed mechanism and carriage; a rock-shaft supported with its axis in parallelism with the axis of the platen and including a clutch-actuating device; and two independent rock-shaft actuators, one of which includes a cam-faced rocker-arm and is effective at a predetermined point in the advancing movement of the carriage for rocking the rock-shaft in one direction to release the clutch and facilitate a retractive movement of the carriage, and the other of which is operative at a predetermined point in the retractive movement of the carriage for rocking the shaft in an opposite direction to re-engage the clutch members, and instrumentalities for imparting a platen-rotating movement to the feed-lever.

166. The combination with a suitable frame, of a rock-shaft journaled on said frame and having an arm at one end thereof; a reactive platen-carriage having a rotatably-supported platen located in parallelism with the rock-shaft; means organized to advance said carriage with a step-by-step movement; an arm located on said carriage in position to co-operate with and actuate the arm on the rock-shaft at a predetermined point in the advancing movement of said carriage; and means organized to rotate the platen.

167. The combination with a suitable frame, of a rock-shaft journaled on said frame and having a cam-faced arm at one end thereof; a reactive platen-carriage having a rotatably-supported platen located in parallelism with the rock-shaft; means organized to advance said carriage with a step-by-step movement; an arm located on said carriage in position to coöperate with and actuate the cam-faced arm on the rock-shaft at a predetermined point in the advancing movement of the carriage; and platen-rotating devices controlled by the retractive movement of the carriage for rotating said platen.

168. The combination with a suitable frame, of a platen-carriage supported on said frame for longitudinal movement and having a rotatable platen; a rocker-arm actuator carried on said carriage; a rock-shaft journaled on said frame and held as against longitudinal movement with its axis in parallelism with the axis of the platen; a rocker-arm adjustably secured to the rock-shaft and having a cam-face intersecting the path of the rocker-arm actuator; independent means for advancing and retracting the carriage; and means controlled by the retractive movement of said carriage for automatically imparting a rotative movement to the platen at a predetermined point in the retractive movement of the carriage.

169. The combination, with a suitable frame, of a rock-shaft journaled on said frame and having a laterally-extending arm fixed to one end thereof; a reactive carriage having a rotatable platen; means organized to advance the carriage and platen in a line substantially parallel to the axis of the shaft; a clutch in connection with, and controlled by, the rock-shaft; a cam-faced arm fixed to said carriage in position to engage the rock-shaft arm and rock the rock-shaft, whereby to release the clutch and facilitate a retractive movement of the carriage; and means operable at a predetermined point in the retractive movement of the carriage for rotating the platen.

170. The combination with a shiftable carriage having a rotatable platen and with means for advancing and retracting said carriage, of a rock-shaft and subsidiary instrumentalities organized to control the retractive and advancing movement of the carriage; rock-shaft-actuating devices controlled by the advancing movement of the carriage to rock the shaft in one direction and thereby permit the retractive movement of the carriage; magneto-electric rock-shaft-actuating instrumentalities having a contact-point located in the path of retractive movement of, and actuated by, the carriage, to effect a movement of the rock-shaft in a reverse direction and thereby permit the advancing movement of said carriage; and platen-feeding devices controlled by the latter movement of the rock-shaft for rotating said platen.

171. The combination with a suitable frame, of a rock-shaft journaled on said frame; a solenoid having a shiftable core in operative connection with, and effective for operating, said rock-shaft; a platen-carriage shiftable on said frame and having a rotatable platen; means organized to shift said carriage; a normally open electrical circuit in connection with the solenoid and having a contact device located in the path of movement of, and operable by, the carriage for closing the circuit to energize the solenoid at a predetermined point in the movement of the carriage and thereby effect a rocking movement of the rock-shaft; and platen devices controlled by the rocking movement of said rock-shaft, for effecting a rotative movement of said platen, substantially simultaneously with the operation of the contact device.

172. The combination with a rotatable platen and fixed arret, a tensioned rod, upon which the platen is mounted, a frame between the ends of which said rod is stretched and thereby put under permanent tension, and means independent of said rod and controlled by the rocking of the shaft for imparting longitudinal relative movement to the platen upon the rod.

173. The combination, with an axially-recessed type-writer platen, of a longitudinally and circumferentially fixed platen-carrier rod extending entirely through said platen; platen-shifting means organized and connected to shift the platen longitudinally of said rod; and means in connection with said rod and the recess of said platen for cushioning said platen at the end of its longitudinal movement.

174. In a type-writer, the combination, with a frame, of a longitudinally and circumferentially fixed platen-carrier rod; a platen supported on said rod for longitudinal and rotative movements relatively to said rod; platen-actuating devices independent of said carrier-rod and organized and connected to effect longitudinal and rotative movements of said platen; and means combined with said platen-carrier rod for cushioning the platen at the end of one longitudinal movement thereof.

175. The combination, with a frame having a longitudinally and circumferentially fixed platen-carrier rod, of a platen-carriage supported on said rod for longitudinal movement and having a feed-rack in substantial parallelism with, and at one side of, said rod; a tubular platen journaled at its opposite ends on said rod for rotative movements relatively thereto independent of the movement of the carriage, a dash-pot device; feed mechanism in operative connection with the carriage-rack and organized to shift said carriage and platen longitudinally of the carrier-rod; and platen-feed devices organized to rotate said platen relatively to said rod.

176. A platen having a central longitudinal opening; combined with a platen-carrier rod extending through said opening; and a dash-pot located within the platen and having one member thereof movable longitudinally of said rod.

177. The combination with a suitable frame, of a longitudinally-shiftable platen; feed mechanism organized to advance said platen; key-controlled devices for effecting a retractive movement of said platen; and a dash-pot supported within and concentric to the axis of said platen and effective for cushioning said platen on the retractive movement thereof.

178. The combination with a suitable frame having a guide-rod adapted for supporting and guiding the platen, of a platen supported concentric to said rod for longitudinal and rotative movements relatively to said rod and having a central dash-pot-receiving chamber; a dash-pot located within the platen and comprising two telescopic members, one of which is fixed to the carrier-rod and the other of which is fixed to the platen; and platen-shifting devices in operative relation with said platen.

179. The combination with a suitable frame, of a tubular platen having at one end thereof an inwardly-projecting dash-pot cylinder; a platen-carrier rod extending through said platen and cylinder and having a diametrically-enlarged portion adapted to enter said cylinder; and platen-shifting devices for shifting the platen and the dash-pot cylinder longitudinally of said rod.

180. The combination with a tubular platen and with shifting devices therefor, of a dash-pot one member of which is fixed and supports the platen and the other member of which is carried by the platen and is shiftable relatively to, and co-operates with, the fixed member for cushioning said platen upon the retractive movement thereof.

181. The combination with a suitable frame and with a tubular platen, of a platen-carrier rod of differential diameters extending through and shiftably supporting said platen; a dash-pot cylinder carried by said platen in concentric relation with said rod; and feed mechanism for shifting the platen longitudinally of said rod.

182. The combination of a tubular platen; a dash-pot tube, of considerably less external diameter than the internal diameter of the platen, extended in and removably secured to one end of said platen; a platen-carrier rod extending through said platen and dash-pot tube and having an enlarged portion adapted to fit into said tube; bushings substantially hermetically sealing the ends of said platen; and means for shifting the platen longitudinally of the carrier-rod.

183. In a machine of the class specified, a fixed platen-supporting rod and a platen supported on said rod for longitudinal and rotary movements relatively thereto, combined with power-feed mechanism for imparting a step-by-step advancing movement to said platen longitudinally; means automatically operative for effecting a retractive movement of said platen at a predetermined point in the advancing movement thereof; means for automatically imparting a rotative movement to the said platen at a predetermined point in the retractive movement thereof; and a dash-pot for cushioning said platen on the retractive movement thereof, one member of which dash-pot is carried by the platen and the other member of which constitutes a part of, the platen-supporting rod.

184. The combination, with a frame, of a platen-carriage supporting rod fixed as against rotative and longitudinal movements; a platen-carriage mounted on said rod for movement longitudinally thereof; a platen supported on said rod for rotative movement relatively to said rod and for longitudinal movement with the carriage; a feed-wheel fixed to said platen with its axis coincident with the axis of the rod; a feed-lever pivotally supported on said rod for movements longitudinally thereof and having a pawl in normal engagement with the feed-wheel; a feed-lever actuator disposed in the path of movement of the carriage and effective at a predetermined point in the longitudinal movement of said carriage for imparting a feed-wheel-actuating movement to said lever; and a cushioning device in operative connection with the platen and effective for cushioning the same on the retractive movement of the carriage.

185. In a type-writer, the combination, with a fixed supporting-rod, of a platen supported on said rod for rotative and longitudinal movements relatively thereto; a feed-wheel and a feed-wheel lever having a common axis of movement coincident with the axis of the platen, and the former of which is fixed to said platen, and the latter of which is pivotally supported upon the rod for movement longitudinally thereof; a pawl carried by the feed-lever in operative relation with the feed-lever; means disposed to automatically operate the feed-lever at a predetermined point in the longitudinal movement of the platen; means for imparting longitudinal movements to said platen; and a dash-pot in operative relation with, and effective for cushioning the platen near the end of the longitudinal movement thereof.

186. In combination with a tubular platen having a feed-wheel at one end thereof and with a tensioned rod extending entirely through said platen and upon which said platen is rotatably mounted, of a platen-rotating device pivotally carried upon said rod and in normal operative engagement with the feed-wheel.

187. The combination, with a frame, of a fixed carrier-rod; a platen-carriage shiftably mounted on said rod; a platen rotatably mounted on said rod and held as against longitudinal movement relatively to the carriage and having a ratchet-wheel fixed to one end thereof; a feed-lever pivotally mounted on the carrier-rod to have a movement longitudinally thereof with the platen-carriage, and having a pawl normally in operative engagement with the ratchet-wheel; a rock-shaft journaled on said frame in parallelism with the axis of said platen and having a feed-lever actuating device fixed thereto in the path of movement of, and adapted to engage and actuate, said feed-lever; feed mechanism operable for imparting a step-by-step advancing movement to the carriage and platen longitudinally and embodying a carriage-releaser; a device disposed in the path of movement of the carriage and effective for actuating the rock-shaft to release said carriage and thereby facilitate a retractive movement thereof; means for retracting the carriage; and means for again rocking the rock-shaft at a predetermined point in the retractive movement thereof to re-establish connection between the feed mechanism and carriage.

188. The combination with a rotatable platen; of a feed-wheel fixed to said platen; a platen-carrier rod extending through said feed-wheel and platen upon which said platen is shiftably supported; a feed-lever pivotally supported on said rod and having a spring-pressed pawl in normal operative engagement with the feed-wheel and also having a depending arm; a rock-shaft having an arm located in position to engage the depending arm of and actuate the feed-lever; and means for actuating the rock-shaft.

189. The combination with a platen carriage and a platen having a feed wheel, of a feed lever in normal operative engagement with the feed wheel and having a stop arm; a settable eccentric mounted on the carriage in the plane of rotation of the stop arm for limiting the throw of the feed lever and thereby regulating the rotary movement of the platen; a detent pin for holding the eccentric in a set position; and a spring for urging the parts of such device into engagement.

190. The combination with a rotatably-supported platen having a feed wheel in concentric relation with its axis, of a feed lever pivotally supported with its axis coincident with the axis of the feed wheel; a settable eccentric having its axis parallel to the axis of the feed lever and having a stop face disposed in the path of movement of a fixture on said feed lever; a detent pin for holding the eccentric in a set position, and a spring for urging the parts of such device into engagement.

191. The combination with a platen carriage and a platen having a feed wheel, of a feed lever in normal operative engagement with the feed wheel and having a stop arm; an eccentric mounted on the carriage in the plane of rotation of said stop arm and settable in different positions rotarily to limit the throw of the feed lever and thereby regulate the rotary movement of the platen; a detent pin for holding the eccentric in a set position; and a spring for urging the parts of such device into engagement.

192. The combination with a rotatable impression device carrier, and an actuatable support for imparting an orbital movement to said carrier, of a platen supported for shifting movement tangentially to the orbit of the impression device and for adjustment within the working stroke of said impression device transversely of said orbit; means for imparting a step-by-step longitudinal movement to the platen; and adjusting means organized and constructed to adjust said platen transversely of the orbit of the impression device and to hold the same in adjusted positions within the range of stroke of said impression device.

193. The combination with a rotatable impression device carrier, and an actuatable support for imparting an orbital movement to said carrier, of a platen-carriage supported to have a longitudinal feed movement in the plane of orbital movement of the impression device; power-actuated feed mechanism connected to impart a step-by-step longitudinal movement to said carriage; a rotatably-mounted platen supported for longitudinal movement with said carriage; independent adjusting means for adjusting the carriage in a plane intersecting the orbit of the impression device to bring the impact portion of the platen in different positions within the range of the working stroke of said device and for holding the same in its adjusted position.

194. The combination, with an impression device supported for orbital movement, of a rotatable platen supported for longitudinal and transverse movements; feed mechanism for imparting a step-by-step advancing movement to the platen in a horizontal plane tangential to the orbit of the impression device; means for shifting the platen vertically between two extreme positions transversely of said orbit; and means for effecting a horizontal adjustment of the platen within the working stroke of the impression device and toward and away from the axis of orbital movement of said impression device, whereby the effective pressure of impact of the impression device on the platen may be regulated.

195. The combination, with an impression device supported for orbital movement and having a radial working stroke, of an oscillatory platen-carriage-supporting frame; a platen-carriage and a platen shiftably supported on said frame; means for adjusting the platen-carriage-supporting frame vertically and transversely of the orbital path of the impression device; means for imparting a longitudinal feed movement to the carriage and platen in a plane substantially tangential to the orbit of the impression device; and adjusting means in connection with said frame and effective for setting and holding the platen in selected operative positions within the range of the working stroke of the impression device, whereby to regulate the impact of the impression device on the platen.

196. The combination with an impression device having an orbital movement, of a platen supported for shifting movement in a plane tangential to the orbit of the impression device; and means for adjusting the platen in a plane intersecting the orbit of said impression device for regulating the impact of the impression device.

197. The combination with a rotative impression device; of a platen supported for longitudinal movement in a plane substantially tangential to the path of rotation of the impression device; and independent means for adjusting the platen within the range of the working stroke of the impression device and toward and from the axis of rotation of said impression device.

198. A platen-carriage-supporting frame pivotally supported to have an oscillatory movement in a vertical direction between two extreme positions and to have an adjustment in a horizontal direction, combined with independent means for shifting the same vertically and for adjusting the same horizontally.

199. A vertically-disposed carriage-platen-supporting frame; combined with a rock-shaft having a crank pivotally connected with said frame between the upper and lower ends thereof; adjusting means in connection with said rock-shaft and effective for adjusting said frame transversely; and means for shifting the frame vertically between two extreme positions.

200. The combination with framework; of an eccentric-bearing journaled in said framework; a crank-shaft journaled in said eccentric bearing; a vertically-disposed carriage-platen-supporting frame pivotally connected, substantially midway between its upper and lower ends, to the crank-shaft; a frame-shifting lever fulcrumed upon the main framework and pivoted at one end to the lower end of the platen-carriage-supporting frame and affording means for shifting said frame vertically in one direction; and independent means for shifting the frame vertically in the opposite direction.

201. The combination of a vertically-disposed platen-carriage-supporting frame; a crank-shaft pivotally connected to said frame substantially midway between the upper and lower ends and at one side of the longitudinal axis thereof, and affording means for facilitating a vertical oscillatory movement of said frame; a lever pivoted at one end to the lower end of the platen-carriage-supporting frame at the opposite side of the longitudinal axis thereof; means for actuating said lever to shift the frame vertically in one direction; means connected to shift said frame vertically in the opposite direction; and adjusting means in connection with said crank-shaft and effective for changing the vertical line of movement of said frame.

202. The combination with a platen, of means for feeding the same, mechanism to impart a step-by-step movement to the feeding means and comprising power driven means normally disconnected from the feed, a wheel connected to said power driven means, a series of pins, angle levers carrying the pins and fulcrumed in said wheel, an actuator for rocking said angle levers to set one of such pins, and means controlled by the set pin for connecting such power driven means to the feed mechanism for imparting a feed step to the platen.

203. The combination with a carriage, of mechanism for imparting a step-by-step feed thereto and comprising driving mechanism constituted for continuous movement and normally disconnected from the platen, a carrier connected to said driving mechanism to be continuously driven thereby, a series of normally inactive angle levers fulcrumed on said carrier, pins carried by said angle levers, means actuatable by said pins and effective for connecting the driving mechanism to the carriage for producing a single step, and means for actuating any angle lever to place one of the pins in its active position.

204. The combination with a platen, of impression devices, a compound feed mechanism for one of these comprising two co-operative feed devices one of which devices, the primary, is capable of movement independently of and constitutes the controlling actuator for the other, the secondary, and a secondary feed device normally idle and dependent for its actuation upon actuating instrumentalities or devices comprised in the primary feed device, said actuating instrumentalities being controlled in operation by the movement of the impression devices of the machine, means for returning said actuating instrumentalities from active to idle position, and means for locking the same in their active and in their idle position.

205. The combination with a carriage, of mechanism to impart a step-by-step feed movement thereto in one direction, power driven means normally disconnected from the feed mechanism, means for operatively connecting said power driven means with said feed mechanism and comprising a carrier driven thereby, angle levers fulcrumed thereon, settable pins carried by said levers, means controlled by an actuator for rocking said levers for setting said pins, and a normally idle device for imparting a single step at a time and actuatable from one of said pins when set, means operative upon the carriage at a predetermined point in its advance for automatically retracting the same to its initial position, and means operative at a predetermined point in said retractive movement to impart a transverse movement thereto.

206. A platen having a central longitudinal opening combined with a platen carrier rod extending through said opening, and coöperative shock compensating members carried by the platen and said rod.

207. The combination with a platen, of an impression device, means for moving said impression device through a major orbital path, and means for concurrently moving the same at will through a minor orbital path, and means for increasing and decreasing the radius of such major orbital path during a portion of the revolution of the impression device through such minor orbit, respectively for bringing the said impression device into operative relation with the platen and for withdrawing the same to the orbit of its normal major orbital path for retracting it from such relation.

208. The combination with a platen, of an impression device, means for causing said impression device to travel a major orbital path, and means for concurrently causing the same to travel through a minor orbital path at will, and means for increasing the radius of such major orbital path during a portion of the revolution of the impression device through such major orbital path for bringing the said impression device into operative relation with the platen.

209. The combination with a platen, of an impression device, means for moving said impression device through a major orbital path and at will through a minor orbital path, and means adjacent to the platen for increasing the radius of such major orbital path for bringing the impression device into operative relation with the platen and for retracting the said device to its normal minor orbital path for retracting it into its inoperative position.

210. A device of the character specified embodying mechanism having an established working point in combination with an impression device operative at such working point, means for shifting such impression device in an orbital path, and selector controlled means for concurrently shifting said device through another orbital path, and means for increasing the radius of such former orbital path for advancing said impression device to the working point of the machine.

FRANCIS H. RICHARDS.

Witnesses:
 FRED. J. DOLE,
 F. N. CHASE.